United States Patent
Minamitaka

(10) Patent No.: US 8,106,281 B2
(45) Date of Patent: Jan. 31, 2012

(54) MUSIC DIFFICULTY LEVEL CALCULATING APPARATUS AND MUSIC DIFFICULTY LEVEL CALCULATING METHOD

(75) Inventor: Junichi Minamitaka, Kokubunji (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 12/782,914

(22) Filed: May 19, 2010

(65) Prior Publication Data

US 2010/0300262 A1    Dec. 2, 2010

(30) Foreign Application Priority Data

May 29, 2009  (JP) ................. 2009-129809
Jun. 2, 2009   (JP) ................. 2009-133017
Jun. 2, 2009   (JP) ................. 2009-133018

(51) Int. Cl.
   *A63H 5/00*      (2006.01)
   *G04B 13/00*    (2006.01)

(52) U.S. Cl. ............... 84/609; 84/601; 84/611; 84/612; 84/613; 84/635; 84/636; 84/637; 84/649; 84/651; 84/652

(58) Field of Classification Search ............. None
See application file for complete search history.

(56) References Cited

U.S. PATENT DOCUMENTS

| | | | |
|---|---|---|---|
| 7,202,408 B2* | 4/2007 | Fallgatter | 84/645 |
| 7,394,013 B2* | 7/2008 | Fallgatter | 84/645 |
| 7,435,891 B2* | 10/2008 | Perla | 84/470 R |
| 2007/0022866 A1* | 2/2007 | Perla | 84/609 |
| 2007/0256540 A1* | 11/2007 | Salter | 84/485 R |

FOREIGN PATENT DOCUMENTS

| JP | 2001-331173 A | 11/2001 |
|---|---|---|
| JP | 2002-323891 A | 11/2002 |
| JP | 2006-078656 A | 3/2006 |

OTHER PUBLICATIONS

Japanese Office Action dated Oct. 4, 2011 (and English translation thereof) in counterpart Japanese Application No. 2009-129809.

* cited by examiner

*Primary Examiner* — Marlon Fletcher
(74) *Attorney, Agent, or Firm* — Holtz, Holtz, Goodman & Chick, PC

(57) ABSTRACT

CPU 11 reads from RAM 13 pitch information of each of musical notes composing the music, fingering information for playing the musical notes, and time information of the musical notes, thereby calculating a difficulty level of music. CPU 11 calculates a fingering difficulty level concerning fingering of playing adjacent musical notes based on the pitch information and fingering information, a rhythm difficulty level concerning musical-note duration and timing of key playing based on the time information, and a key difficulty level concerning a key of music based on the pitch information. Further, CPU 11 calculates the whole difficulty level of music based on the fingering difficulty level, rhythm difficulty level and key difficulty level.

17 Claims, 38 Drawing Sheets

FIG.17A iBaseScale[i]:

| 1 | ♭2(#1) | 2 | ♭3(#2) | 3 | 4 | ♭5(#4) | 5 | ♭6(#5) | 6 | ♭7(#6) | 7 |
|---|---|---|---|---|---|---|---|---|---|---|---|
| 1 | 0 | 1 | 0 | 1 | 1 | 0 | 1 | 0 | 1 | 0 | 1 |

← 1701

FIG.17B iATonal[j]:

| 1 | ♭2(#1) | 2 | ♭3(#2) | 3 | 4 | ♭5(#4) | 5 | ♭6(#5) | 6 | ♭7(#6) | 7 |
|---|---|---|---|---|---|---|---|---|---|---|---|
| 0 | 1 | 0 | 1 | 0 | 0 | 1 | 0 | 1 | 0 | 1 | 0 |

|  | C | C#(Db) | D | D#(Eb) | E | F | F#(Gb) | G | G#(Ab) | A | Bb(A#) | B |
|---|---|---|---|---|---|---|---|---|---|---|---|---|
| iPC(i=0) | 7 | 0 | 2 | 1 | 3 | 10 | 0 | 4 | 5 | 5 | 8 | 0 | ← 1801 |
| iBaseScale | 1 | 0 | 1 | 0 | 1 | 1 | 0 | 1 | 0 | 1 | 0 | 1 | ← 1802 |
| iSum | 7 | + | 2 | + | 3+ | 10 | + | 4 | + | 5 | + | 0 | = 31 |

| iPC(i=1) | 0 | 7 | 0 | 2 | 1 | 3 | 10 | 0 | 4 | 5 | 5 | 8 |
| iSum | 0 | + | 0 | + | 1+ | 3 | + | 0 | + | 5 | + | 8 | = 17 |

......

| iPC(i=5) | 10 | 0 | 4 | 5 | 5 | 8 | 0 | 7 | 0 | 2 | 1 | 3 |
| iSum | 10 | + | 4 | + | 5+ | 8 | + | 7 | + | 2 | + | 3 | = 39 |

......

| iPC(i=7) | 4 | 5 | 5 | 8 | 0 | 7 | 0 | 2 | 1 | 3 | 10 | 0 |
| iSum | 4 | + | 5 | + | 0 | 7 | + | 2 | + | 3 | + | 0 | = 21 |

......

MUSIC DIFFICULTY LEVEL CALCULATING APPARATUS AND MUSIC DIFFICULTY LEVEL CALCULATING METHOD

CROSS REFERENCE TO RELATED APPLICATIONS

The present application is based upon and claims the benefit of priority from the prior Japanese Application No. 2009-129809, file May 29, 2009, Japanese Application No. 2009-133017, filed Jun. 2, 2009 and Japanese Application No. 2009-133018, filed Jun. 2, 2009, entire contents of which are incorporated herein by reference.

BACKGROUND OF THE INVENTION

1. Field of the Invention

The present invention relates to a music difficulty level calculating apparatus and a music difficulty level calculating method, for calculating a difficulty level of music.

2. Description of the Related Art

When a difficulty level of music is evaluated, professionals in music education or musicians subjectively evaluate the difficulty level of the music taking into consideration of various elements in the music, for example, series of musical notes included in the music. In the conventional subjective evaluation, no objective difficulty levels of elements composing the music are included, but just the whole difficulty level of music is evaluated.

An apparatus has been proposed, which calculates a fingering difficulty level based on information of fingering performed by a player when he or she plays music with a keyboard instrument. Japanese Patent No. 2006-78656 A discloses a difficulty level calculating method, which calculates a difficulty level in fingering operation indicated by information of fingering, assuming every case of playing two musical notes with two fingers and defining a cost value for such every case.

The conventional difficulty level calculating apparatuses include a problem that it is not easy to define the cost value for every case of playing two music notes with two fingers. The difficulty level of music includes not only the fingering difficulty level but also difficulty levels of other elements. Therefore, it is preferable to calculate the difficulty level of music taking into consideration the difficulty levels of other elements.

SUMMARY OF THE INVENTION

The present invention has aspects to provide a music difficulty level calculating apparatus and a music difficulty level calculating method for calculating a difficulty level of music taking into consideration of various elements composing the music.

According to one aspect of the invention there is provided a music difficulty level calculating apparatus, which comprises a storing unit for storing musical-tone data, wherein the musical-tone data includes pitch information of each of musical notes composing music, fingering information for playing the musical notes, and time information of each of the musical notes, a separate difficulty level calculating unit for calculating separate difficulty levels on plural elements required for playing music respectively, based on either one of the pitch information, the fingering information and the time information stored in the storing unit, and a whole difficulty level calculating unit for calculating a whole difficulty level of music based on the separate difficulty levels calculated by the separate difficulty level calculating unit.

According to another aspect of the invention, there is provided a method of calculating a music difficulty level in a music difficulty level calculating apparatus provided with a storing unit, which stores musical-tone data including pitch information of each of musical notes composing music, fingering information for playing the musical notes, and time information of each of the musical notes, which method comprises a separate difficulty level calculating step of calculating separate difficulty levels on plural elements required for playing music respectively, based on either one of the pitch information, the fingering information and the time information stored in the storing unit, and a whole difficulty level calculating step of calculating a whole difficulty level of music based on the separate difficulty levels calculated at the separate difficulty level calculating step.

BRIEF DESCRIPTION OF THE DRAWINGS

FIG. 17A is a view showing an example of a base scale array iBaseScale [ ] in the present embodiment.

FIG. 17B is a view showing an example of non base scale array iATonal [ ] in the present embodiment.

FIG. 18 is a view showing an example of an array iPC [ ] and an example of the base scale array iBaseScale [ ].

DETAILED DESCRIPTION OF THE PREFERRED EMBODIMENTS OF THE INVENTION

Figure 1:
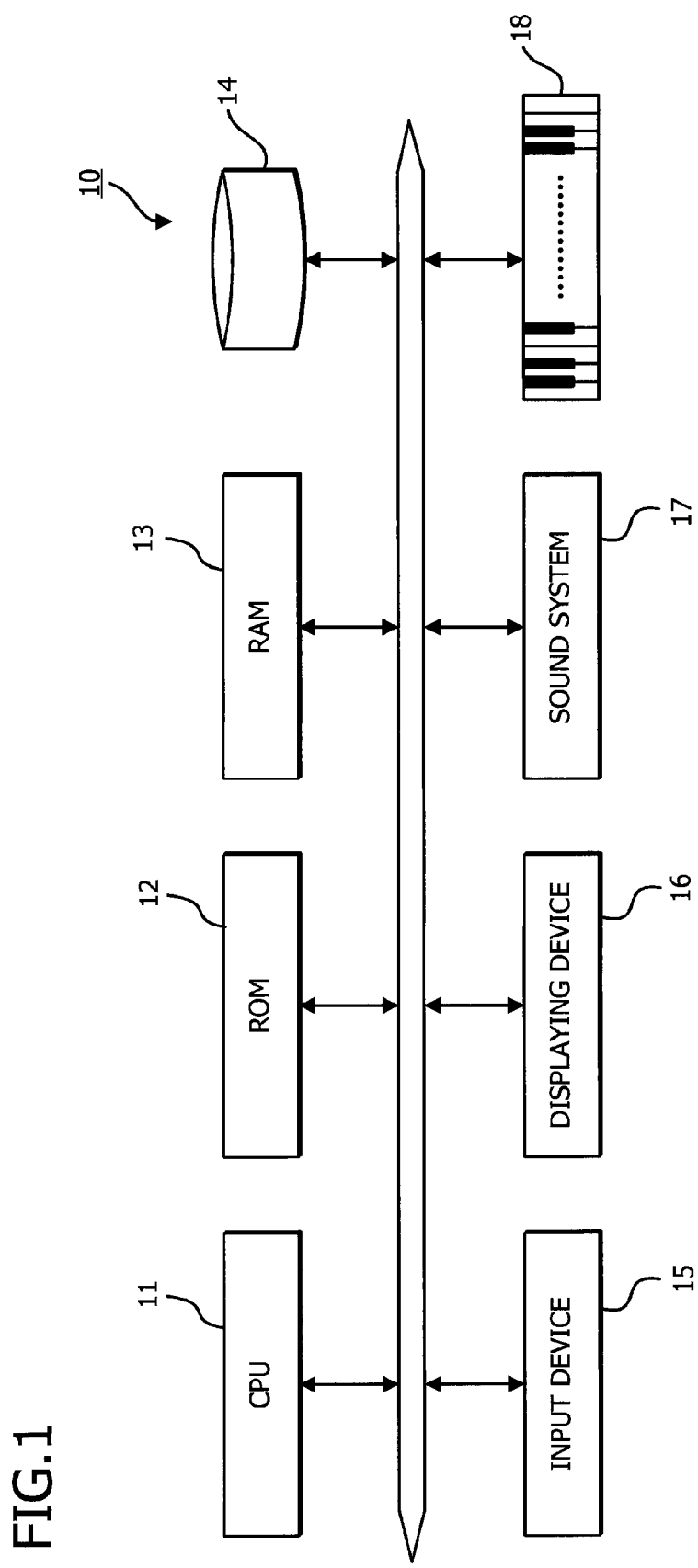
FIG. 1 is a block diagram showing a configuration of a music difficulty level calculating apparatus according to the first embodiment of the invention.

Preferred embodiments of the invention will be described with reference to the accompanying drawings in detail. FIG. 1 is a block diagram showing a configuration of a music difficulty level calculating apparatus in the first embodiment of the invention. As shown in FIG. 1, the music difficulty level calculating apparatus 10 in the first embodiment of the invention comprises CPU 11, ROM 12, RAM 13, a large-scale storing device 14, input device 15, displaying device 16, sound system 17 and keyboard 18.

CPU 11 executes various processes for evaluating a difficulty level of music to be described later. A fingering difficulty level evaluating process, rhythm difficulty level evaluating process, key difficulty level evaluating process, and whole difficulty level evaluating process are included in theses processes. ROM 12 is used to store programs for executing the various processes for evaluating a difficulty level of music (fingering difficulty level evaluating process, rhythm difficulty level evaluating process, key difficulty level evaluating process, and whole difficulty level evaluating process) and parameters to be used in the processes. RAM 13 is used to temporarily store parameters generated during the course of execution of the programs, input data and output data. The large-scale storing device 14 is used to store music data. Hard disc devices and memory cards are used as the large-scale storing device 14.

The input device 15 includes switches, a key board, and a mouse. The input device 15 sends CPU 11 various instruction in response to a switch operation, key operation and mouse operation by a user. On a screen of the displaying device 12 is displayed image data including a musical score based on music data and evaluation of a difficulty level of music. The sound system 17 comprises a music generating circuit, amplifier and speaker. The sound system 17 generates predetermined music in accordance with music data or in response to key operations on the keyboard 18 by an operator, thereby outputting an acoustic signal based on the music. The keyboard 18 is not an essential element in the above embodiment.

In the present embodiment, the music difficulty level calculating apparatus 10 can be formed in a type of a keyboard instrument or in a type of a personal computer. If the music difficulty level calculating apparatus 10 is formed in a type of a keyboard instrument, the operator presses keys of the keyboard 18 referring to a musical score displayed on the screen of the displaying device 16, and the sound system 17 generates music data corresponding to a pitch of the pressed key in response to the key operation by the operator, thereby outputting a music sound.

Figure 2:
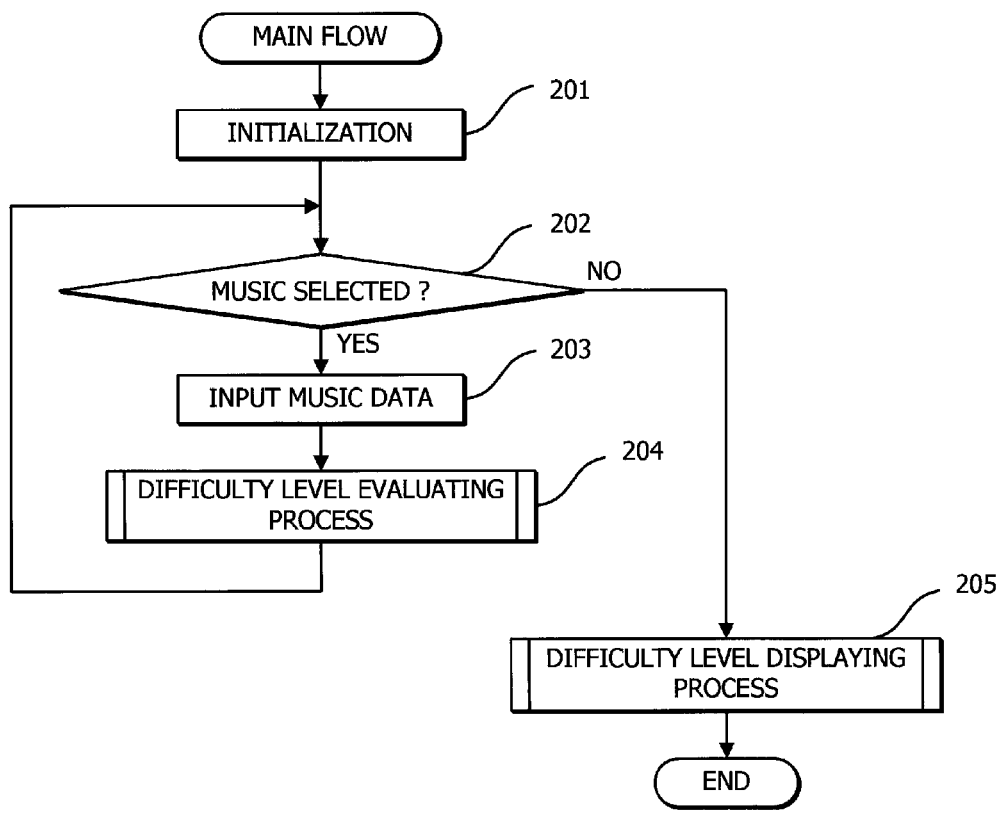
FIG. 2 is a flow chart of a schematic process executed in the music difficulty level calculating apparatus 10 according to the present embodiment of the invention.

FIG. 2 is a flow chart of a schematic process to be executed in the music difficulty level calculating apparatus 10 according to the present embodiment of the invention. As shown in FIG. 2, CPU 11 of the music difficulty level calculating apparatus 10 executes an initializing operation at step 201, clearing the parameters stored in RAM 13 and an image displayed on the screen of the displaying device 16. Then, CPU 11 judges at step 202 whether or not the operator has operated the input device 15 to select a piece of music. For example, music is selected by inputting the number of the music data.

When it is determined that a piece of music has been selected (YES at step 202), CPU 11 reads the selected music data from plural pieces of music data stored in the large-scale storing device 14, and temporarily stores the read music data in RAM 13 at step 203. Then, CPU 11 executes a difficulty level evaluating process, calculating a value of iCost, which indicates a difficulty level of music whose data is read at step 204. When it is determined that a piece of music has not been selected (NO at step 202), CPU 11 executes a difficulty level indicating process with respect to each piece of music whose difficulty level has been calculated at step 205. The difficulty level indicating process produces and displays on the screen of the displaying device 16 an image which indicates a relationship between the calculated difficulty level and musical notes included in the music. The difficulty level evaluating process and the difficulty level indicating process will be described in detail later.

Figure 3:
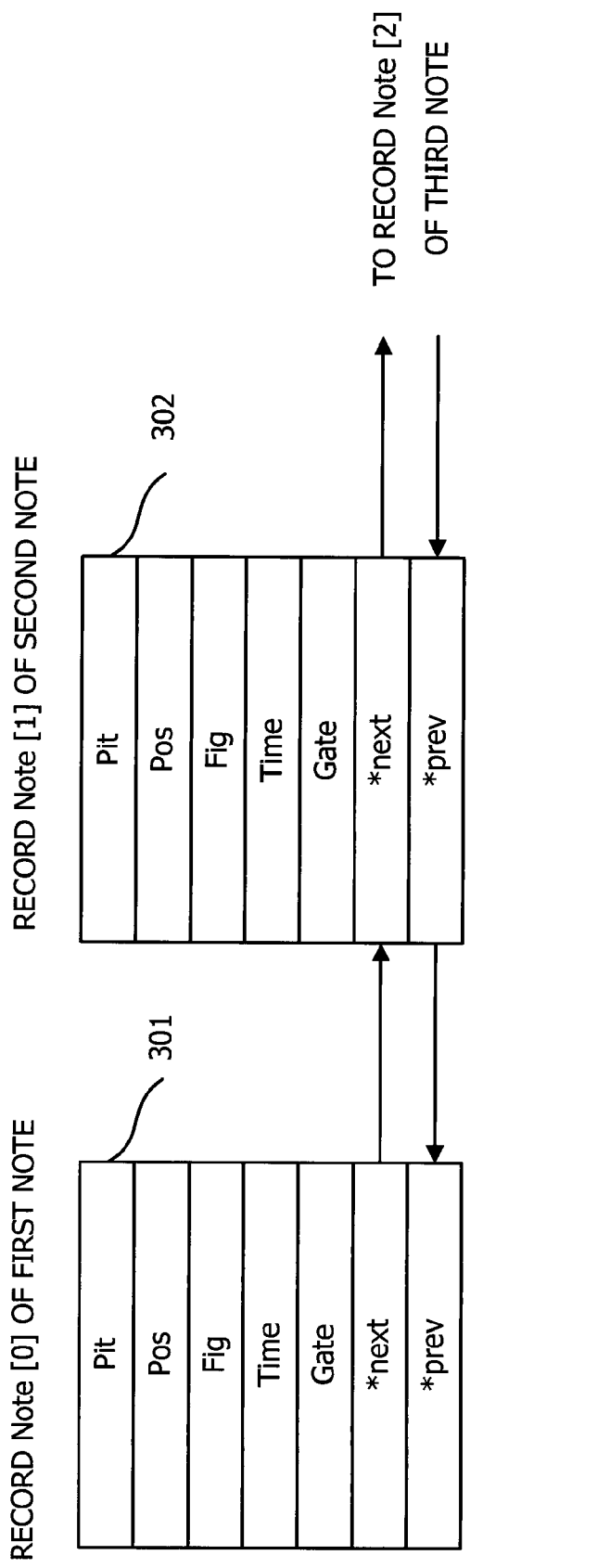
FIG. 3 is a view showing an example of a data structure of music data in the present embodiment.

FIG. 3 is a view showing an example of a data structure of the music data in the present embodiment. As shown in FIG. 3, music data of music includes plural records (refer to Reference numbers 301, 302) of musical-tone data each given to a musical note and indicating a musical tone to be generated. The record of musical-tone data (for example, the record of the leading musical note Note [0]: Reference number 301) includes items such as Pitch information "Pit", Keyboard position information "Pos", Fingering information "Fig", Sound timing "Time", Sounding duration "Gate", Pointer to the following record of note "*Next", and Pointer to the record of the previous note "*Prev".

Figure 16:
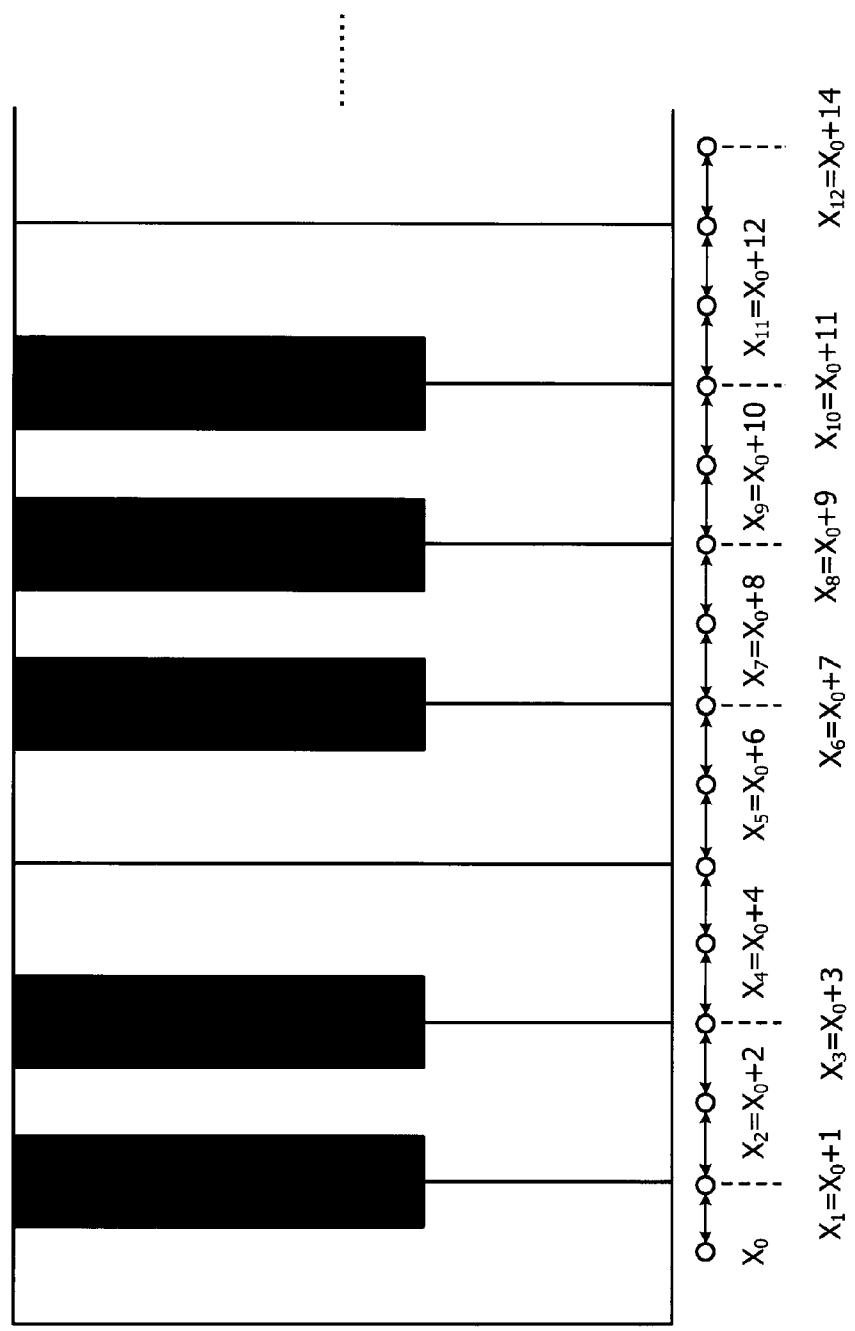
FIG. 16 is a view illustrating keyboard position information.

On the assumption that a pitch name "C-1" is given a value "0", the Pitch information "Pit" is represented by a value that increases by "1" as a pitch increases by "1". The keyboard position information "Pos" is given by a coordinate indicating a central position of a key corresponding to the pitch in the horizontal direction of the keyboard. For example, as shown in FIG. 16, when it is assumed that keyboard position information Pos=X0 at a position of "C" on the keyboard (C4: Pit=60), keyboard position information from C#4 to C5 is given by X1 to X12. As will be understood in FIG. 16, a difference in coordinates between adjacent black and white keys or a difference between adjacent white and black keys is "1". Meanwhile, a difference in coordinates between adjacent white keys ("E" and "F", "B" and "C") is "2".

Figure 4:
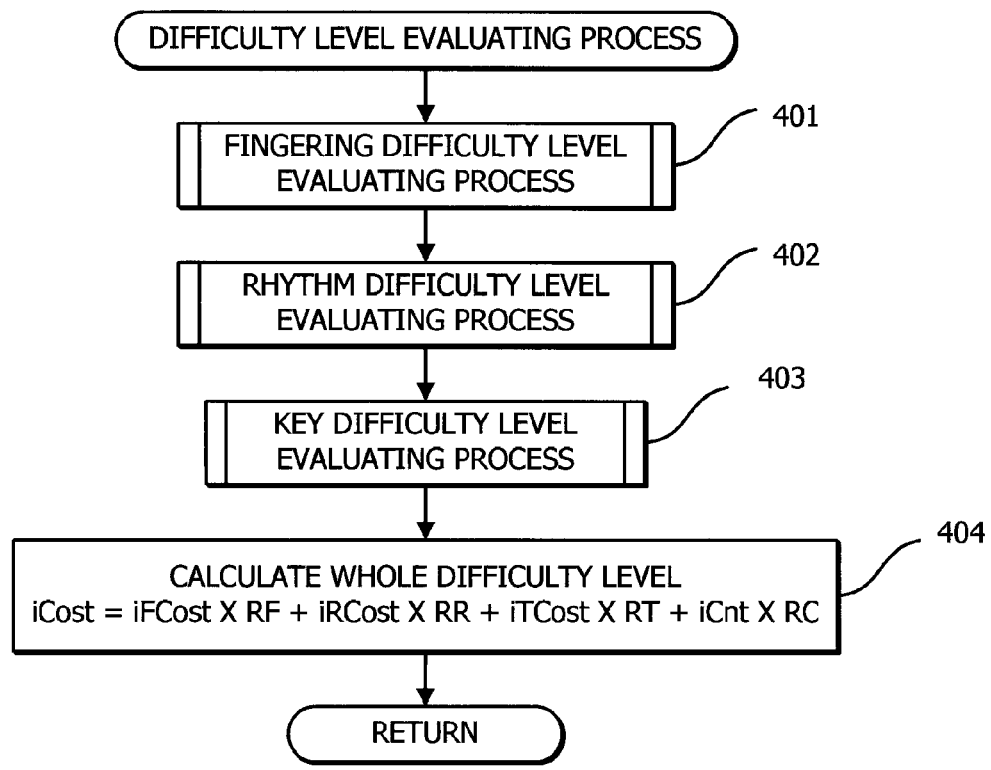
FIG. 4 is a flow chart schematically showing an example of a difficulty level evaluating process performed in the present embodiment.

FIG. 4 is a flow chart schematically showing an example of the difficulty level evaluating process performed in the present embodiment. As shown in FIG. 4, CPU 11 executes the fingering difficulty level evaluating process at step 401, the rhythm difficulty level evaluating process at step 402, the key difficulty level evaluating process at step 403 and the whole difficulty level evaluating process at step 404. In fingering difficulty level evaluating process, CPU 11 calculates a fingering difficulty level iFCost based on fingering information included in the musical-tone data. In the rhythm difficulty level evaluating process, CPU 11 calculates a rhythm difficulty level iRCost based on the Sound timing and Sounding duration included in the musical-tone data. Further, in the key difficulty level evaluating process, CPU 11 calculates a key difficulty level iTCost based on the pitch information included in the musical-tone data.

CPU 11 multiplies the calculated fingering difficulty level iFCost, rhythm difficulty level iRCost, key difficulty level iTCost and the number of notes (iCnt) in music data by weighting factors RF, RR, RT and RC, respectively, and adds them to calculate a difficulty level of music iCost at step 404. The difficulty level of music iCost is given by the following mathematical expression.

$$iCost = iFCost \times RF + iRCost \times RR + iTCost \times RT + iCnt \times RC$$

Figure 5:
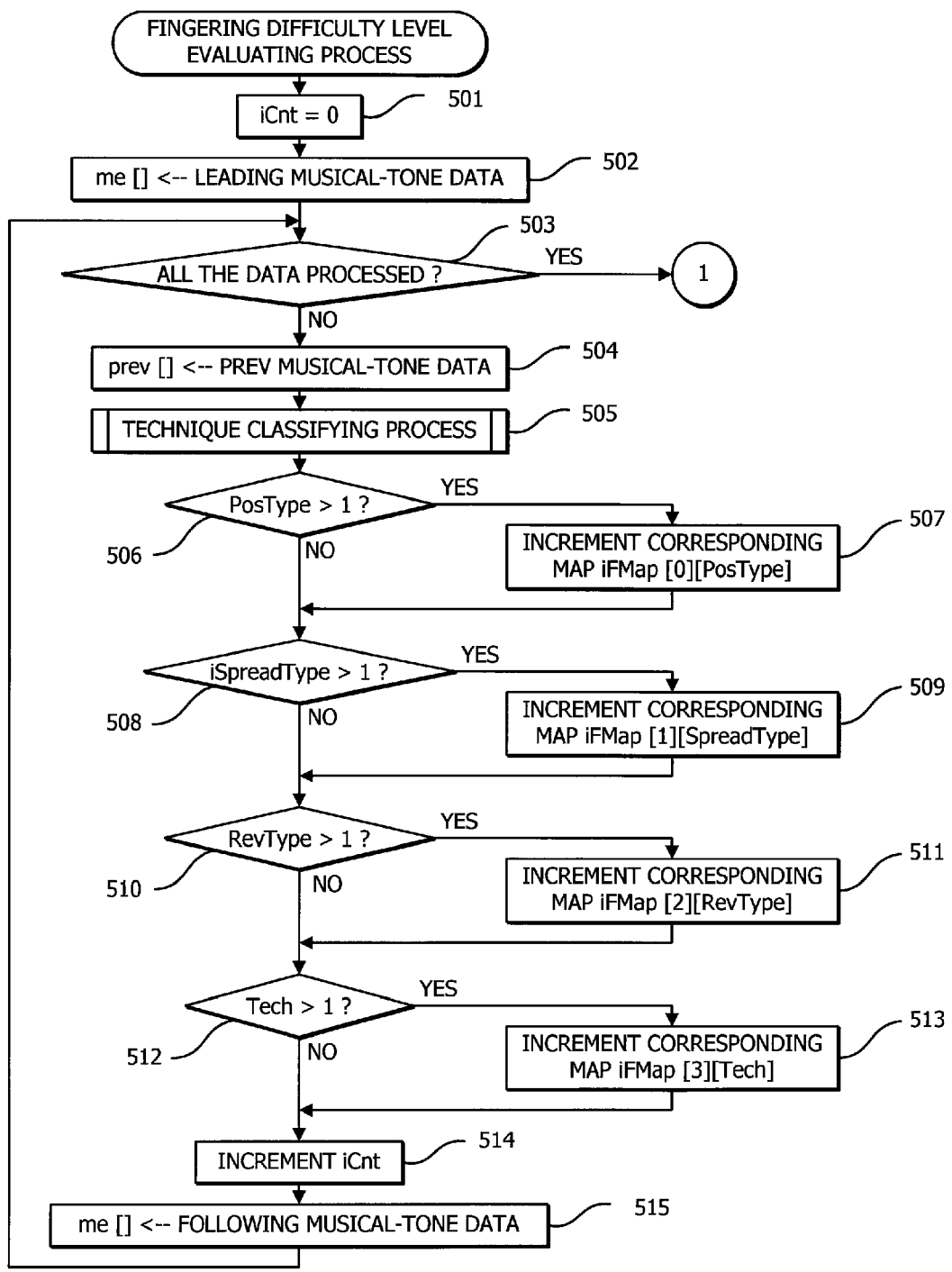
FIGS. 5 and 6 are flow charts of an example of a fingering difficulty level evaluating process performed in the present embodiment.
Figure 6:
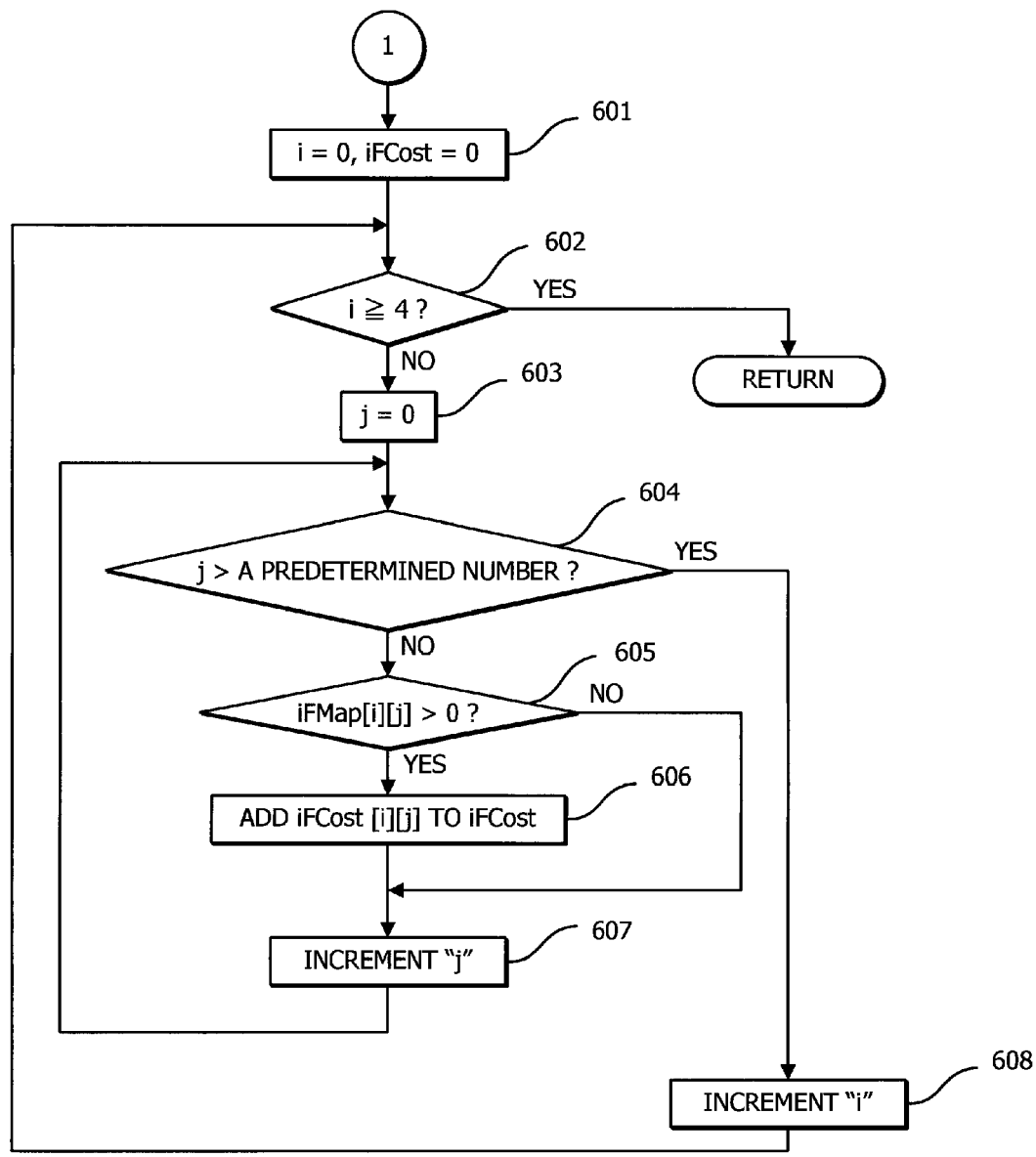

Hereinafter, the fingering difficulty level evaluating process, rhythm difficulty level evaluating process and key difficulty level evaluating process will be described in detail. FIGS. 5 and 6 are flow charts of an example of the fingering difficulty level evaluating process performed in the present embodiment. In the present embodiment, the music data consists of musical notes of a melody to be played with right hand. Therefore in the present embodiment, the fingering difficulty level is calculated when a melody is played with right hand. The fingering information included in the record of musical-tone data in the music data teaches which finger of his or her right hand the operator should use to press the keyboard. Finger numbers "1" to "5" in keyboard music indicate that the keyboard should be played with "thumb", "index finger", "middle finger", "ring finger" and "little finger", respectively.

As shown in FIG. 5, CPU 11 initializes the parameter iCnt indicating the number of musical notes included in the music indicated in musical-tone data to "0" at step 501, and stores in Array me [ ] the record Note [0] of the leading musical note of the musical-tone data in the music data recorded in RAM 13 at step 502. CPU 11 repeatedly executes processes at step 504 to step 515 until all the records of the musical tone data have been processed, or until it is determined YES at step 503.

CPU 11 specifies the record of musical-tone data one piece prior to the record of musical-tone data stored in Array me [ ], and stores the specified record of musical-tone data in Array prey [ ] at step 504. Then, CPU 11 executes a fingering technique classifying process based on the values stored in Array me [ ] and Array prey [ ] at step 505. In the fingering technique classifying process, it is judged to which classification items the fingering technique between adjacent musical notes in the music corresponds, Positioning type (PosType), Finger spreading type (iSpreadType), Reversing type (RevType), or Fingering technique type (Tech).

The classification item of Positioning type (PosType) indicates at which finger position the fingering is performed. The classification item of Finger spreading type (iSpreadType) indicates how much fingers spread to play adjacent musical notes. The classification item of Reversing type (RevType) indicates that a finger crosses over or under another finger(s). Further, the classification item of Fingering technique type (Tech) indicates how fingers are used to play adjacent musical notes.

Figure 7:
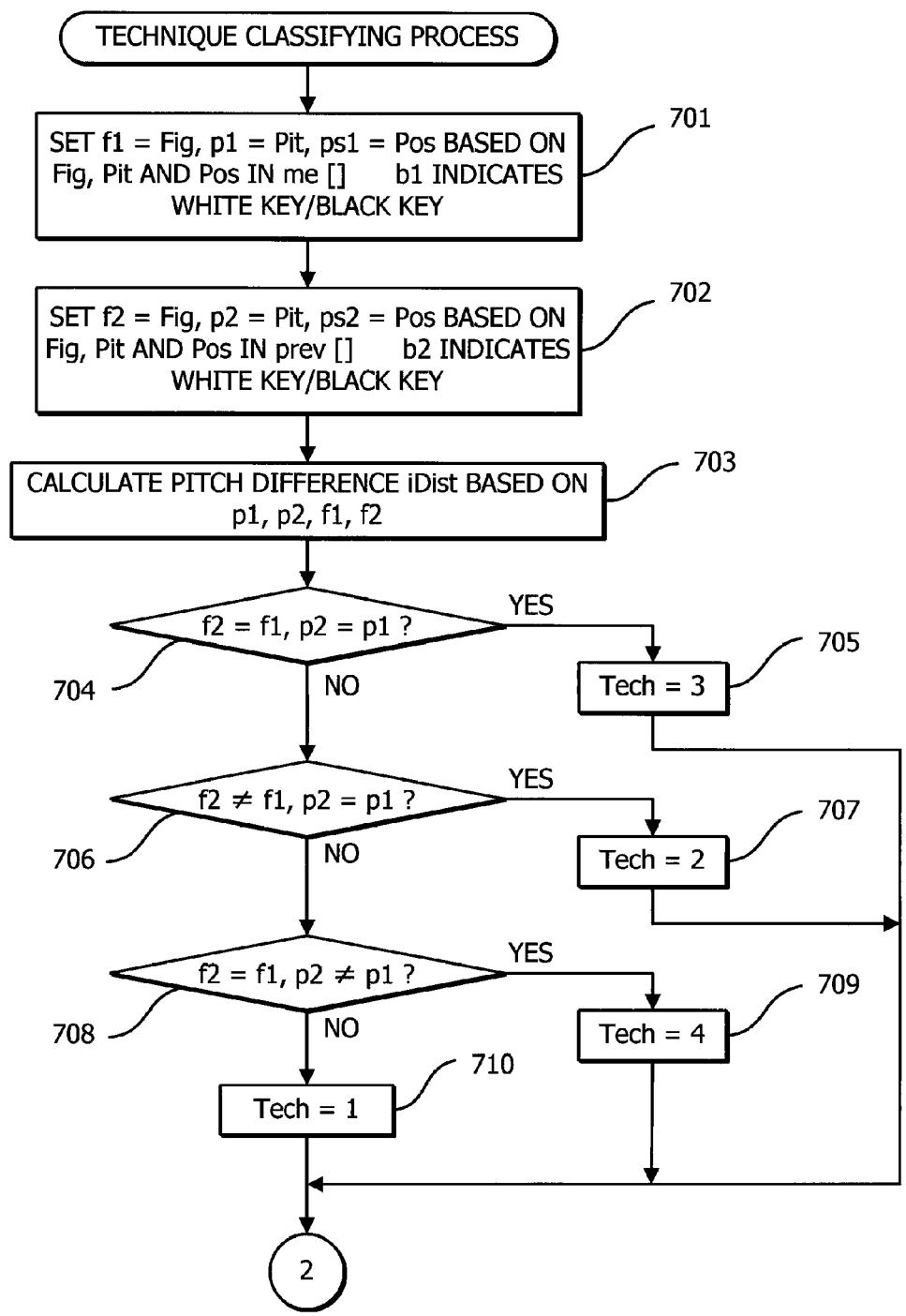
FIGS. 7 and 8 are flow charts showing an example of a technique classifying process performed in the present embodiment.
Figure 8:
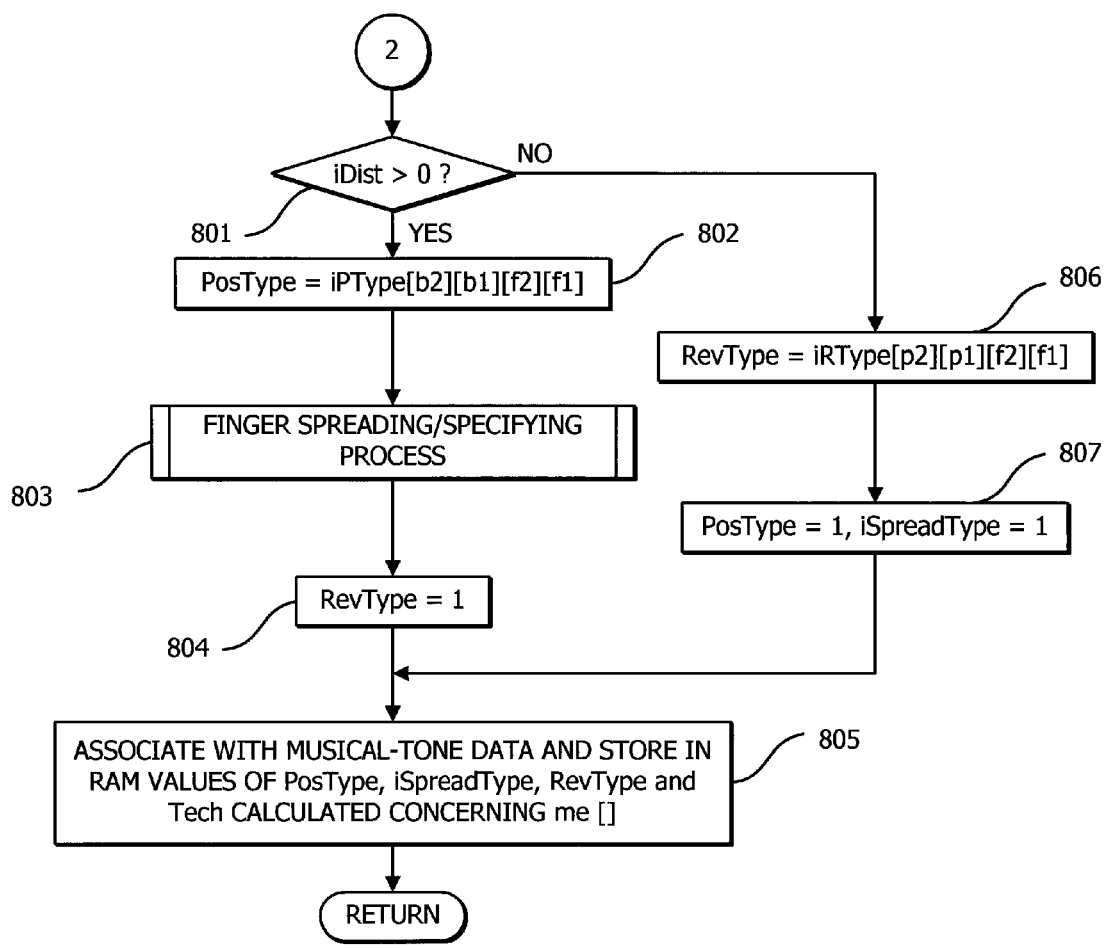

The technique classifying process calculates a classification value indicating a specific outline of each classification item. FIGS. 7 and 8 are flow charts showing an example of the technique classifying process performed in the present embodiment. CPU 11 sets the fingering information "Fig", pitch information "Pit" and keyboard position information "Pos", in Array me [ ] to f1=Fig, p1=Pit and ps1=Pos, respectively. Further, CPU 11 judges based on the pitch information "Pit", whether the key is a white key or a black key. Information indicating a white key or a black key is set to a value "b1". The value "b1" is set to "1" indicating a black key, or to "0" indicating a white key. These values f1, p1, ps1, b1 are stored in RAM 13.

CPU 11 sets the fingering information "Fig", pitch information "Pit" and keyboard position information "Pos" in Array prey [ ] to f2=Fig, p2=Pit and ps2=Pos, respectively. Information indicating a white key or a black key is set to a value "b2". These values f2, p2, ps2, b2 are stored in RAM 13. CPU 11 calculates an index indicating a pitch difference iDist using p1, p2, f1 and f2 at step 703.

The index indicating a pitch difference iDist indicates that the finger number increase or decrease when musical notes in the music progress in ascending scale or the finger number decrease or increase when musical notes in the music progress in descending scale. The pitch difference iDist is calculated by the following mathematical expression.

$$iDist = (p1-p2)*(f1-f2)$$

Therefore, when iDist>0, this index means that musical notes in the music progress in ascending scale and the finger number increases, or musical notes in the music progress in descending scale and the finger number decreases. That is, when iDist>0 is true, the keys are played with a fingering technique that places the fingers side by side and does not place any finger crossing over or under other finger(s) on the keyboard.

CPU 11 judges at step 704 whether or not f2=f1 and p2=p1 are true. When it is determined YES at step 704, this means that the adjacent musical tones indicate the same pitch and the adjacent musical tones are played with the same finger. When it is determined at step 704 that f2=f1 and p2=p1 are true (YES at step 704), CPU 11 sets "Tech=3" to a classification value of Technique type (Tech) at step 705. The set value is stored in RAM 13. Then, CPU 11 judges at step 706 whether or not f2≠f1 and p2=p1 are true. When it is determined YES at step 706, this means that the adjacent musical tones indicate the same pitch and the adjacent musical tones are played with different fingers. When it is determined at step 706 that f2 ≠f1 and p2=p1 are true (YES at step 706), CPU 11 sets a classification value of "Tech=2" to the classification item of Technique type (Tech) at step 707.

CPU 11 judges at step 708 whether or not f2=f1 and p2≠p1 are true. When it is determined YES at step 708, this means that the adjacent musical tones indicate different pitches and the adjacent musical tones are played with the same finger. When it is determined at step 708 that f2≠f1 and p2 =p1 are true (YES at 708), CPU 11 sets a classification value of "Tech=4" to the classification item of Technique type (Tech) at step 709. When it is determined at step 708 that f2≠f1 and p2=p1 is not true (NO at step 708), CPU 11 sets a classification value of "Tech=1" to the classification item of Technique type (Tech) at step 710.

Then, CPU 11 judges at step 801 (FIG. 8) whether or not iDist>0 is true. As described above, when iDist>0 is true, the keys are played with a fingering technique that places the fingers side by side and does not pass any finger over or under other finger(s) on the keyboard. When it is determined at step

801 that iDist>0 is true (YES at step 801), CPU 11 calculates a classification value of PosType, PosType=iPType [b2] [b1] [f2] [f1] based on a predetermined table iPType [ ] [ ] [ ] [ ] [ ], using b2, b1, p2 and p1 at step 802. The table iPType [ ] [ ] [ ] [ ] [ ] is stored in RAM 13 and includes finger numbers and values indicating a white/black key relating to adjacent musical notes.

Values of the table iPType [ ] [ ] [ ] [ ] [ ] will be described briefly hereinafter. The table iPType [ ] [ ] [ ] [ ] [ ] records the positioning type (PosType) of fingers based on a relationship between the finger numbers and positions (white key or black key) of fingers to be placed on adjacent musical notes. For instance, when both the current musical note and the previous musical note correspond to white keys, the positioning type (PosType) will be iPType [0] [0] [f2] [f1]=1. When the previous musical note is played with the thumb and corresponds to a white key, and the current musical note corresponds to a black key, then the positioning type (PosType) will be iPType [0] [1] [1] [f1]=2. When the previous musical note is played with the thumb and corresponds to a black key, and the current musical note is a black key, the positioning type (PosType) will be iPType [1] [1] [1] [f1]=3.

As described above, the value of the table iPType increases as the difficulty level increases depending on the hand and finger position placed when the adjacent musical notes are played.

Figure 9:
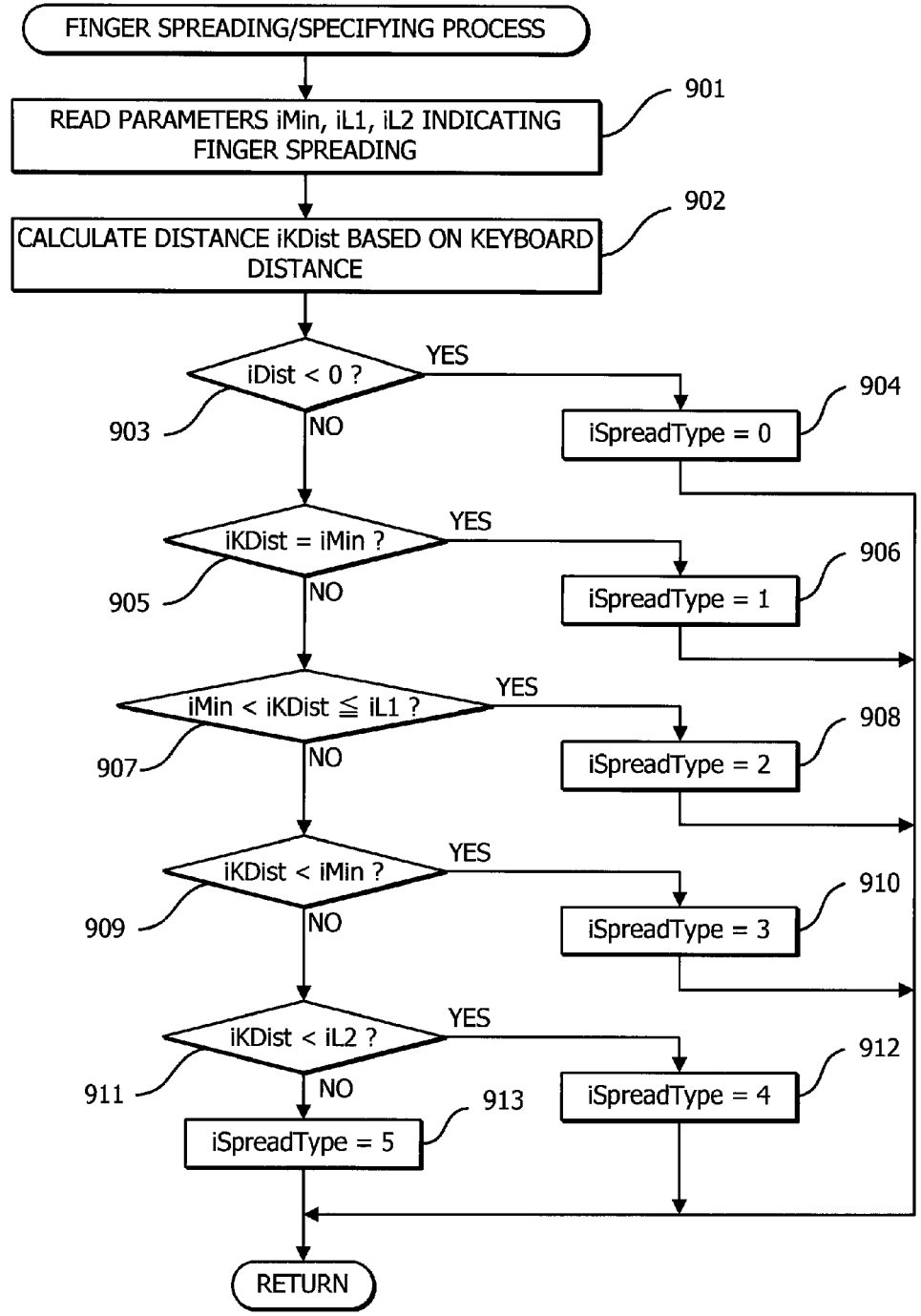
FIG. 9 is a flow chart showing in detail an example of a finger spreading/specifying process performed in the present embodiment.

CPU 11 executes a finger spreading/specifying process at step 803. FIG. 9 is a flow chart showing an example of the finger spreading/specifying process in detail.

As shown in FIG. 9, CPU 11 reads parameters, iMin, iL1, iL2 (iMin<iL1<iL2) from RAM 13 at step 901, wherein the parameter indicates a finger spreading on the keyboard. For instance, the parameter iMin indicates "2" corresponding to an interval of a major second of a white key, the parameter iL1 indicates "4" corresponding to an interval of a major third of a white key, and the parameter iL2 indicates "14" corresponding to an interval of a perfect octave of a white key. In the finger spreading/specifying process, iDist is compared with the parameters iMin, iL1 and iL2, whereby classification values of the finger spreading type (iSpreadType) are determined.

CPU 11 calculates a distance iKDist=|ps2−ps1| on the basis of the keyboard position at step 902.

When the pitch difference iDist calculated at step 703 is smaller than "0", that is, iDist<0 is true (YES at step 903), CPU 11 sets a classification value of "iSpreadType=0" to the classification item of Finger spreading type (iSpreadType) at step 904. Note that the processes shown in FIG. 9 are executed on the assumption that iDist>0 is true (Refer to step 801 in FIG. 8). Therefore, iDist<0 cannot be true in practice, and the process at step 904 is an error processing.

When iKDist=iMin is true (YES at step 905), CPU 11 sets a classification value of "iSpreadType=1" to the classification item of the finger spread type (iSpreadType) at step 906. When iMin<iKDist≦iL1 is true (YES at step 907), CPU 11 sets a classification value of "iSpreadType=2" to the classification item of the finger spreading type (iSpreadType) at step 908. When iKDist<iMin is true (YES at 909), CPU 11 sets a classification value of "iSpreadType=3" to the classification item of the finger spreading type (iSpreadType) at step 910.

When iKDist<iL2 is true (YES at 911), CPU 11 sets a classification value of "iSpreadType=4" to the classification item of the finger spreading type (iSpreadType) at step 912. Meanwhile, when iKDist≧iL2 is true (NO at 911), CPU 11 sets a classification value of "iSpreadType=5" to the classification item of the finger spreading, type (iSpreadType) at step 913.

In the finger spreading/specifying process, the following classification values of iSpreadType are given in accordance with the value of iKDist.

| | |
|---|---|
| 0 ≦ iKDist < iMin | iSpreadType = 3 |
| iKDist = iMin | iSpreadType = 1 |
| iMin < iKDist ≦ iL1 | iSpreadType = 2 |
| iL1 < iKDist < iL2 | iSpreadType = 4 |
| iL2 ≦ iKDist | iSpreadType = 5 |

When the finger spreading/specifying process is finished at step 803, CPU 11 sets a classification value of "RevType=1" to Reverse type (RevType) at step 804. Then, CPU 11 stores in RAM 13 the classification values of PostType, iSpreadType, RevType and Tech calculated with respect to the musical-tone data stored in Array me [ ] at step 805, wherein these stored classification values are associated with the musical-tone data.

When it is determined at step 801 that iDist>0 is not true (NO at step 801), CPU 11 calculates RevType=iRType [p2] [p1] [f2] [f1] based on the table iRType [ ] [ ] [ ] [ ] [ ] at step 806. The table iRType [ ] [ ] [ ] [ ] [ ] includes the finger numbers and pitch values of adjacent musical notes, and is stored in RAM 13.

Hereinafter, values in the table iRType [ ] [ ] [ ] [ ] [ ] will be described briefly. The table iRType [ ] [ ] [ ] [ ] [ ] is used to store information indicating the finger numbers and the passing of one finger under or over another fingers to play the adjacent musical notes. In the present embodiment, when iDist≦0, this means that, when musical notes in the music progress in ascending scale, the finger of the finger number larger than 1 can pass under the finger of finger number "1", and, when musical notes in the music progress in descending scale, the finger of the finger number "1" can pass over the finger of finger number larger than 1.

In the present embodiment, in the case of the passing of one finger under another, that is, in the case of p2<p1, f2>1, f1=1, iRType [p2] [p1] [f2] [f1]=3 will be true. And in the case of the passing of one finger over another, that is, in the case of p2>p1, f2=1, f1>1, iRType [p2] [p1] [f2] [f1]=2 will be true. In general, since it is said that in the fingering technique, the passing of one finger under another is harder than the passing of one finger over another, RevType=3 will be set for the passing of one finger under another and RevType=2 will be set for the passing of one finger over another.

After step 806, CPU 11 sets a classification value of "PosType=1" to the classification item of the position type (PosType) and a classification value of "iSpreadType=1" to the classification item of the finger spreading type (iSpreadType) at step 807. Then, CPU 11 stores in RAM 13 the classification values of PostType, iSpreadType, RevType and Tech calculated with respect to the musical-tone data stored in Array me [ ] at step 805, wherein these stored classification values are associated with the musical-tone data.

A process is executed to increment values corresponding to the classification items set in the technique classifying process in a two-dimensional map iFMap [i] [j], where "i" denotes the classification item and "j" denotes a value given to each classification item (steps 506 to 512 in FIG. 5). As described above, four classification items, the positioning type (PosType), finger spreading type (iSpreadType), reversing type (RevType), or fingering technique type (Tech) are prepared in the present embodiment. Therefore, elements of the two-dimensional map iFMap [i] [j] correspond to the following classification items, respectively.

iFMap [0] [j], where j=a value of "PosType"
iFMap [1] [j], where j=a value of "iSpreadType"
iFMap [2] [j], where j=a value of "RevType"
iFMap [3] [j], where j=a value of "Tech"

As will be understood at steps 506, 508, 510 and 512, iFMap [i] [j] has no value, when j=0, and j=2, and iFMap [i] [j] has a value, only when j>1.

When PosType>1 (YES at step 506), CPU 11 increments the value of iFMap [0] [PosType] at step 507. When iSpreadType>1 (YES at step 508), CPU 11 increments the value of iFMap [1] [iSpreadType] at step 509. When RevType>1 (YES at step 510), CPU 11 increments the value of iFMap [2] [RevType] at step 511. When Tech>1 (YES at step 512), CPU 11 increments the value of iFMap [3] [Tech] at step 513.

CPU 11 increments the parameter iCnt indicating the number of notes at step 514, and stores the record of the next music data in Array me [ ] at step 515, and then returns to step 503.

When it is determined YES at step 503, CPU 11 initializes the parameters "i" and iFCost to "0" at step 601 In FIG. 6. CPU 11 judges at step 602 whether or not the parameter "i" is not less than 4, that is, whether or not i≧4 is true. The parameter "i" is used to specify "i" in iFMap [i] [j]. When it is determined at step 602 that i≧4 is not true, CPU 11 initializes the parameter "j" to "0" at step 603, and repeatedly performs processes at steps 605 to 607 until it is determined at step 604 that the parameter "j" becomes larger than a predetermined number.

CPU 11 judges at step 605 whether or not the map value iFMap [i] [j] is larger than "0". When it is determined that the map value iFMap [i] [j] is larger than "0" (YES at step 605), then CPU 11 adds a cost value iFCost [i] [j] corresponding to the map value iFMap [i] [j] to a value of the fingering difficulty level iFCost at step 606.

Hereinafter, the cost table (iFCost [ ] [ ] [ ]), in which the cost value iFcost [i] [j] is stored will be described. The cost table stores "i×j" pieces of cost values iFcost [i] [j] corresponding to cost values iFcost [i] [j], respectively. For example, iFCost [0] [j] has cost values corresponding respectively to values of "PosType" obtained at step 802 in the technique classifying process (FIG. 8), and has specified values of the respective position types. In the case of i≧1, iFCost [i] [j] has similar values.

In the present embodiment, as the values of the positioning type (PosType), finger spreading type (iSpreadType), reversing type (RevType), or fingering technique type (Tech) increase, the fingering difficulty level in the respective classification items increase. Therefore, as a value of "j" increases, the cost value iFCost [i] [j] increases.

In the present embodiment, if iFMap [i] [j]≧1, the cost value iFCost [i] [j] is added to the value of the fingering difficulty level iFCost independently of the number of the map values iFMap [i] [j]. In other words, the cost value iFCost [i] [j] is added regardless of the number of the map values. This is because of perception that, in the case one musical note having a value larger than 1 in iFMap [i] [j] exists in the classification item "i" (for example, in the Positioning type or Finger spreading type), the number of the musical note will have little influence on the cost value indication the difficulty level, since the difficulty level corresponding to the iFMap [i] [j] is included.

Of course, it is possible to weight iFCost [i] [j] to be added, depending on the map value iFMap [i] [j]. In this case, $i\text{Cost}=i\text{Cost}+f(iF\text{Cost}[i][j])\times iF\text{Cost}[i][j]$ As a variable iFCost [i] [j] increases, f (iFCost [i] [j]) increases, but "f" is a function decreases as the variable iFCost [i] [j] increases. For example, a logarithm function can be used as "f".

When it is determined at step 605 that the map value iFMap [i] [j] is not larger than "0" (NO at step 605), or when the process at step 606 has been finished, CPU 11 increments "j" at step 608, and returns to step 602.

As described above, in the present embodiment, when the map value iMap [i] [j] is not equivalent to "0" concerning the specific aspect of the classification item concerning fingering of some musical note included in music, the cost value iFCost [i] [j] corresponding to the specific aspect of the classification item is added to the fingering difficulty level iFCost.

Figure 10:
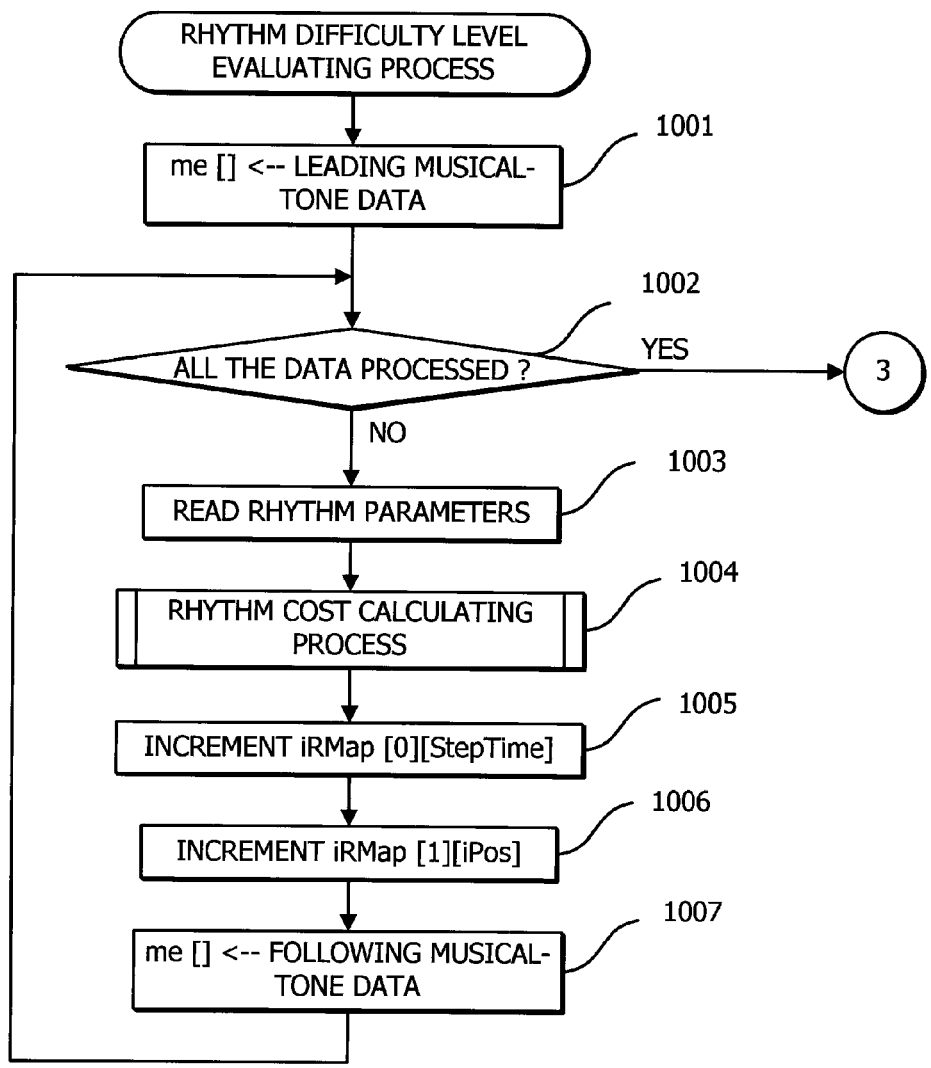
FIGS. 10 and 11 are flow charts of an example of a rhythm difficulty level evaluating process performed in the present embodiment.
Figure 11:
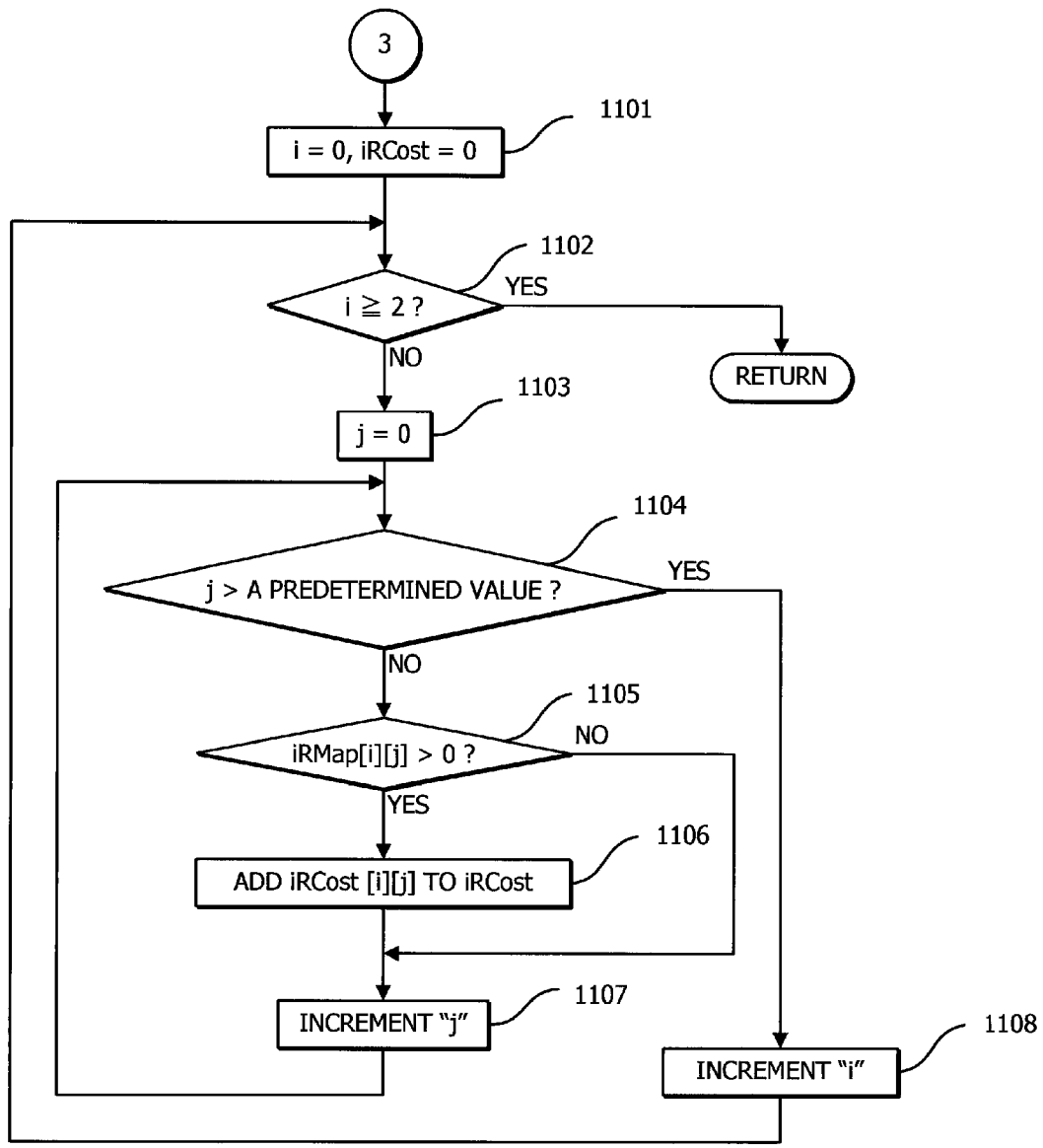

The rhythm difficulty level evaluating process (step 402 in FIG. 4) will be described in detail. FIGS. 10 and 11 are flow charts of an example of the rhythm difficulty level evaluating process performed in the present embodiment.

CPU 11 stores in Array me [ ] a record Note [0] of the first musical-tone data in the music data stored in RAM 13 at step 1001. CPU 11 repeatedly performs processes at steps 1003 to 1007 until the process has been finished concerning the records of all the musical-tone data in the music data (YES at step 1002).

CPU 11 obtains parameters (rhythm parameters) for rhythm evaluation stored in RAM 13 at step 1003. The rhythm parameters include iMeasLen indicating a length of one measure, and Resolution indicating a rhythm resolution. These parameters are used in a rhythm cost calculating process. CPU 11 performs the rhythm cost calculating process at step 1004.

Figure 12:
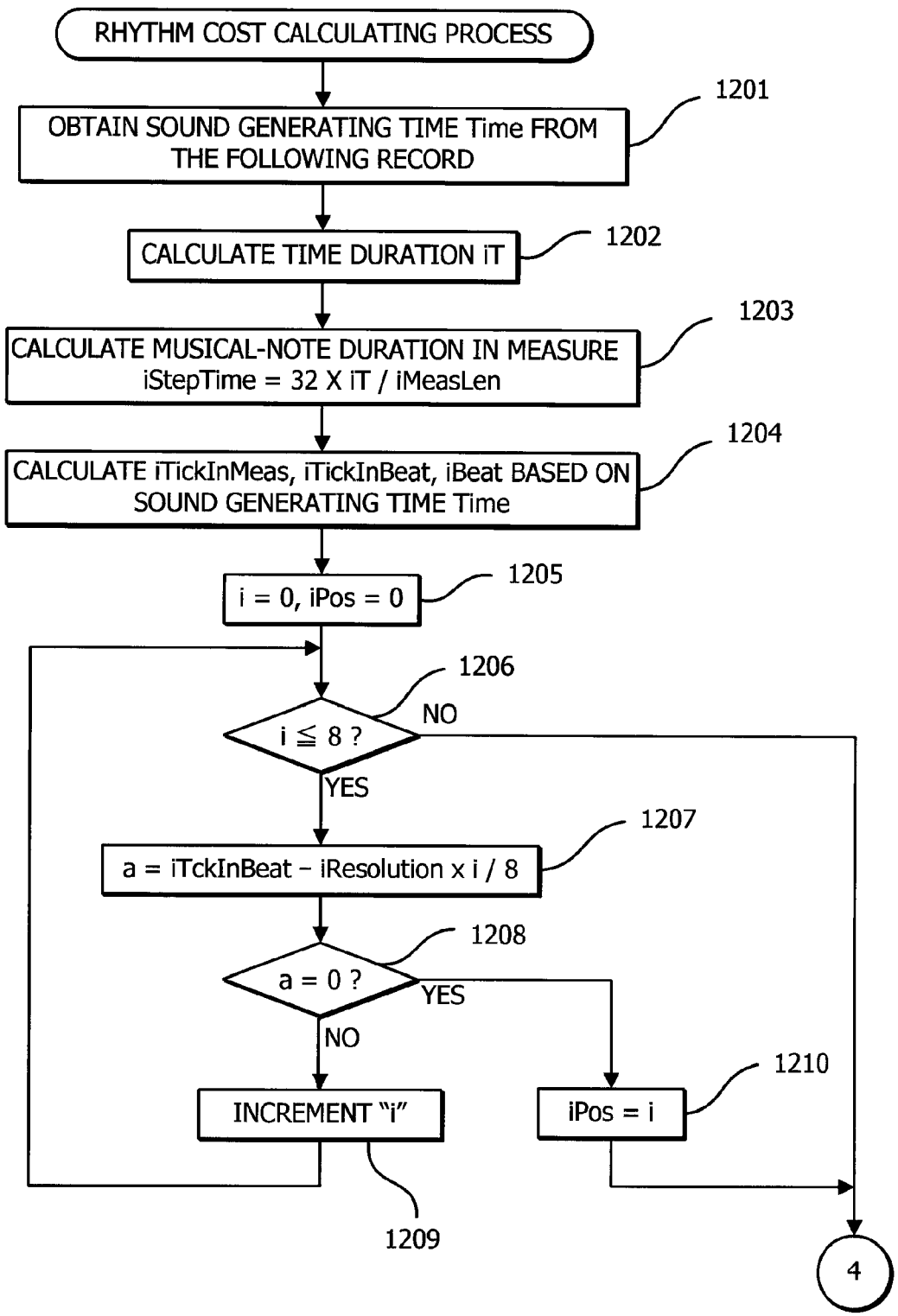
FIGS. 12 and 13 are flow charts showing an example of a rhythm cost calculating process performed in the present embodiment.
Figure 13:
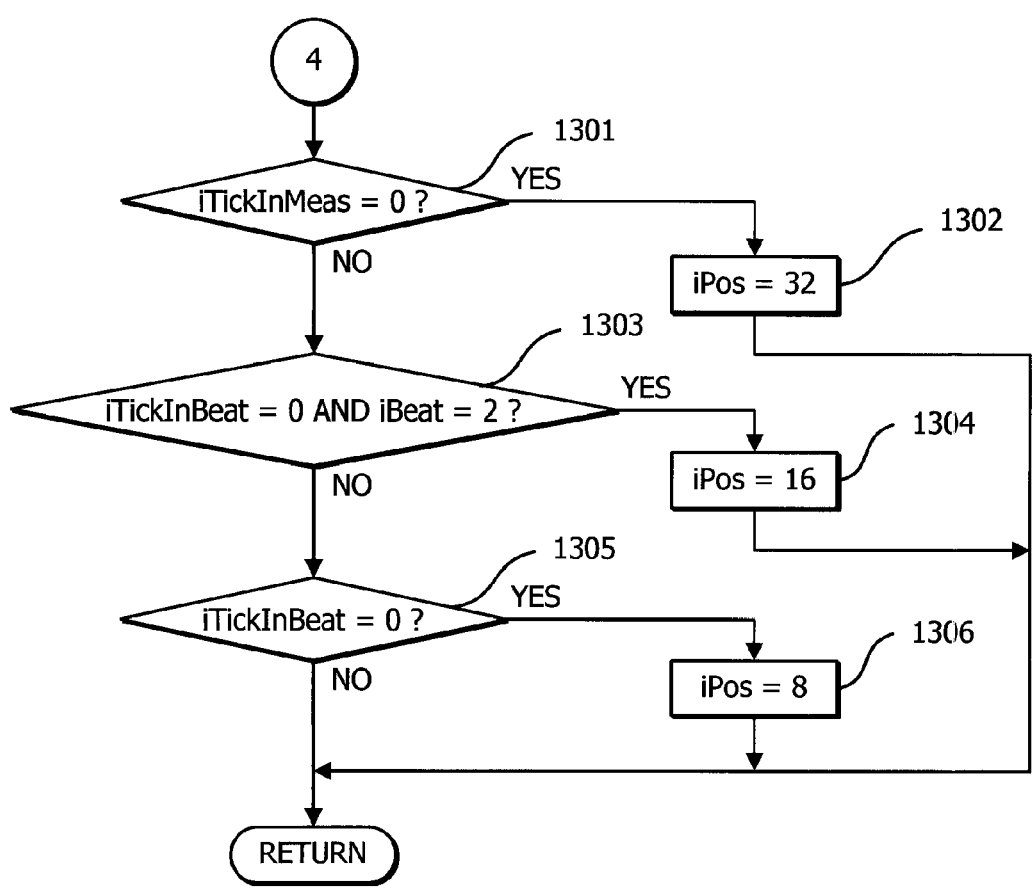

FIGS. 12 and 13 are flow charts showing an example of the rhythm cost calculating process performed in the present embodiment. In the rhythm cost calculating process, classification values of the classification item Step time (iStepTime) corresponding to a duration of a musical tone (the duration corresponds to a time length to the following musical tone) and classification values of the classification item Positions (iPos) corresponding to a position of the musical note in a measure are obtained.

CPU 11 refers to the following record in the musical tone-data indicated in Array me [ ] and obtains the sound generating time Time at step 1201. Then, CPU 11 calculates at step 1202 a time duration iT of the following musical note, using the sound generating time Time in Array me [ ] and the sound generating time Time in the record of the following sound generating data obtained at step 1201. Further, CPU 11 calculates a musical-note duration iStepTime in a measure having the time duration iT, usig the time duration iT and a time length of a measure iMeasLen at step 1203. The calculated musical-note duration iStepTime is a classification value in a classification item of musical-note length.

In the present embodiment, the musical-note duration iStepTime can be obtained as stated below.

$i\text{StepTime}=32\times iT/i\text{MeasLen}$

In the present embodiment, the music is in common measure, and iStepTime indicates how many thirty-second notes iT contains.

CPU 11 uses the sound generating time Time in Array me [ ], calculating positions of musical notes in a measure (iTickInMeas), positions of musical notes in a beat (iTickInBeat), and a beat iBeat, to which the musical notes belong at step 1204.

The calculated iTickInMeas indicates a position of a musical note in a measure. In other words, the calculated iTickInMeas indicates to what number thirty-second note from the leading note the musical note corresponds in one measure, when one measure is divided into thirty two durations. The calculated iTickInBeat indicates to what number thirty-second note from the leading note the musical note corresponds in one beat.

CPU 11 initializes the parameters "i" and iPos to "0" at step 1205. As far as the parameter "i" is less than 8 (YES at step 1206), processes at steps 1207 to 1210 are repeatedly performed. CPU 11 calculates an equation: a=iTickInBeat−irresolution×i/8 to specify the position of iTickInBeat at step 1207, wherein iTickInBeat takes either one of values from "0" to "7". Therefore, a=0 with "i" at one of "0" to "7", and it is determined at step 1208 that a=0 is true (YES at step 1208). When it is determined at step 1208 that a=0 is not true (NO at step 1208), CPU 11 increments the parameter "i" at step 1209, and returns to step 1206. When it is determined at step 1208 that a=0 is true (YES at step 1208), CPU 11 sets the parameter iPos=1 at step 1210.

When it is determined at step 1206 that the parameter "i" is not less than 8 (NO at step 1206), or after the process is performed at step 1210, CPU 11 advances to step 1301 in FIG. 13. In the present embodiment, when iTickInBeat is calculated at step 1204, quantization is effected to thirty-second note resolution. Therefore, it cannot be determined NO at step 1210, and in this case some sort of error has arisen in calculation.

The calculated iPos indicates to what number thirty-second note from the leading note the musical note corresponds to in one beat. In the present embodiment, the calculated iPos can be used with no modification made thereto, but iPos is given different values that indicate the leading position and central position in a measure and the leading position in a beat, respectively. When iTickInMeas=0, that is, when a musical note is placed at the leading position in a beat (YES at step 1301), CPU 11 sets iPos=32 at step 1302. When iTickInBeat=0 and iBeat=2, that is, when a musical note is placed at the leading position of the thirst beat (at the central position of a measure) (YES at step 1303), CPU 11 sets iPos=16 at step 1304. Further, when iTickInBeat=0, that is, when a musical note is placed at the leading position of the second or fourth beat (YES at step 1305), CPU 11 sets iPos=8 at step 1306.

The classification values of the classification item Position (iPos) obtained in the rhythm cost calculating process vary depending on positions of the musical note in a measure and will take following values:

When the musical note is at the leading position in a measure, iPos=32.

When the musical note is at the leading position in the third beat, iPos=16.

When the musical note is at the leading position in other beat (in the second or fourth beat), iPos=8.

When the musical note is at other position, iPos indicates a position indicated when a beat is evenly divided by 8.

The above values of iPos are calculated in an example in the music of a common time. In music of other beat (for example, in music of a three-four time), iPos takes other values. When the music is of a three-four time, the classification values of "iPos" can take the following values.

When the musical note is at the leading position in a measure, iPos=32.

When the musical note is at the leading position in other beat (in the second or fourth beat), iPos=8.

When the musical note is at other position, iPos indicates a position indicated when a beat is evenly divided by 8.

When the rhythm cost calculating process has finished, CPU 11 increments a two-dimensional map value, iMa [0] [iStepTime] at step 1005 in FIG. 10, and also increments iRMap [1] [iPos] at step 1006. Then, CPU 11 stores the record of the following music data in Array me [ ] at step 1007, and returns to step 1002.

When the process has been finished concerning the records of all the musical-tone data in the music data (YES at step 1002), CPU 11 initializes the parameters "i" and iRCost to "0" at step 1101 in FIG. 11. CPU 11 judges at step 1102 whether or not the parameter "i" is not less than 2. The parameter "i" specifies "i" in the parameter iRMap [i] [j]. When it is determined at step 1102 that the parameter "i" is less than 2 (NO at step 1102), CPU 11 initializes the parameter "j" to "0" at step 1103, and performs processes at steps 1105 to 1107 until the parameter "j" reaches a predetermined number at step 1104.

CPU 11 judges at step 1105 whether or not the map value iRMap [i] [j] is larger than "0". When it is determined at step 1105 that the map value iRMap [i] [j] is larger than "0" (YES at step 1105), CPU 11 adds the cost value iRCost [i] [j] corresponding to the map value iRMap [i] [j] to the value iRCost of the fingering difficulty level at step 1106.

Now, the cost table iRCost [ ] [ ], in which the cost value iRCost [i] [j] is stored will be described. In a similar manner to the cost table, in which the cost value iR [i] [j] concerning the difficulty level is stored, the cost table iRCost [ ] [ ] stores "i×j" pieces of cost values iRCost [i] [j] corresponding respectively to the cost values iRCost [i] [j]. For example, iRCost [0] [j] gives values corresponding respectively to musical-tone durations iStepTime obtained at step 1203 in the rhythm cost calculating process (FIG. 12), and the values are specific for respective musical-tone durations. iRCost [i] [j] gives values corresponding respectively to musical-tone positions iStepTime obtained at steps 1210, 1302, 1304, and 1306 in the rhythm cost calculating process (FIG. 13), and the values are specific for respective musical-tone positions.

For example, in iRCost [0] [iStepTime], the cost value iRCost [0] [iStepTime] increases with iStepTime=32, 16, 8, 4 and other value. In other words, when a musical note is a whole note, the cost value iRCost [0] [32] takes the smallest value, and the cost value increases as a half note, quarter note, eighth note or other note is placed.

In iRCost [1] [iPod], the cost value iRCost [1] [iPod] increases with iPos=32, 16, 8 and other value. In other words, when a musical note is placed at the leading position in a measure, the cost value iRCost [1] [32] is the smallest, and as the musical note is placed at the leading position in the third beat, at the leading position in the second beat, or at the leading position in the fourth beat, the cost value increases.

In a similar manner to calculation of the cost of fingering difficulty level, if iRMap [i] [j]≧1, the cost value iRCost [i] [j] is added to the value of rhythm difficulty level iRCost independently of the number of the map values iRMap [i] [j]. In other words, the cost value iRCost [i] [j] is added regardless of the number of the map values.

When it is determined at step 1105 that the map value iRMap [i] [j] is not larger than "0" (NO at step 1105), or after the process is performed at step 1106, CPU 11 increments the parameter "j" at step 1107, and returns to step 1104. When it is determined at step 1104 that the parameter "j" is larger than the predetermined number (YES at step 1104), CPU 11 increments the parameter "i" at step 1108, and returns to step 1102.

In the present embodiment, concerning a rhythm, particularly, duration and position of a musical note, the relevant cost values iRCost [i] [j] are added to the rhythm difficulty level iRCost.

Figure 14:
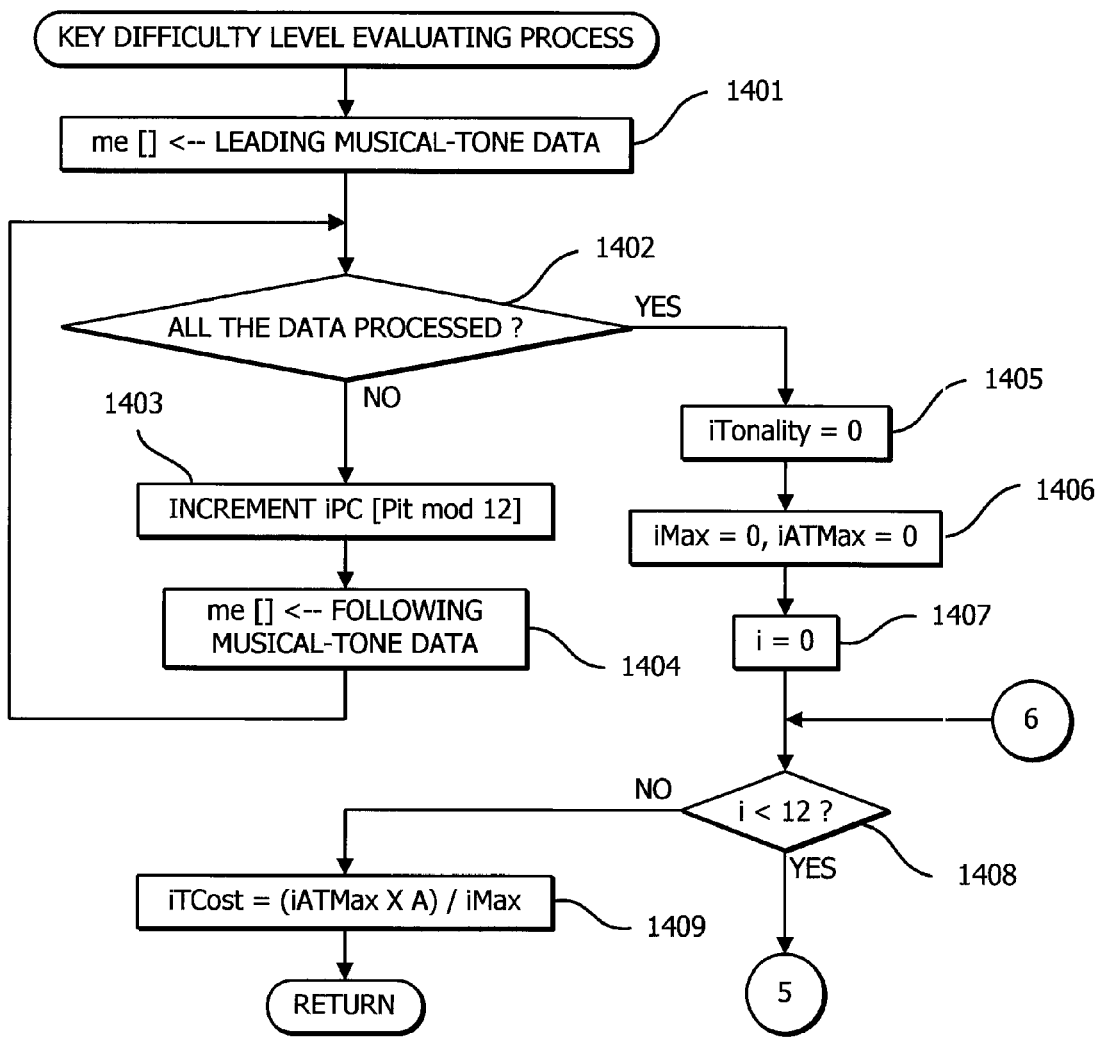
FIGS. 14 and 15 are flow charts showing an example of a key difficulty level evaluating process performed in the present embodiment.
Figure 15:
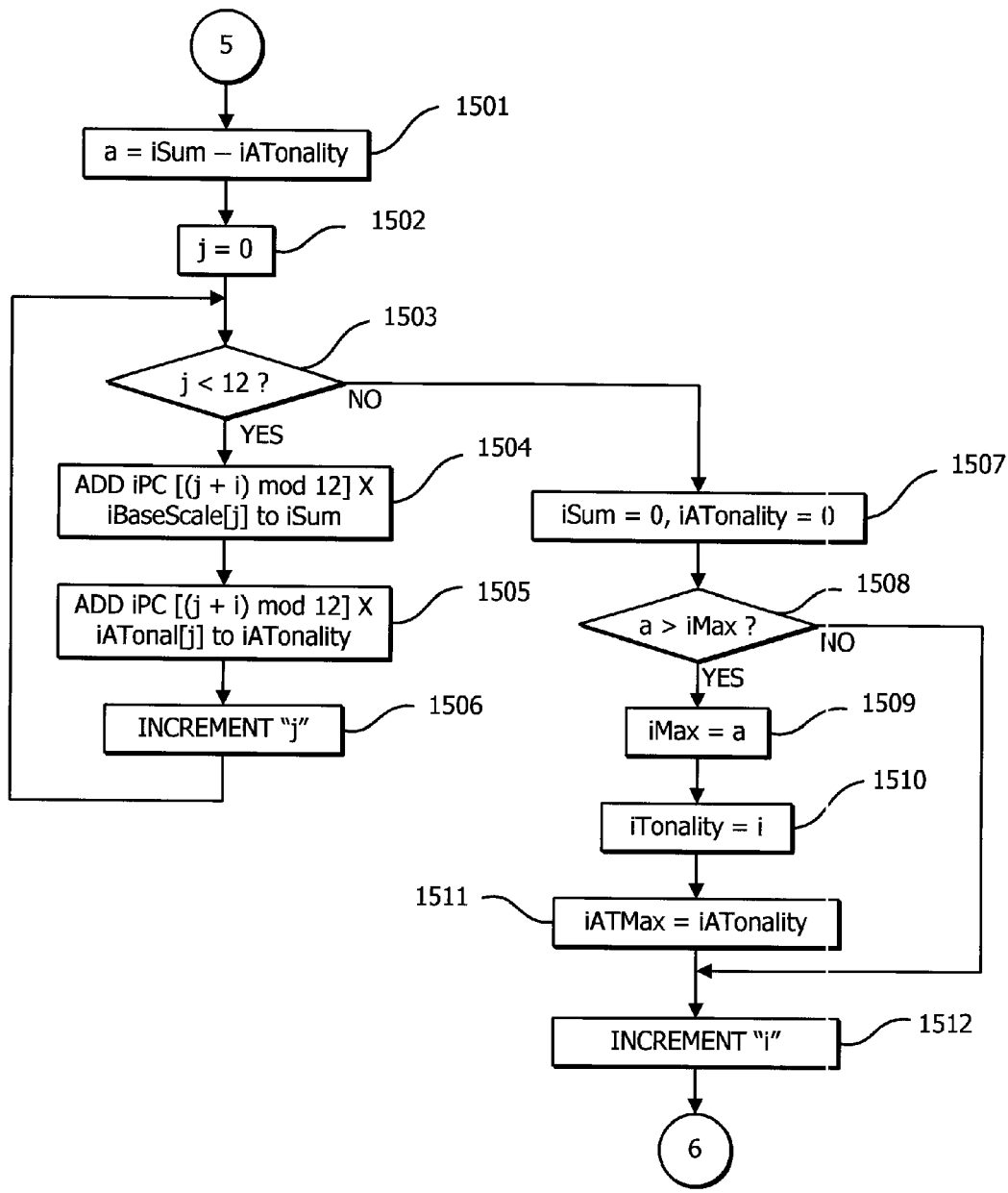

The key difficulty level evaluating process (step 402 in FIG. 4) will be described in detail. FIGS. 14 and 15 are flow charts showing an example of the key difficulty level evaluating process performed in the present embodiment. CPU 11 stores in Array me [ ] a record of the first musical-tone data at step 1401 in FIG. 14. CPU 11 repeatedly performs processes at step 1403 and step 1404 until the process has been finished concerning the records of all the musical-tone data in the music data (YES at step 1402).

CPU 11 increments a count value iPC [Pit mod 12] based on the pitch information "Pit" in Array me [ ] at step 1403. The count value iPC [Pit mod 12] corresponding to either one of the names of musical note from "C" to "B" is incremented at step 1403. CPU 11 stores the record of the next musical-tone data in Array me [ ] at step 1404, and returns to step 1402. An Array iPC [ ], which stores an accumulated value of the pitch names of musical notes retained in the music, is obtained in the processes at steps 1402 to 1404.

When it is determined at step 1402 that the process has been finished concerning the records of all the musical-tone data in the music data (YES at step 1402), CPU 11 initializes parameters iTonality, iMax, iATMax and "i" to "0" at steps 1405 to 1407. CPU 11 repeatedly performs processes at steps 1501 to 1512 in FIG. 15 until the parameter "i" becomes 12 or larger (NO at step 1408).

CPU 11 initializes parameters iSum and iATonality to "0" as shown in FIG. 15. The parameter iSum is a parameter indicating a degree of coincidence between the accumulated value of the pitch names of musical notes retained in the music and the major scale of each key. The parameter iATonality is a parameter indicating a degree of inconsistency between the accumulated value of the pitch names of musical notes retained in the music and the major scale of each key. In the present embodiment, in the music of a major scale, the degree of coincidence and the degree of inconsistency between the accumulated value of the pitch names of musical notes retained in the music and the major scale of each key are found. But in music of a minor scale, the degree of coincidence and the degree of inconsistency between the accumulated value of the pitch names of musical notes retained in the music and the minor scale of each key are found.

CPU 11 initializes the parameter "j" to "0" at step 1502. When the parameter "j" is smaller than 12 (YES at step 1503), CPU 11 adds iPC [(j+i) mod 12]×iBaseScale [j] to iSume at step 1504. And CPU 11 adds iPC [(j+i) mod 12]×iATonal [j] to iATonality at step 1505. Then, CPU 11 increments the parameter "j" and returns to step 1503.

FIG. 17A is a view showing an example of a base scale array iBaseScale [ ] in the present embodiment. As shown in FIG. 17A, the base scale array iBaseScale [ ] (Reference number: 1701) has 11 elements (J=0 to 11), and the elements (J=0, 2, 4, 5, 7, 9 and 11) corresponding to the pitch names of major scale are given "1" and other elements are given "0". In FIG. 17A, symbols such as numbers, ♭ (flat), ♯ (sharp) placed on the top of the elements in the array indicate duration (s) from the leftmost element (j=0, radical note). FIG. 17B is a view showing an example of non base scale array iATonal [ ] in the present embodiment. As shown in FIG. 17B, the non base scale array iATonal [ ] (Reference number: 1702) has 11 elements (J=0 to 11), and the elements (J=1, 3, 6, 8, and 10) not corresponding to the pitch names of major scale are given "1" and other elements are given "0".

Now, a value that is to be added to iSum at step 1504, that is, a value iPC [(j+i) mod 12]×iBaseScale [j] will be described. FIG. 18 is a view showing an example of the array iPC [ ] (Reference number: 1801) and the base scale array iBaseScale [ ] (Reference number: 1802), obtained in the processes at steps 1402 to 1404 in FIG. 14.

In iPC [(j+i) mod 12]×iBaseScale [j], when i=0, the value will take a value other than 0 for j=0, 2, 4, 5, 7 and 9, and when the processes have been performed with respect to all the parameter values "j", the final value of iSum will be given by the following formula.

$$iSum = \Sigma(iPC[j \bmod 12] \times iBaseScale[j])$$
$$= 7 + 2 + 3 + 10 + 4 + 5 = 31$$

When i=1, the value will take a value other than 0 for j=4, 5, 9 and 11, and when the processes have been performed with respect to all the parameter values "j", the final value of iSum will be given as follows:

$iSum=1+3+5+8=17$

When i=5, the value will take a value other than 0 with j=0, 2, 4, 5, 7, 9 and 22, and when the processes have been performed with respect to all the parameter values "j", the final value of iSum will be given as follows:

$iSum=10+4+5+8+7+2+3=39$

When i=7, the value will take a value other than 0 with j=0, 2, 5, 7 and 9, and when the processes have been performed with respect to all the parameter values "j", the final value of iSum will be given as follows:

$iSum=4+5+7+2+3=22$

Operation of adding iPC (j+i mod 12)×iAtonal [j] to iATonality will be performed in a similar manner to the operation of iSum.

Figure 19:
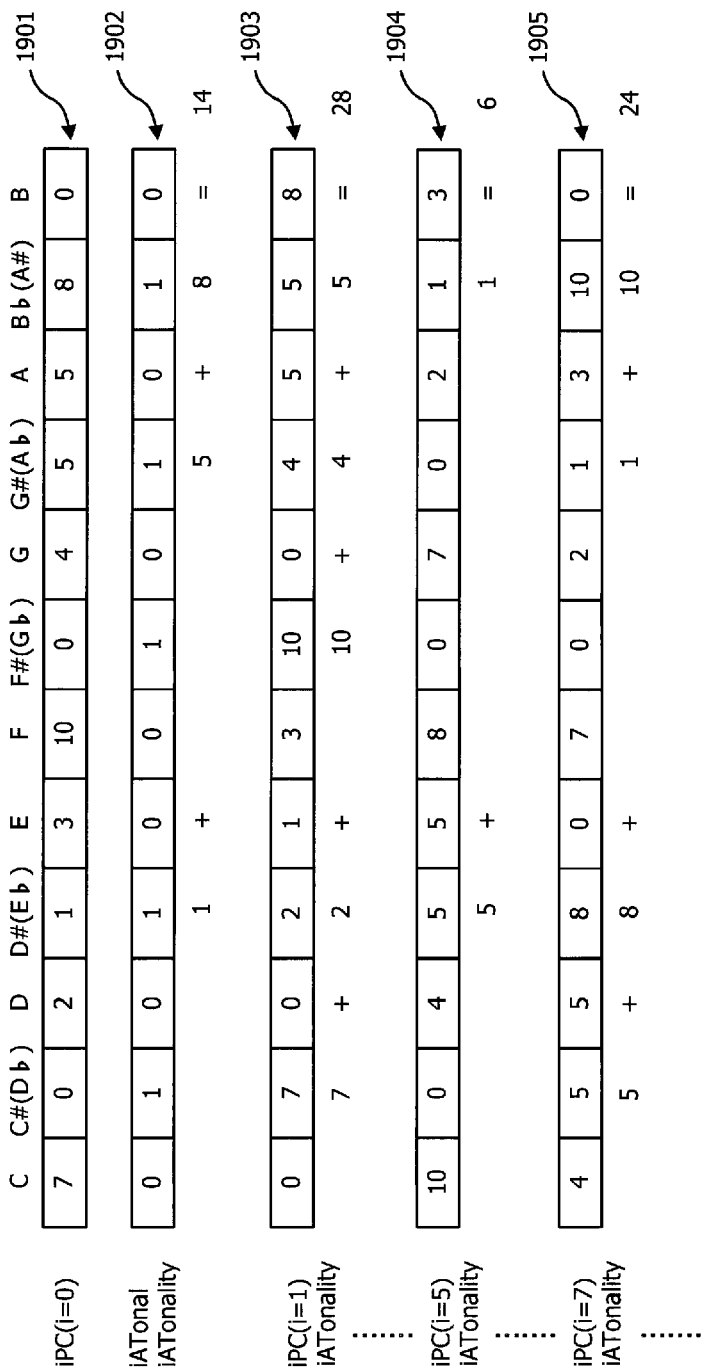
FIG. 19 is a view showing an example of the array iPC [ ] and an example of the base scale array iBaseScale [ ].

FIG. 19 is a view showing an example of the array iPC [ ] (Reference number: 1901) obtained in the processes at steps 1402 to 1404 in FIG. 14 and an example of the non base scale array iATonlity [ ] (Reference number: 1902). In FIG. 19, similar reference numbers represent similar arrays iPC [ ] in FIG. 18.

When i=0, the final value of iATonality will be given as follows:

$$iATonality = \Sigma(iPC[j \bmod 12] \times iATonal[j])$$
$$= 1 + 5 + 8 = 14$$

When i=1, the final value of iATonality will be given as follows:

$iATonality=7+2+10+4+5=28$ (Reference number: 1903)

When i=5, the final value of iATonality will be given as follows:

$iATonality=5+1=6$ (Reference number: 1904)

When i=7, the final value of iATonality will be given as follows:

$iATonality=5+8+1+10=24$ (Reference number: 1905)

When it is determined at step 1503 in FIG. 15 that the parameter "j" is not smaller than 12 (NO at step 1503), that is, when values of iSum and iATonality have been calculated for j=0 to 11 with respect to a specific "i", CPU 11 calculates a difference "a" (=iSum–iATonality) between the degree of coincidence iSum and the degree of inconsistency iATonality at step 1507.

CPU 11 judges at step 1508 whether or not the difference "a" calculated at step 1507 is larger than the maximum value iMax of the difference "a" stored in RAM 13. When it is determined at step 1508 that the calculated difference "a" is larger than the maximum value iMax of the difference "a" stored in RAM 13 (YES at step 1508), CPU 11 sets the calculated difference "a" as the maximum value iMax at step 1509, and sets "i" to the parameter iTonality indicating a key at which the maximum value iMax of the difference "a" is obtained (step 1510). Further, CPU 11 sets the obtained degree of inconsistency iATonality as the degree of inconsistency iATMax at which the maximum value of iSum is obtained (step 1514).

When it is determined at step 1508 that the calculated difference "a" is not larger than the maximum value iMax of the difference "a" stored in RAM 13 (NO at step 1508), or after the process is performed at step 1511, CPU 11 increments the parameter "i" at step 1512 and returns to step 1408. When it is determined at step 1408 that the parameter "i" is not larger than 12 (NO at step 1408), CPU 11 calculates the key difficulty level iTCost as stated below at step 1409.

$$iTCost=(iATMax \times A)/iMax$$

where "A" is a constant. The key difficulty level iTCost is given by a product of the constant "A" and a ratio of iATonality to a difference between iSum and iATonality, wherein iATonality is the degree of inconsistency and iSum is the degree of coincidence, respectively at which a degree of key coincidence of key becomes maximum.

As described above, when the fingering difficulty level iFCost, rhythm difficulty level iRCost, key difficulty level iTCost have been calculated, a difficulty level of music iCost is calculated based on these difficulty levels and the number of notes iCnt retained in the music, as stated below.

$$iCost=iFCost \times RF + iRCost \times RR + iTCost \times RT + iCnt \times RC$$

Now, a difficulty level displaying process in the present embodiment will be described. When the difficulty level evaluating process has finished at step 204 in FIG. 2, and when no new music has been specified at step 202 (NO at step 202), CPU 11 performs the difficulty level displaying process at step 205. In the difficulty level displaying process at step 205, a musical score is produced, in which a symbol indicating a difficulty level is attached to each musical note, and the musical score is displayed on the screen of the displaying device 16. In the present embodiment, the musical score retains the fingering difficulty levels attached to musical notes.

Figure 20:
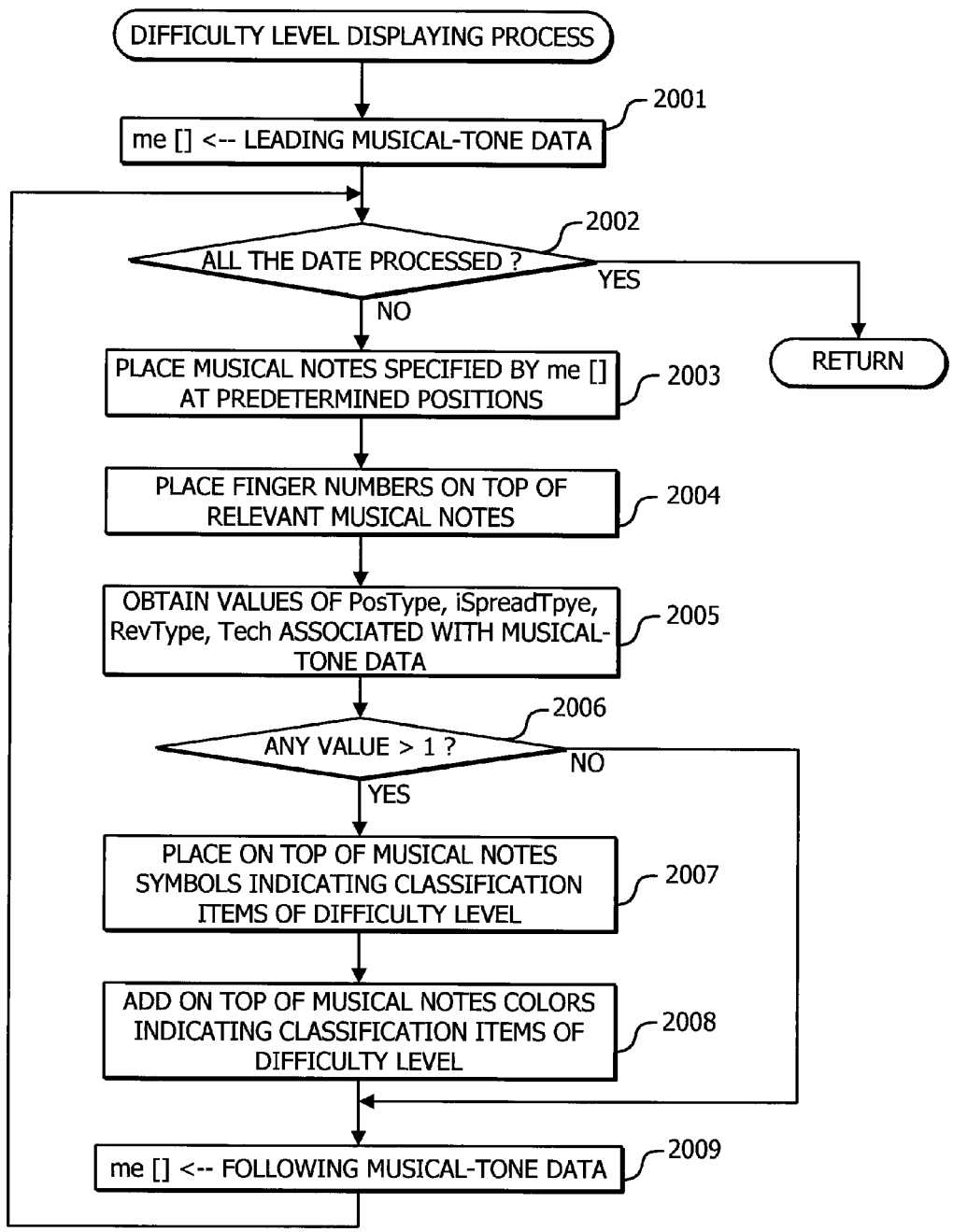
FIG. 20 is a flow chart showing an example of a difficulty level displaying process performed in the present embodiment.

FIG. 20 is a flow chart showing an example of the difficulty level displaying process performed in the present embodiment. CPU 11 stores in Array me [ ] the record of the first musical-tone data at step 2001 in FIG. 20. CPU 11 repeatedly performs processes at step 2003 and step 2009 until the process has finished concerning the records of all the musical-tone data in the music data (YES at step 2002).

CPU 11 places musical notes of a predetermined duration at predetermined positions in a musical score displayed on the screen of the displaying device 16 in accordance with the pitch information "Pitch", sound timing "Time", sounding duration "Gate" stored in Array me [ ] at step 2003. CPU 11 places the finger numbers on the top of musical notes displayed on the screen of the displaying device 16 in accordance with the fingering information "Fig" stored in Array me [ ] at step 2004. Then, CPU 11 obtains classification values of classification items Positioning type (PosType), Finger spreading type (iSpreadType), Reversing type (RevType), and Fingering technique type (Tech) associated with the music data specified in Array me [ ] and stored in RAM 13 (step 2005).

CPU 11 judges at step 2006 whether or not any one of the above classification values is larger than 1. When it is determined at step 2006 that one of the classification values is larger than 1 (YES at step 2006), then CPU 11 places symbols indicating the corresponding classification items on the top of musical notes at step 2007. For example, if PosType>1, a symbol "P", if iSpreadType>1, a symbol "S", if RevType>1, a symbol "R", and if TecType>1, a symbol "T" are placed on the top of musical notes on the screen of the displaying unit 16, respectively.

CPU 11 adds colors corresponding to the classification items to the musical notes at step 2008. For instance, if PosType>1, "red" color, if iSpreadType>1, "aqua" color, if RevType>1, "yellow-green" color, and if TecType>1, "pink" color are added to the musical notes. If PosType>1 and iSpreadType>1, the cost value of PosType, iFCost [0] [PosType] and the cost value of iSpreadType, iFCost [1] [ispreadType] are compared, and the color corresponding to the classification item having the larger cost value is selected.

Then, CPU 11 stores the record of the next musical-tone data in Array me [ ] at step 2009, and returns to step 2002.

Figure 21:
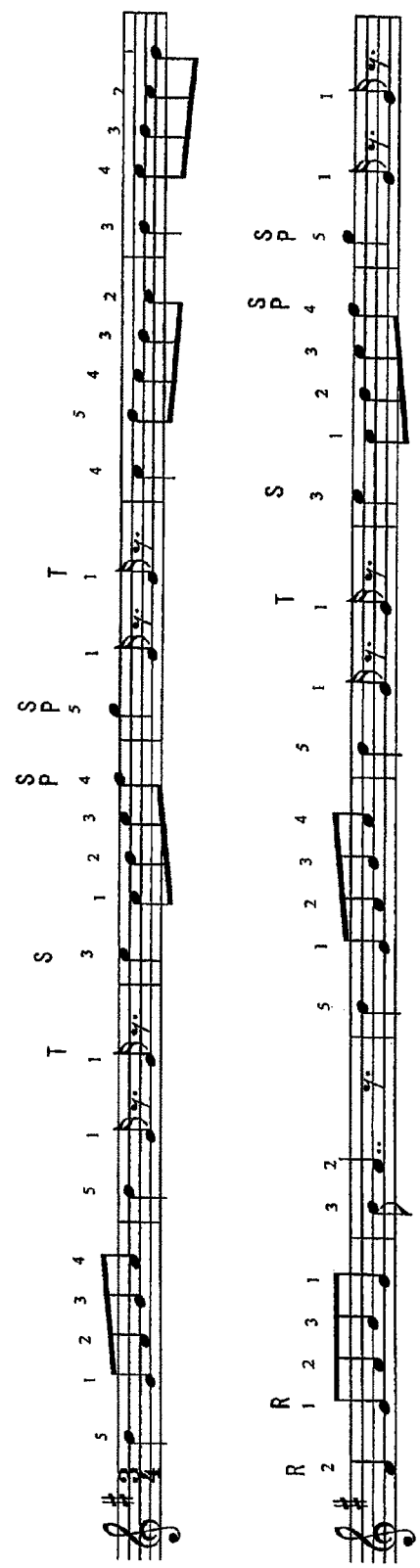
FIG. 21 is a view showing an example of a musical score produced in the difficulty level evaluating process in the present embodiment.

FIG. 21 is a view showing an example of the musical score produced on the screen of the displaying device 16 in the difficulty level evaluating process performed in the present embodiment. In the musical score shown in FIG. 21, the finger numbers 1 to 5 are displayed on the top of musical notes, and further the symbols "P", "S", "R", and "T" corresponding to classification items are attached on the top of specific musical notes. Though not appeared in FIG. 21, the relevant color, pink color is attached to the musical note with the symbol "T" attached (for instance, "G4" at the third beat in the second measure). Similarly, the relevant color, aqua color is attached to the musical note with the symbol "S" attached (for instance, "E5" at the first beat in the third measure), and the relevant color, yellow-green color is attached to the musical not, with the symbol "R" attached (for instance, "F♯4" at the first beat in the seventh measure and "G4" at second beat in the seventh measure).

To the musical note with both the symbols "S" and "P" attached (for instance, "F♯5" at the 3.5 beat in the third measure and "G5" at first beat in the fourth measure) is attached the color (in this case, red color) corresponding to the classification item (in this case, PosType) of larger cost value.

In the present embodiment as described above, CPU 11 performs the following difficulty level calculating processes. That is, based on the pitch information and fingering information, the fingering difficulty level calculating process is performed for calculating a difficulty level of fingering to play adjacent musical notes: based on time information of musical notes, the rhythm difficulty level calculating process is performed for calculating a rhythm difficulty level concerning musical-tone duration and musical-tone timing: based on the pitch information of musical tones, the key difficulty level calculating process is performed for calculating a key difficulty level concerning a key of the music: and based on the fingering difficulty level, rhythm difficulty level and key difficulty level, the whole difficulty level calculating process is performed for calculating a whole difficulty level of the music. Therefore, a difficulty level of music can be calculated in consideration of elements including not only fingering but also rhythm and key of music.

In the fingering difficulty level calculating process performed in the present embodiment, CPU 11 obtains the following classification values. That is, CPU 11 obtains the first classification value indicating a specific state in the first classification item, with respect to the first classification item (PosType) concerning fingering positions to play adjacent musical notes: the second classification value indicating a specific state in the second classification item, with respect to the second classification item (iSpreadType) concerning finger spreading to play adjacent musical notes: the third classification value indicating a specific state in the third classification item, with respect to the third classification item (RevType) concerning finger passing over or under another on the keyboard: and the fourth classification value indicating a specific state in the fourth classification item, with respect to the fourth classification item (Tech) concerning finger changing to play adjacent musical notes. Further, CPU 11 obtains cost values iFCost [i] [j] concerning specific states in the classification items from the cost table iFCost [ ] [ ] of a storing device, and accumulates the cost values, obtaining the accumulated cost value as the fingering difficulty level iFCost, wherein the cost table iFCost [ ] [ ] stores the cost values concerning specific states in the classification items based on the classification values (PostType, iSpredType, RevType, Tech) in the respective classification items.

As described above, the cost values can be obtained based on specific states in various classification items for defining fingering. Therefore, an appropriate difficulty level can be calculated in accordance with practical difficulties involved in fingering.

In the present embodiment, in obtaining the classification values of the first classification item, CPU 11 increases the corresponding count value iFMap [i] [j] with respect to each musical note in a count map iFMap [ ] [ ] when the classification value is a predetermined value in the classification item, wherein the count map iFMap [ ] [ ] stores the count values of the classification values in the classification item. Further, in accumulating the cost values, CPU 11 refers to the count value iFMap [i] [j] in the count map iFMap [ ] [ ], and adds the corresponding cost value iFCost [i] [j] to iFCost when the count value is not less than 1. Therefore, the cost values stored in the cost table iFCost [ ] [ ] allows to obtain cost values appropriate for a specific state in the classification item.

In the rhythm difficulty level calculating process in the present embodiment, CPU 11 obtains the fifth classification value indicating a specific state in the fifth classification item with respect to the fifth classification item (iStepTime) concerning the duration of musical note, and the sixth classification value indicating a specific state in the sixth classification item with respect to the sixth classification item (iPos) concerning a position of a musical note in a measure.

CPU 11 obtains the cost values iRCost [i] [j] concerning specific states in the classification items from the cost table iRCost [ ] [ ] of the storing device, based on the classification values of the respective classification items, wherein the cost table iRCost [ ] [ ] stores the cost values concerning specific states in the classification items. CPU 11 accumulates the cost values and obtains the accumulated cost value as the rhythm difficulty level iRCost.

As described above, the cost values can be obtained based on specific states in various classification items for defining rhythm of musical tones. Therefore, an appropriate difficulty level can be calculated in accordance with a difficulty degree in rhythm involved in practical performance.

In the key difficulty level calculating process in the present embodiment, CPU 11 specifies a key of music based on the pitch information of musical notes, and calculates the key difficulty level based on the degree of coincidence iSum between the scale of the specified key and the pitch of musical note in the music and the degree of inconsistency iATonality between the scale of the specified key and the pitch of musical note in the music. Therefore, not only the key difficulty level but also the key difficulty level based on a relationship between musical notes and musical scale in the music can be obtained.

Particularly in the present embodiment, at the key difficulty level calculating step, CPU 11 calculates the key difficulty level based on the proportion of the degree of inconsistency iATonality to the difference (iSum−iATonality) between the degree of coincidence iSum and the degree of inconsistency iATonality. Therefore, a key difficulty level more appropriate for the music can be obtained.

Further, in the present embodiment, in the difficulty level displaying process, when the classification values of the classification items concerning the fingering associated with each of musical notes composing the music are a predetermined value, CPU 11 produces image data of a musical score including symbols indicating that the musical notes correspond to the classification items, and displays the image data on the screen of the displaying unit 16, whereby an operator (player) can easily confirm musical notes of a predetermined difficulty level in fingering when playing the music.

Figure 22:
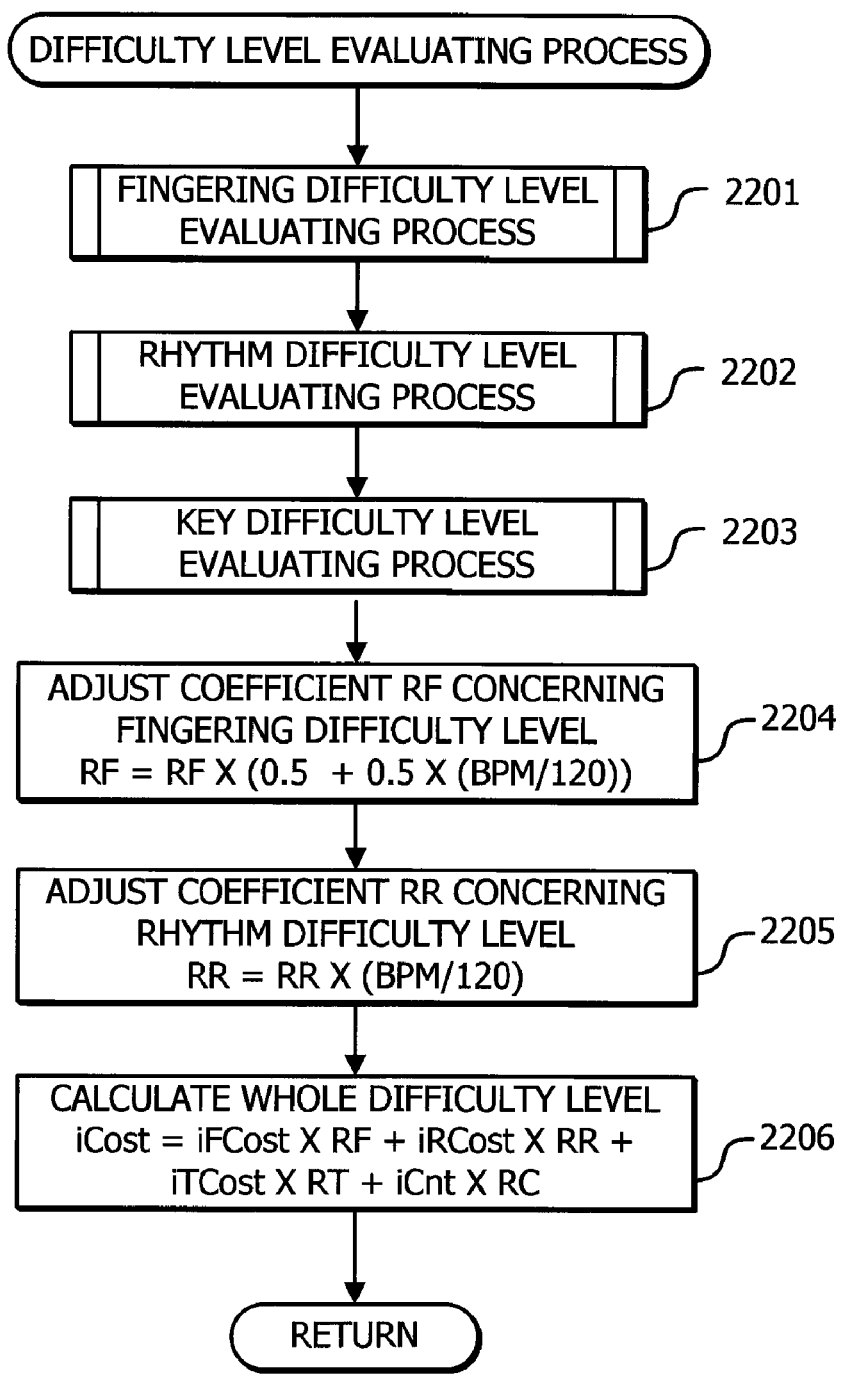
FIG. 22 is a flow chart of the difficulty level evaluating process performed in the second embodiment.

Now, the second embodiment of the invention will be described. In the difficulty level calculating process (at step 204 in FIG. 2) in the second embodiment, the difficulty level calculation of a music tempo has been finished in the whole difficulty level calculation. In the second embodiment, a value BPM (Beat per Minute) indicating a music tempo is included in the music data. FIG. 22 is a flow chart of the difficulty level evaluating process in the second embodiment. Processes at steps 2201 to 2203 in FIG. 22 are substantially the same as the processes at steps 401 to 403 in FIG. 4. Therefore, the fingering difficulty level iFCost, rhythm difficulty level iRCost, and the key difficulty level iTCost are calculated in substantially the same manner as calculated in the first embodiment.

When the processes at steps 2201 to 2203 has been performed, CPU 11 adjusts a coefficient RF concerning the fingering difficulty level at step 2204. In the second embodiment, the coefficient RF is adjusted in accordance with the following equation.

$$RF = RF \times (0.5 + 0.5 \times (BPM/120))$$

The coefficient RF is adjusted by weighting the half of RF with BPM/120 based on the ratio of music tempo with a standard tempo of 120 (120 beats/minute).

CPU 11 adjusts a coefficient RR concerning the rhythm difficulty level at step 2205. In the second embodiment, the coefficient RR is adjusted in accordance with the following equation.

$$RR = RR \times BPM/120$$

The coefficient RR is adjusted by adding weight to RR, wherein the ratio of music tempo is set as weight with the standard tempo of 120 (120 beats/minute). The coefficient RR in the rhythm difficulty level is set to affect the coefficient more directly than coefficient RF in the fingering difficulty level.

CPU 11 calculates the difficulty level of music ICost, that is, CPU 11 multiplies the calculated fingering difficulty level iFCost, rhythm difficulty level iRCost, key difficulty level iTCost and the number of notes in music by the adjusted weighting coefficients RF and RR, and predetermined weighting coefficients RT and RC, respectively, and adds the products, thereby obtaining the difficulty level of music iCost at step 2206.

In the whole difficulty level calculating process in the second embodiment, CPU 11 gives the fingering difficulty level iFCost and the rhythm difficulty level iRCost weight corresponding to a music tempo BPM, and calculates the whole difficulty level from the weighted fingering difficulty level and rhythm difficulty level. Therefore, a more appropriate difficulty level can be calculated with a music tempo taken into consideration.

It will be understood that the present invention is not limited to the particular embodiments described herein, but numerous rearrangements, modifications, and substitutions can be made to the embodiments without departing from the scope of the invention. The following claims are intended to encompass all such modifications.

For example, in the difficulty level displaying process in the first embodiment, classification values of classification items concerning the fingering difficulty levels of respective musical notes are stored in RAM 13, and the fingering difficulty level of each musical note is displayed. But other difficulty level, for example, the rhythm difficulty level can be displayed.

Figure 23:
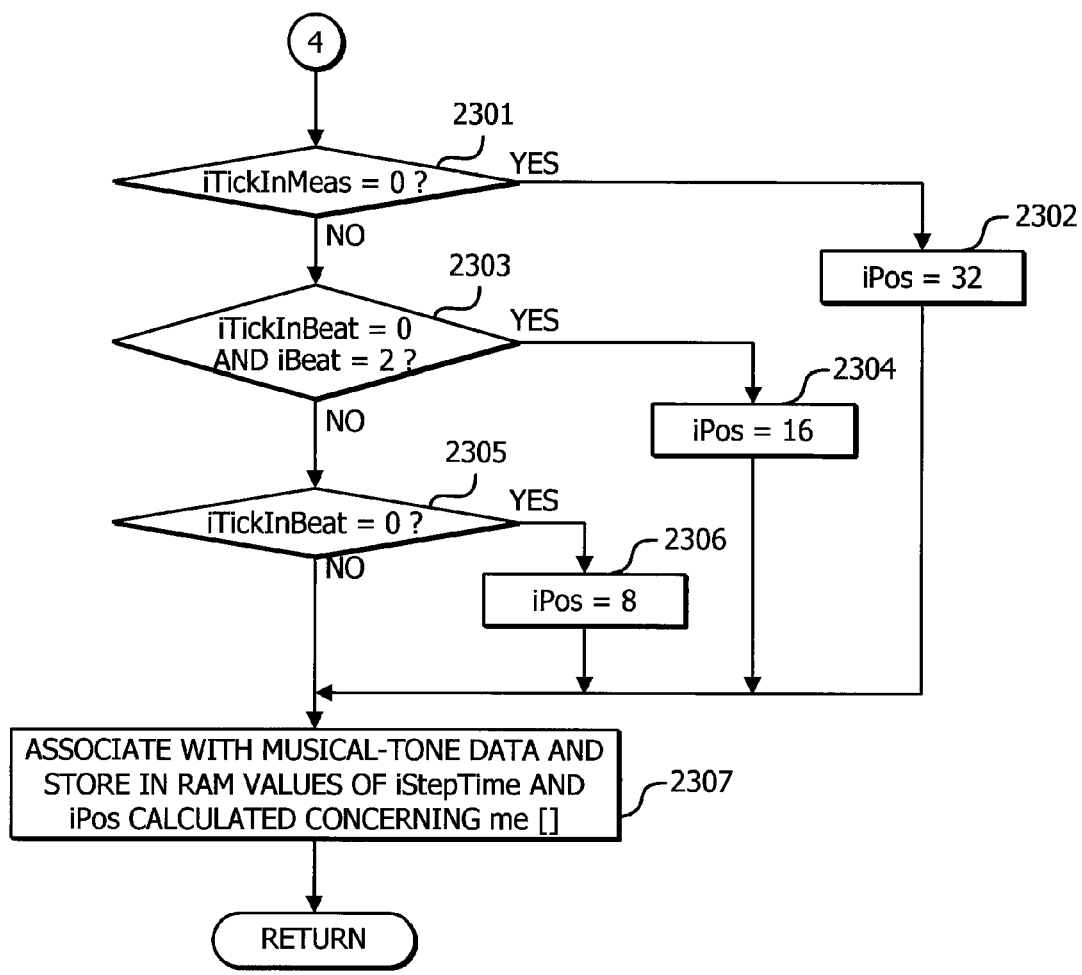
FIG. 23 is a flow chart of the rhythm cost calculating process in the third embodiment.

FIG. 23 is a flow chart of a later half of the rhythm cost calculating process in the third embodiment of the invention. When it is determined at step 1206 in FIG. 12 that the parameter "i" is not less than 8 (NO at step 1206), or after the process is performed at step 1210, a process is performed at step 2302 in FIG. 23. The processes at step 2301 to step 2306 in FIG. 23 are substantially the same as those at step 1301 to step 1306 in FIG. 13. When processes have been finished at steps 2302, 2304 and 2306, or when it is determined that iTickInBeat=0 is not true (NO at step 2305), CPU 11 stores classification values iStepTime and iPos in association with the relevant musical-tone data in RAM 13 at step 2307, wherein iStepTime indicates a musical-tone duration calculated with respect to musical-tone data stored in Array me [ ] and iPos indicate a position of a musical note in a measure.

Figure 24:
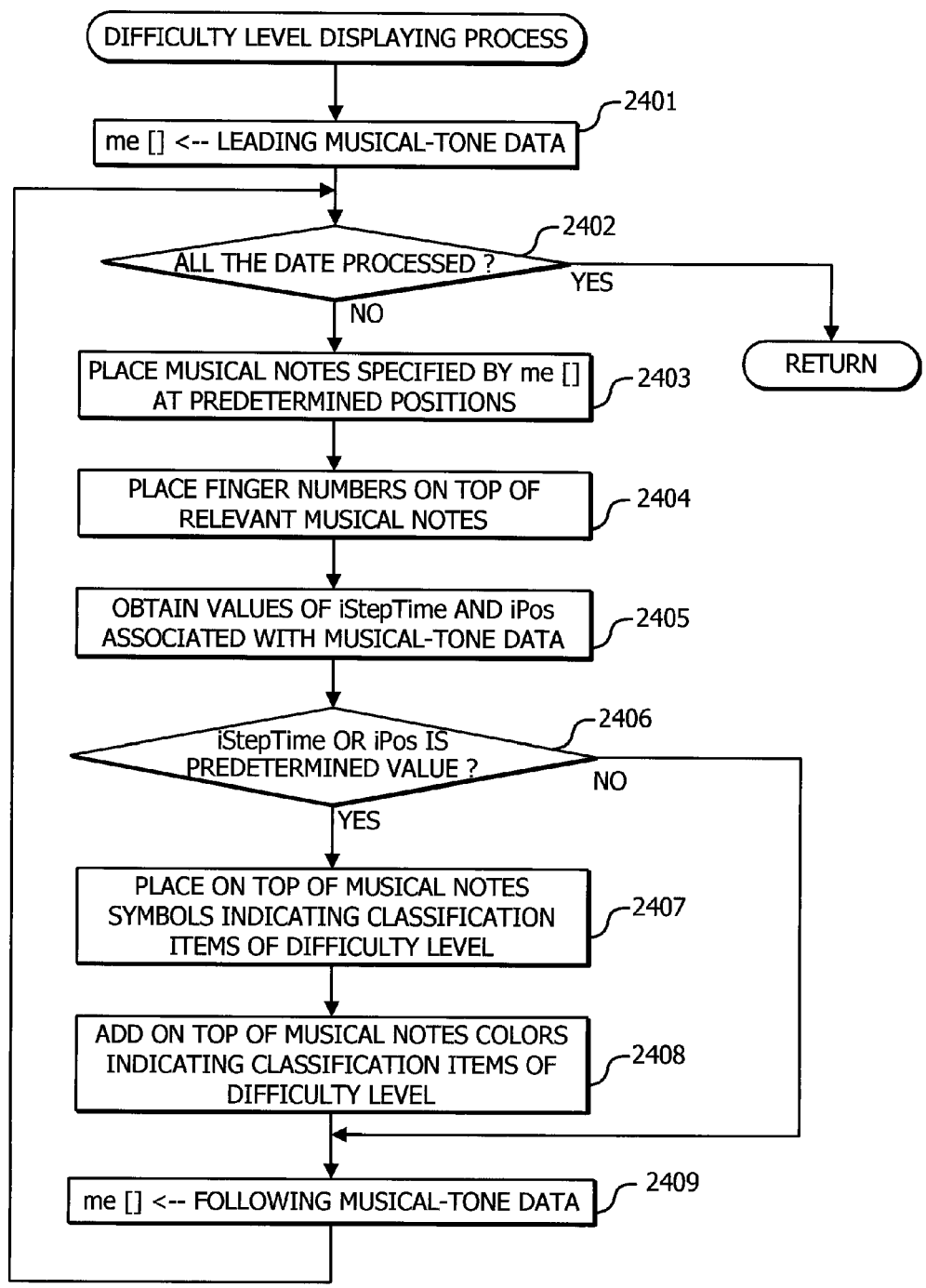
FIG. 24 is a flow chart of an example of the difficulty level displaying process in the third embodiment.

FIG. 24 is a flow chart of an example of the difficulty level displaying process in the third embodiment. Processes at step 2401 to step 2404 in FIG. 24 are substantially the same as those at step 2001 to step 2004 in FIG. 20. After the process st step 2404, CPU 11 obtains classification values of the classification items iStepTime indicating a musical-tone duration and iPos indicating a position of a musical note in a measure at step 2405, wherein the classification items iStepTime and iPos are associated with music data specified in Array me [ ].

CPU 11 judges at step 2406 whether iStepTime or iPos is a predetermined value. For example, when iStepTime is a value other than 32, 16, 8, or 4, it is determined YES at step 2406. When iPos is a value other than 32, 16 or 8, it is determined YES at step 2406. When it is determined YES at step 2406, CPU 11 places a symbol indicating the relevant classification item on the top of musical notes at step 2407. For example, when iStepTime is a predetermined value, a symbol "T" is placed on the top of musical notes on the screen of the displaying unit 16, and when iPos is a predetermined value, a symbol "P" is placed on the top of musical notes on the screen.

CPU 11 gives musical notes colors corresponding to the classification items with the symbols attached at step 2408. Then, CPU 11 stores the record of the following musical-tone data in Array [ ] at step 2409, and returns to step 2402.

In the difficulty displaying process in the third embodiment, when the classification values of the classification items concerning rhythm and associated with each of musical notes composing the music are a predetermined value, CPU 11 produces image data of a musical score including symbols indicating that the musical notes correspond to the classification items, and displays the image data on the screen of the displaying unit 16, whereby the operator (player) can easily confirm musical notes of a predetermined difficulty level in rhythm when playing the music.

Now, the fourth embodiment of the invention will be described with reference to FIGS. 25 to 29.

In the fourth embodiment, the fingering difficulty level, rhythm difficulty level, and key difficulty level, which are necessary elements for playing music, are separately calculated, and the calculated difficulty levels are separately weighted and accumulated, whereby the whole difficulty level of the music is calculated. Meanwhile, the difficulty level of music is calculated based on separate difficulty levels previously calculated and stored in the recording unit. And weight coefficients to be applied to the separate difficulty levels are optimized such that a correlation value will be maximum between the calculated difficulty level of music and a difficulty level evaluation made on the same music by a professional.

Figure 25:
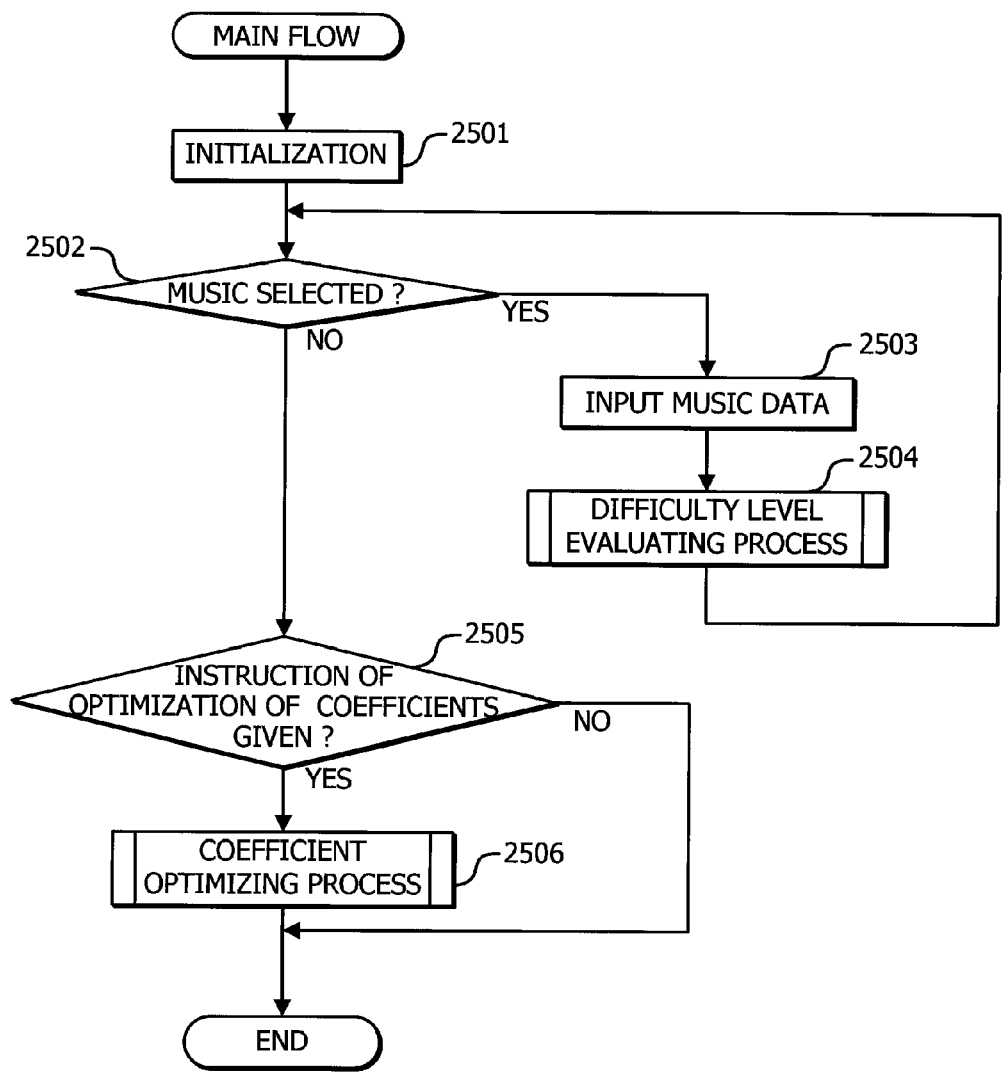
FIG. 25 is a flow chart of a schematic process to be performed in the fourth embodiment.

FIG. 25 is a flow chart of a process to be performed in the fourth embodiment. Processes at step 2501 to step 2504 are substantially the same as those at step 201 to step 204 in FIG. 2. When it is determined at step 2502 that no music has been designated (NO at step 2502), CPU 11 judges at step 2505 whether or not the user has operated the input device 15 to give an instruction of optimization of coefficients. When it is determined at step 2505 that an instruction of optimization of coefficients has been given (YES at step 2505), CPU 11 performs a coefficient optimizing process at step 2506.

The coefficient optimizing process (at step 2506) will be described in detail.

In the coefficient optimizing process, the elements such as the fingering difficulty level, rhythm difficulty level, and key difficulty level are multiplied by the weight coefficients RF, RR and RT, respectively, to obtain the difficulty level iCost of music, and these weight coefficients RF, RR and RT are optimized. In general, the weight coefficients are calculated such that the calculated difficulty level of music will be equivalent to a human evaluation.

Figure 26:
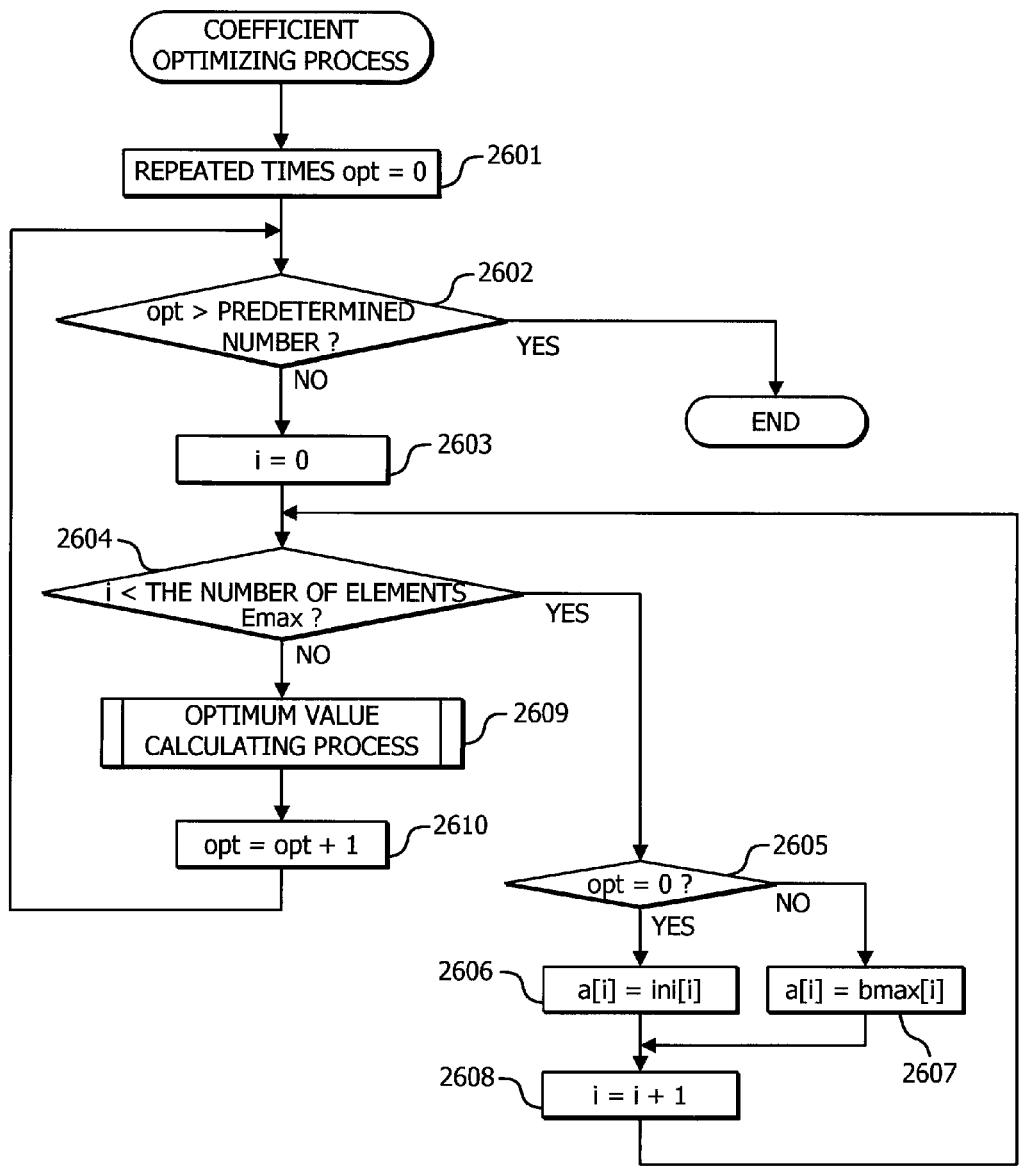
FIG. 26 is a flow chart of a coefficient optimizing process in the fourth embodiment.

FIG. 26 is a flow chart of the coefficient optimizing process in the fourth embodiment. CPU 11 initializes a parameter "opt" to "0" at step 2601 in FIG. 26, which parameter indicates how many times processes are repeatedly performed. Processes at step 2003 to step 2010 are repeatedly performed until the parameter "opt" reaches a predetermined number (YES at step 2602).

CPU 11 initializes a parameter "i" to "0" at step 2603, which parameter "i" specifies the element of the difficulty level of music, where i=0 indicates the fingering difficulty level, i=1 indicates the rhythm difficulty level, and i=2 indicates the key difficulty level. CPU 11 repeatedly performs processes at step 2605 to step 2608 until the parameter "i" reaches "2" (at step 2604).

CPU 11 judges at step 2605 whether or not the parameter "i" is "0", that is, whether or not the process is the first process. When it is determined at step 2605 that the process is the first process (YES at step 2605), CPU 11 sets a basic value a [i] of weight coefficient to ini [i] at step 2606. The ini [i] can take any value (for example, ini [i]=1). When it is determined at step 2605 that the process is not the first process (NO at step 2605), CPU 11 sets the basic value a [i] of weight coefficient to a candidate maximum value bmax [i] at step 2607. The finally obtained values bmax [0] will be the weight coefficient RF of fingering difficulty level, bmax [1] will be the weight coefficient RR of rhythm difficulty level, and bmax [2] will be the weight coefficient RT of key difficulty level. When the processes at steps 2606 and 2607 have been performed, CPU 11 increments the parameter "i" at step 2608, and returns to step 2604.

When the parameter "i" has reached "2" (at step 2604), CPU 11 performs an optimum value calculating process at step 2609. CPU 11 increments the parameter "opt" to "0" at step 2610, and returns to step 2602.

Figure 27:
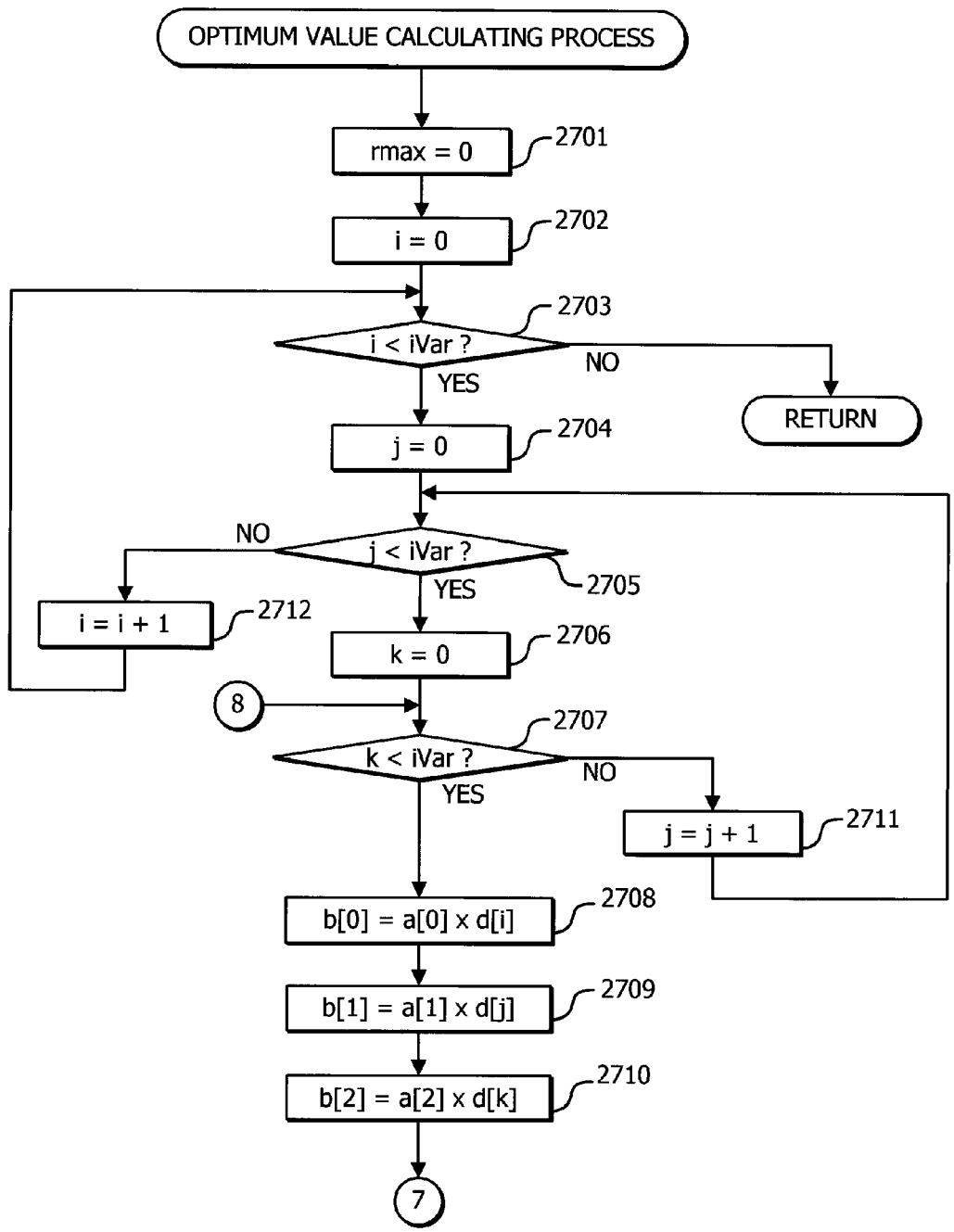
FIGS. 27 and 28 are flow charts of an example of an optimum value calculating process in the fourth embodiment.
Figure 28:
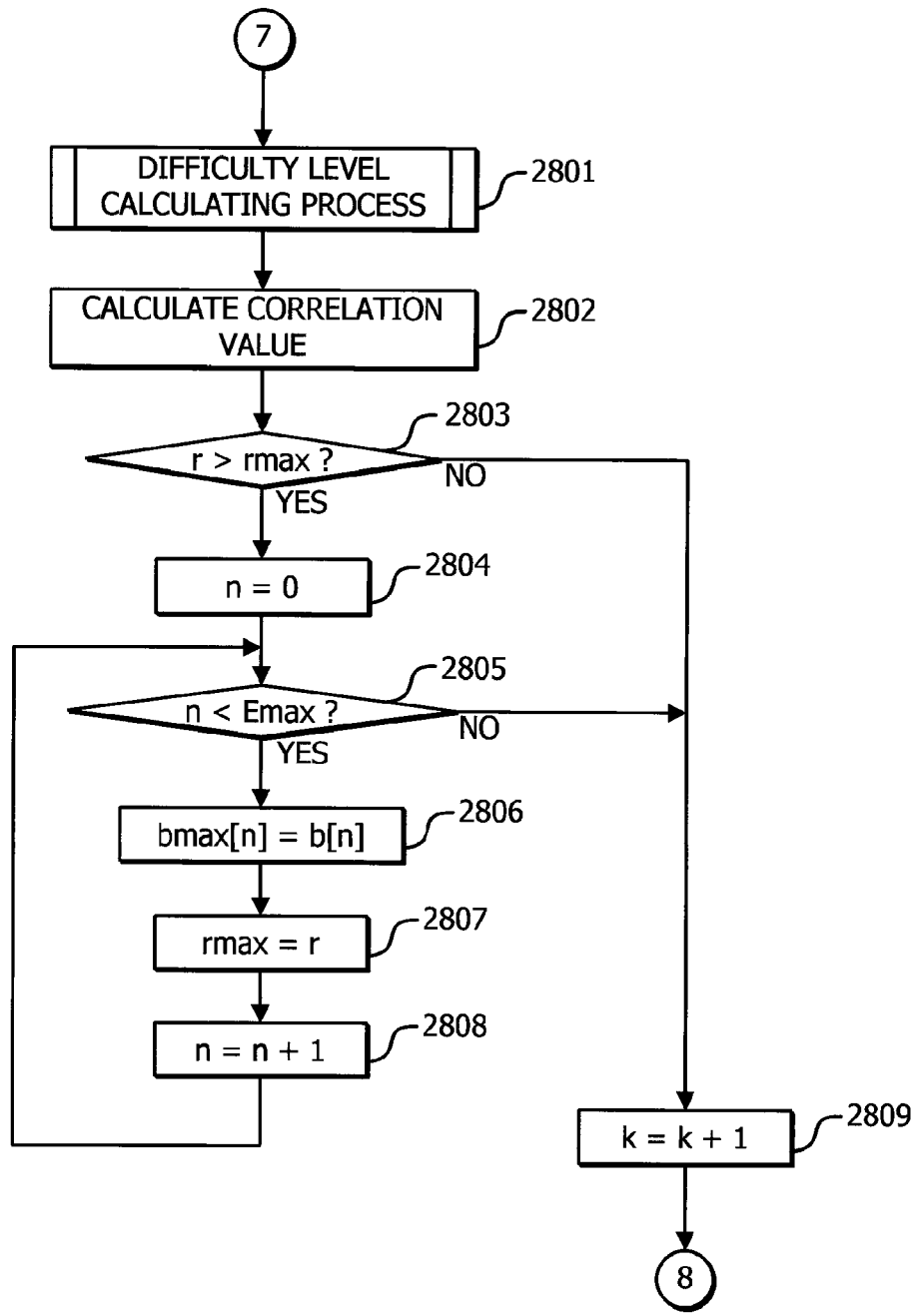

FIGS. 27 and 28 are flow charts of an example of the optimum value calculating process. The basic value a [i] is considered as a center value of the weight coefficient to be calculated. In the optimum value calculating process, the candidate value b [ ] is obtained with respect to every combination of values iVar in the vicinity of the basic value a [ ] in a triple loop using parameters "i", "j" and "k". Further, the difficulty level using the candidate value b [ ] is obtained, and the correlation value between the obtained difficulty level and the difficulty level evaluation by the professional is calculated. The maximum value rmax of the correlation value is obtained. The optimum value calculating process will be described in detail.

CPU 11 initializes the maximum value rmax of the correlation value at step 2701 in FIG. 27, and also initializes the parameter "i" at step 2702. As far as the parameter "i" is smaller than the parameter iVar indicating predetermined values in the vicinity of the basic value a [ ] (YES at step 2703), CPU 11 performs a process at step 2704 and processes at the following steps. When it is determined at step 2703 that i<iVar is not true (NO at step 2703), CPU 11 terminates the optimum value calculating process.

When it is determined at step 2703 that i<iVar is true (YES at step 2703), CPU 11 initializes the parameter "j" at step 2704. As far as the parameter "j" is smaller than the parameter iVar (YES at step 2705), CPU 11 performs a process at steps 2706 and processes at the following steps. When it is determined at step 2705 that j≧iVar is true (NO at step 2705), CPU 11 increments the parameter "i" at step 2712, and returns to step 2703.

When it is determined at step 2705 that the parameter "j" is smaller than the parameter iVar (YES at step 2705), CPU 11 initializes the parameter "k" at step 2706. As far as the parameter "k" is smaller than the parameter iVar (YES at step 2707), CPU 11 performs a process at steps 2708 and processes at the following steps. When it is determined at step 2707 that k≧iVar is true (NO at step 2707), CPU 11 increments the parameter "j" at step 2711, and returns to step 2705.

When it is determined at step 2707 that k<iVar is true (YES at step 2707), CPU 11 sets candidate values b [0], b [1] and b [2] at steps 2708, 2709 and 2710. The following candidate values b [ ] are obtained at steps 2708, 2709 and 2710.

$b[0]=a[0] \times d[i]$ $b[1]=a[1] \times d[j]$ $b[2]=a[2] \times d[k]$ where d [i], d [j] and d [k] are coefficients, by which the basic values a [ ] are multiplied to calculate the candidate values b [ ], and take a value from 0.0 to 9.9 in the present process. For example, as the parameters "i", "j" and "k" increase such as d [0]=0.0, d [1]=0.2, d [2]=0.6 . . . , d [6]=9.9, the coefficients increase.

Figure 29:
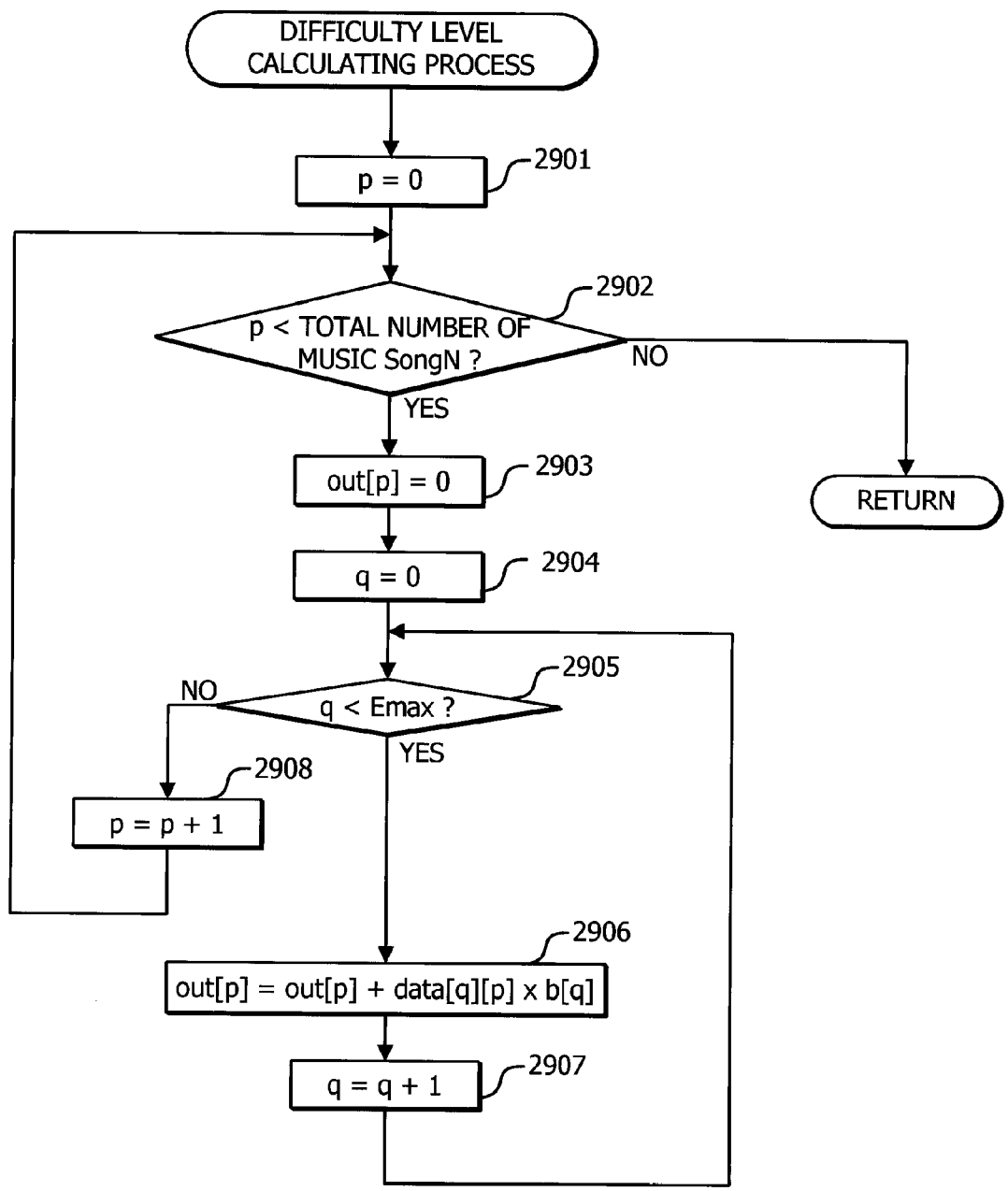
FIG. 29 is a flow chart of en example of the difficulty level calculating process performed in the fourth embodiment.

After the process of step 2710, CPU 11 performs the difficulty level calculating process at step 2801 in FIG. 28. In the difficulty level calculating process, a difficulty level calculating value out [ ] is calculated to calculate a correlation value based on previously calculated difficulty levels of a predetermined number (SongN) of music. FIG. 29 is a flow chart of en example of the difficulty level calculating process performed in the fourth embodiment. In the difficulty level calculating process, CPU 11 initializes a parameter "p" for designating music to "0" at step 2901 in FIG. 29, and repeatedly performs processes at steps 2903 to 2908 as far as the parameter "p" remains less than SongN (total number of music) (YES at step 2902).

CPU 11 initializes the difficulty level calculating value out [ ] to "0" at step 2903, and further initializes the parameter "j" for specifying the element (fingering difficulty level, rhythm difficulty level and key difficulty level) of the difficulty level to "0" at step 2904. As far as a parameter "q" is less than the element number Emax (YES at step 2905), CPU 11 repeatedly performs processes at steps 2906 to 2907. CPU 11 calculates the difficulty level calculating value out [p]=out [p]+ data [q] [p]×b [q] at step 2906. In the case music is specified by the parameter "q", the data [q] [p] is the difficulty level calculated with respect to the element specified by the parameter "q", wherein when q=0, the element is the fingering difficulty level, when q=1, the element is the rhythm difficulty level, and when q=2, the element is the key difficulty level. The data [q] [p] is previously calculated and stored in RAM 13. Then, CPU 11 increments the parameter "q" at step 2907, and returns to step 2905.

When it is determined NO at step 2905, CPU 11 increments the parameter "p" at step 2908, and returns to step 2902.

When the difficulty level calculating process is terminated, CPU 11 calculates a correlation value "r" between the difficulty level calculating value out [k] calculated in the difficulty level calculating process and the difficulty level evaluation dat [k] by the professional previously stored in RAM 13 at step 2802 in FIG. 28. For example, the following general correlation coefficient can be used as the correlation value.

$$\frac{\sum_{i=0}^{n-1}(x_i-\overline{x})(y_i-\overline{y})}{\left(\sum_{i=0}^{n-1}(x_i-\overline{x})^2\right)^{\frac{1}{2}} \cdot \left(\sum_{i=0}^{n-1}(y_i-\overline{y})^2\right)^{\frac{1}{2}}}$$

where $\overline{x}$ is an arithmetic average of $x_i$, and $\overline{y}$ is an arithmetic average of $y_i$. In the above formula, xi=out [i], yi=dat [i] and n=SoneN. CPU11 judges at step 2803 whether or not the correlation value "r" calculated at step 2802 is larger than the maximum value rmax of the correlation value obtained in the previous process. When it is determined NO at step 2803, CPU 11 increments a parameter "k" at step 2809, and returns to step 2707 in FIG. 7.

Meanwhile, when it is determined YES at step 2803, CPU 11 initializes a parameter "n" to "0" at step 2804, and as far as the parameter "n" is less than the number of elements Emax (YES at step 2805), CPU 11 performs processes at steps 2806 to 2808. CPU 11 temporarily stores the current candidate value b[n] as the maximum value bmax [n] in RAM 13 at step 2806, and further temporarily stores the current correlation value "r" as the maximum value rmax of the correlation value in RAM 13 at step 2807. Then, CPU 11 increments the parameters "n" at step 2808, and returns to step 2805. When it is determined NO at step 2805, CPU 11 increments the parameter "k" at step 2809, and returns to step 2707 in FIG. 27. When the processes have been performed at step 2805 to step 2808, the candidate values b [0] to b [2] of coefficients of the respective difficulty levels and the maximum value rmax of correlation value "r" are obtained.

As described above, the optimum value calculating process is performed a predetermined times, and the values bmax [0] to bmax [2] obtained every time the process is performed gradually come close to the evaluation value by the professional. The obtained values bmax [0], bmax [1] and bmax [2] are stored in RAM 13, and are used as weight coefficients RF, RR and FT to calculate the whole difficulty level of music in the difficulty level evaluating process at step 404 in FIG. 4, wherein the fingering difficulty level iFCost, rhythm difficulty level iRCost and key difficulty level iTCost are multiplied by the weight coefficients RF, RR and FT, respectively to calculate the total difficulty level.

In the fourth embodiment, concerning the fingering, rhythm and key which are necessary for playing music, CPU 11 separately calculates the fingering difficulty level, rhythm difficulty level and key difficulty level, and multiplies these calculated difficulty levels by the separate weight coefficients, accumulating the weighted difficulty levels, calculating the whole difficulty level of music. Further, CPU 11 optimizes the weight coefficients, by which the respective difficulty levels are to be multiplied, such that the correlation value will be maximum between the calculated difficulty level of the same music and the difficulty level evaluation of the same music previously made by the professional, wherein the difficulty level of the same music is calculated based on the respective difficulty levels previously calculated and stored in RAM 13.

Therefore, the difficulty level of music can be calculated from the respective difficulty levels in an objective manner, not far separating from the evaluation by the professionals.

In the fourth embodiment, the candidate weight coefficient b [i] is calculated in the vicinity of the basic values a [i] of each of the elements such as the fingering, rhythm and key, and the difficulty level calculating values are calculated using a combination of the candidate values b [0] to b [2] of the weight coefficients of all the elements. Changing the combination and using a new combination of candidate values of the weight coefficients, various difficulty levels are calculated to obtain correlation values between the calculated difficulty levels and difficulty level evaluation. The weight coefficients are obtained, at which the largest correlation value is obtained.

In the fourth embodiment, the basic value a [i] is multiplied by the coefficient d [j] varying in a predetermined range to obtain the candidate value b [i] of weight coefficient. In other words, the maximum value bmax [i] is obtained from combination of candidate value b [i] varying in the vicinity of the basic value a [i].

In the embodiments, the fingering difficulty level concerning the fingering to play adjacent musical notes is calculated based on the pitch information and fingering information. The rhythm difficulty level concerning musical-note durations and timings of musical notes is calculated based on the time information of musical notes. Further, the key difficulty level concerning a key of music is calculated based on the pitch information of musical notes. Therefore, the difficulty level of music can be calculated in consideration of various elements composing the music.

Now, the fifth embodiment of the invention will be described. In the fifth embodiment, in the case a specific state in a classification item that the player has learned is included in music, a cost value is calculated taking into consideration of the specific state of the classification item that the player has learned.

Figure 30:
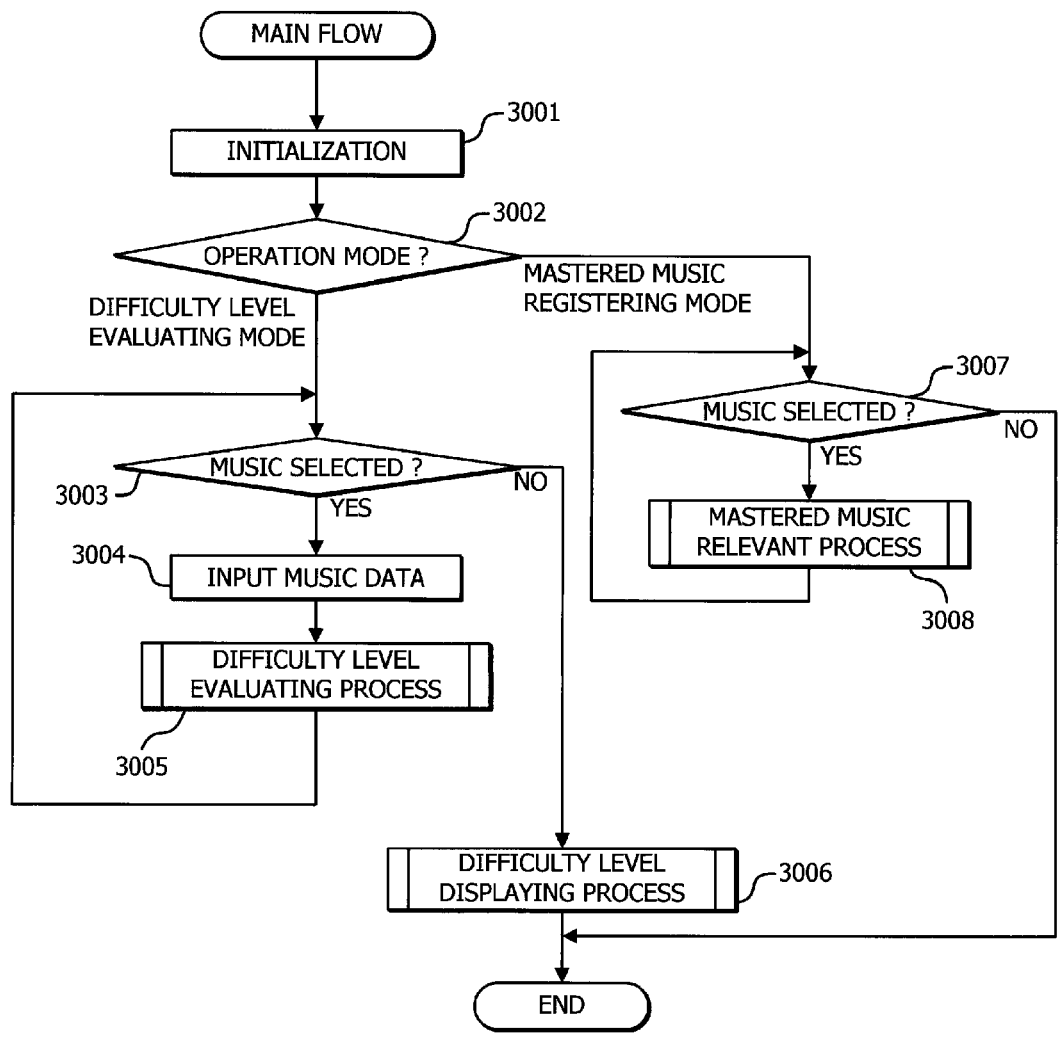
FIG. 30 is a flow chart of a schematic process to be performed by the music difficulty level calculating apparatus 10.

FIG. 30 is a flow chart of a process performed by the music difficulty level calculating apparatus 10.

CPU 11 performs an initializing process, clearing parameters in RAM 13 and an image on the displaying device 16 at step 3001. The music difficulty level calculating apparatus is prepared with a difficulty level evaluating mode and a mastered music registering mode, wherein in the difficulty level evaluating mode, the difficulty level of designated music is evaluated and in the mastered music registering mode, the player registers his or her mastered music and/or obtains information of the music. CPU 11 judges at step 3002 whether an operation mode has been set to the difficulty level evaluating mode or to the mastered music registering mode.

When it is determined at step 3002 that the difficulty level evaluating mode has been set, CPU 11 judges at step 3003 whether or not music has been designated. The judgment of step 3003 is made whether or not the user has operated on the input device 15. The music is designated by inputting the number of the music data.

When it is determined at step 3003 that music has been designated (YES at step 3003), CPU 11 reads music data of the designated music from the large-scale storing device 14 and temporarily stores said music data in RAM 13 at step 3004. Then, CPU 11 performs the difficulty level evaluating process at step 3005, calculating a value indicting the difficulty level of the music whose music data has been read. When it is determined at step 3003 that music has not been designated (NO at step 3003), CPU 11 performs the difficulty level displaying process for displaying a relationship between the calculated difficulty levels and musical notes on the screen of the displaying device 16 at step 3006. The difficulty level evaluating process and the difficulty level displaying process will be described in detail below.

When it is determined at step 3002 that the mastered music registering mode has been set, CPU 11 judges at step 3007 whether or not music has been designated. The judgment of step 3007 is made whether or not the user has operated on the input device 15. The music is designated by inputting the number of the music data. When it is determined at step 3007 that music has been designated (YES at step 3007), CPU 11 performs a mastered music relevant process at step 3008. When it is determined at step 3007 that music has not been designated (NO at step 3007), CPU 11 terminates the process. The mastered music relevant process will be described in detail below.

Figure 31:
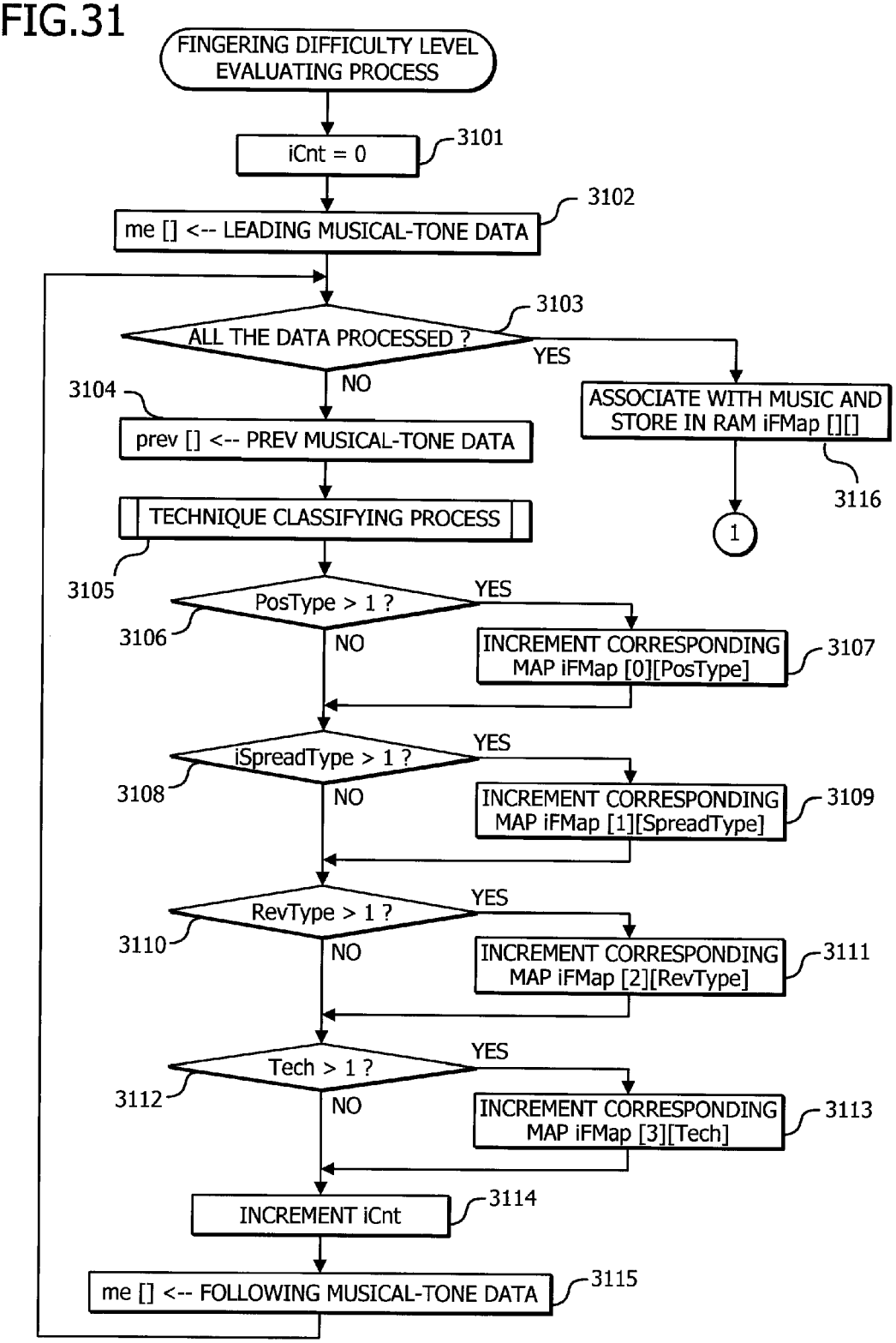
FIGS. 31 and 32 are flow charts of the fingering difficulty level evaluating process performed in the fifth embodiment.
Figure 32:
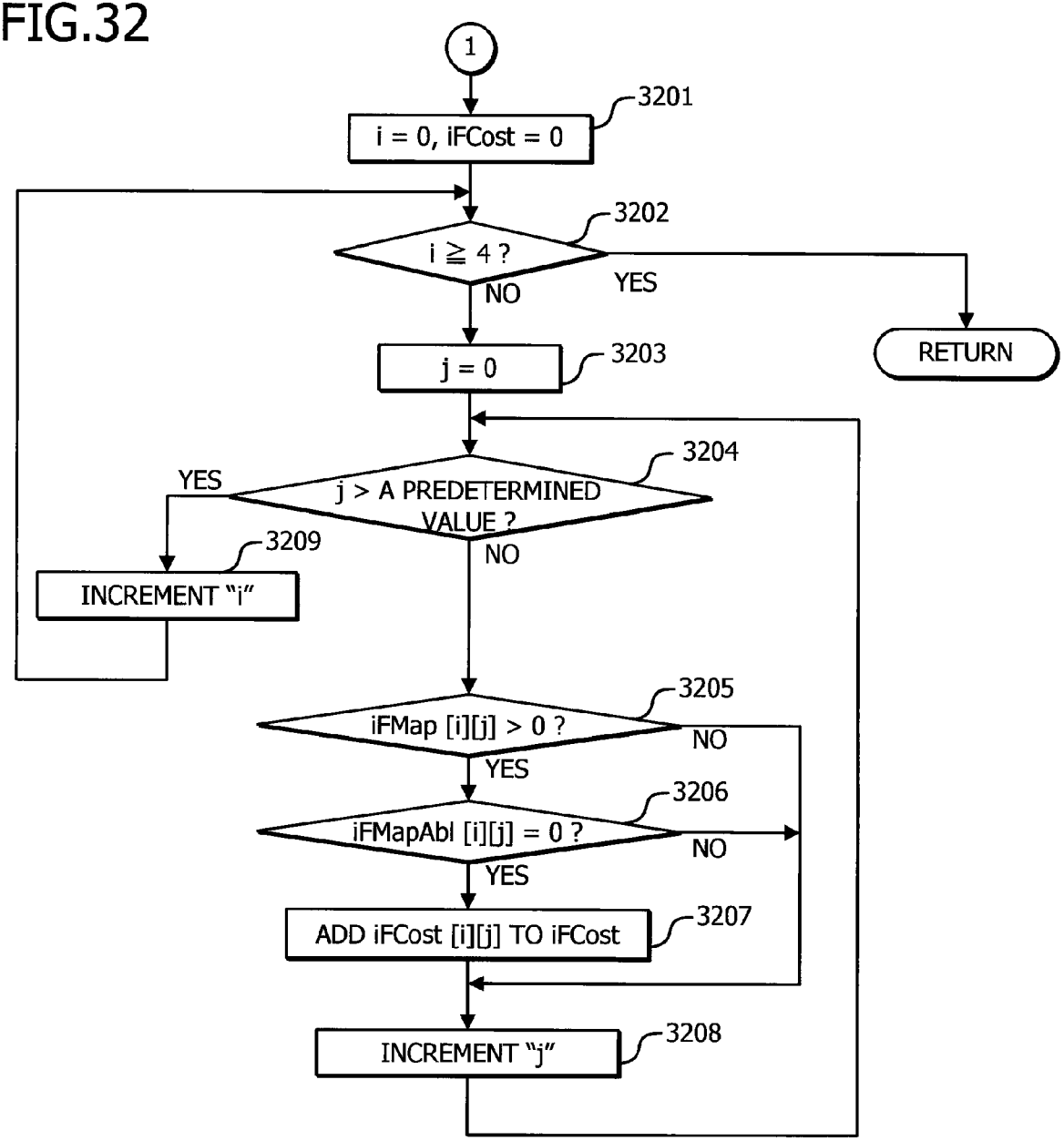

FIGS. 31 and 32 are flow charts of the fingering difficulty level evaluating process to be performed in the fifth embodiment. Processes at steps 3102 to 3115 in FIG. 31 are substantially the same as those at steps 501 to 515 in FIG. 5.

When it is determined YES at step 3103, CPU 11 stores in RAM 13 fingering difficulty level evaluation map iFMap [ ] [ ] whose map value has been incremented at steps 3107, 3109, 3111 and 3113, wherein the fingering difficulty level evaluation map iFMap [ ] [ ] is associated with information for specifying music. The fingering difficulty level evaluation map iFMap [ ] [ ] associated with the information for specifying music is referred to in the mastered music relevant process (step 3008 in FIG. 30) to be described later.

CPU 11 initializes parameters "i" and iFCost to "0" at step 3201. CPU 11 judges at step 3202 whether or not the parameter "i" is not less than 4. The parameter "i" is for specifying "i" in iFMap [i] [j]. When it is determined at step 3202 that the parameter "i" is less than 4 (NO at step 3202), CPU 11 initializes the parameter "j" to "0" at step 3203, and CPU 11 repeatedly performs processes at steps 3205 to 3208 until parameter "j" has reached a predetermined value at step 3204.

CPU 11 judges at step 3205 whether or not the fingering difficulty level evaluation map value iFMap [i] [j] is larger than "0". When it is determined YES at step 3205, CPU 11 judges at step 3206 whether or not a music master level map value iFMapAbl [i] [j] of a player is "0". The iFMapAbl [ ] [ ] is a map indicating whether or not the player has master the technique concerning the specific state in the classification item with respect to every specific state of the classification item.

The iFMapAbl [ ] [ ] is prepared for each player, and the map value is stored in RAM 13. Production of the music master level map iFMapAbl [ ] [ ] will be described in detail later.

The music master level map value iFMapAbl [i] [j]=1 indicates that the player has mastered the specific state specified by the classification value [j] in the classification item [i]. For example, if iFMapAbl [0] [2]=1, the player has mastered the specific state such as (PosType=2) specified by the classification value "2" in the classification item "0" of Position Type (PosType).

As will be described later, in the present embodiment, if the player has mastered a specific state in a classification item, the cost value iFCost [i] [j] of the specific state in the classification item is not added to the fingering difficulty level iFCost. In other words, since the player has already mastered the specific state, such specific state has no effect to the difficulty level of music.

When it is determined at step 3206 that the music master level map value iFMapAbl [i] [j] is "0" (YES at step 3206), the cost value iFCost [i] [j] associated with the fingering difficulty level evaluation map value iFMap [i] [j] is added to the fingering difficulty level iFCost at step 3207.

When it is determined NO at step 3205, when it is determined NO at step 3206, or when a process has finished at step 3207, CPU 11 increments the parameter "j" at step 3208, and returns to step 3204. When it is determined YES at step 3204, CPU 11 increments the parameter "i" at step 3209, and returns to step 3202.

In the present embodiment, when the map value iFMap [i] [j] of the specific state in the classification item concerning the fingering of musical notes in music is not "0", the cost value iFCost [i] [j] of the specific state in the classification item is added to the fingering difficulty level iFCost.

Figure 33:
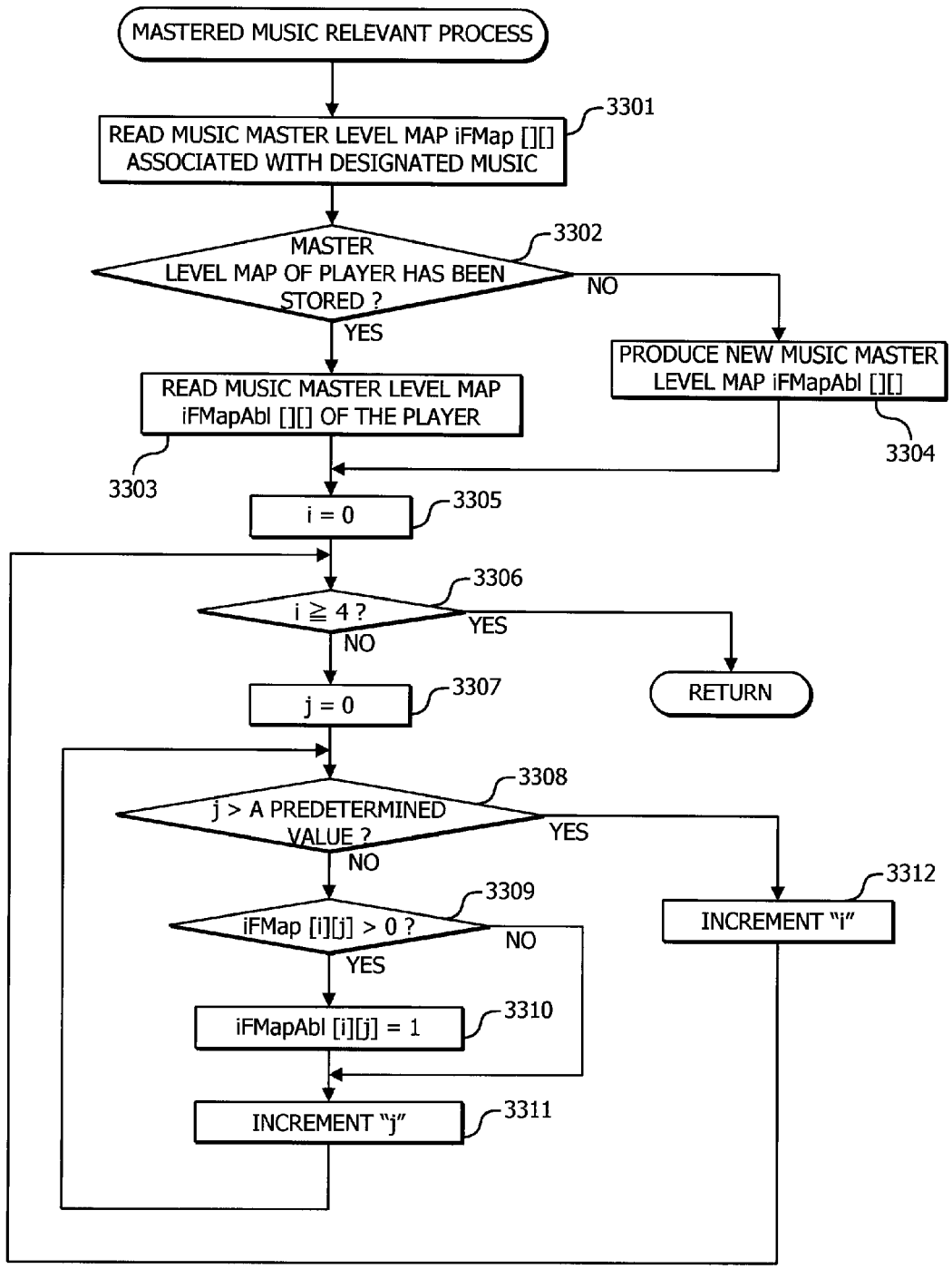
FIG. 33 is a flow chart of an example of a mastered music relevant process performed in the fifth embodiment.

The mastered music relevant process in the present embodiment will be described in detail. The mastered music relevant process is performed at step 3008 in FIG. 30. FIG. 33 is a flow chart of an example of the mastered music relevant process to be performed in the present embodiment. CPU 11 reads from RAM 13 the fingering difficulty level evaluation map iFMap [ ] [ ] associated with the music designated at step 3007 (step 3301 in FIG. 33). CPU 11 judges at step 3302 whether or not the music master level map iFMapAbl [ ] [ ] of a player has been stored in RAM 13. For example, information of the player is stored together with the information for designating music at step 3007.

When it is determined at step 3302 that the music master level map iFMapAbl [ ] [ ] of the player has been stored in RAM 13 (YES at step 3302), CPU 11 reads from RAM 13 the music master level map iFMapAbl [ ] [ ] of the player at step 3303. When it is determined NO at step 3302, CPU 11 produces a new music master level map iFMapAbl [ ] [ ] in RAM 13 at step 3304. All the values of new music master level map iFMapAbl [i] [j] are "0".

CPU 11 initializes the parameter "i" to "0" at step 3305, and judges at step whether or not the parameter "i" is not less than 4 at step 3306. When it is determined YES at step 3306, CPU 11 terminates the process. When it is determined NO at step 3306, CPU 11 initializes the parameter "j" to "0" at step 3307, and repeatedly performs processes at steps 3309 to 3311 until the parameter "j" reaches a predetermined value at step 3308.

CPU 11 judges at step 3309 whether or not the map value iFMap [i] [j] of the fingering difficulty level evaluation map iFMap [ ] [ ] associated with music is larger than "0". When it is determined YES at step 3309, CPU 11 sets "1" to the map value iFMapAbl [i] [j] specified by the parameters "i" and "j" in the music master level map iFMapAbl [ ] [ ] at step 3310. When it is determined NO at step 3309, or when a process has finished at step 3310, CPU 11 increments the parameter "j" at step 3311, and returns to step 3308.

When the music that has been mastered by the operator is designated in the mastered music registering mode, the map value iFMapAbl [i] [j] of the music master level map iFMapAbl [ ] [ ] will be "1" with respect to the specific state in the classification item of music whose map value iFMap [i] [j] of the fingering difficulty level evaluation map iFMap [ ] [ ] will be not less than 1. Therefore, CPU 11 judges at step 3206 in FIG. 32 whether or not the map value iFMapAbl [i] [j] is "0". When it is determined that the map value iFMapAbl [i] [j] is not "0", iFCost [i] [j] is not added to the cost value iFCost, whereby the difficulty level of music can be calculated excluding the item (specific state in the classification item) that the played has already mastered.

In the present embodiment, the difficulty level calculating process for calculating the difficulty level of music is performed based on either one of pitch information, fingering information, and time information of musical-tone data concerning musical tones composing music. In the difficulty level calculating process, CPU 11 produces and stored in RAM 13 the difficulty level evaluation maps indicating specific states for the respective classification items (fingering, rhythm, and so on) of each piece of music. Further, CPU 11 refers to the difficulty level evaluation map and reads from the cost table of RAM 13 cost values of specific states in the classification items, accumulating the cost values to obtain the fingering difficulty level. In the mastered music relevant process, CPU 11 produces and stores in RAM 13 a master level map indicating whether or not the player has mastered the specific states in the respective classification items. Further, in the present embodiment, CPU 11 refers to the master level map when accumulating cost values, obtaining the cost values taking into consideration of whether or not the player has mastered the specific state in the classification items.

In the present embodiment, if the specific state of the classification item the player has mastered is included in the music, the cost value is calculated taking into consideration of the specific state of the classification item that the player has mastered. Therefore, the difficulty level of music can be obtained taking into consideration of the player's technique in accordance with the mastered pieces of music.

In the present embodiment, when the player has mastered a specific state in a classification item, CPU 11 excludes the cost value corresponding to the mastered specific state from accumulation of cost values. Therefore, without performing complex calculation, the difficulty level of music can be calculated in accordance with the player's technique in consideration of the player's mastered music.

Referring to the difficulty level evaluation map of each piece of music, CPU 11 sets a predetermined value (for example, "1") to a specific state of a classification item in a master level map. The master level map is a map for registering a flag. In the specific state of the classification item, once the player has mastered, the flag is set to "1", which means that the player has completely mastered the specific state of the classification item.

In the present embodiment, the difficulty level calculating process includes the fingering difficulty level calculating process for calculating the difficulty level of fingering of playing adjacent musical notes based on the pitch information and fingering information. The difficulty level of music can be calculated in consideration of the player's fingering technique.

Now, the sixth embodiment of the invention will be described. In the fifth embodiment, the map value iFMapAbl [i] [j] of the music master level map iFMapAbl [ ] [ ] takes "0" or "1". When the cost iFCost is calculated, it is judged whether the map value iFMapAbl [i] [j]=0 is true or not. When the map value iFMapAbl [i] [j]=0 is not true, the map value iFMapAbl [i] [j] is not added to the cost value iFCost. In the sixth embodiment, the map value iFMapAbl [i] [j] takes either one of values from "0" to Max (Max: a predetermined positive value). When the cost value iFCost is calculated, the cost value iFCost [i] [j] of the specific state of the specific classification item which is given weight is added to the cost value iFCost, wherein the weight is defined taking into consideration of the map value iFMapAbl [i] [j].

Figure 34:
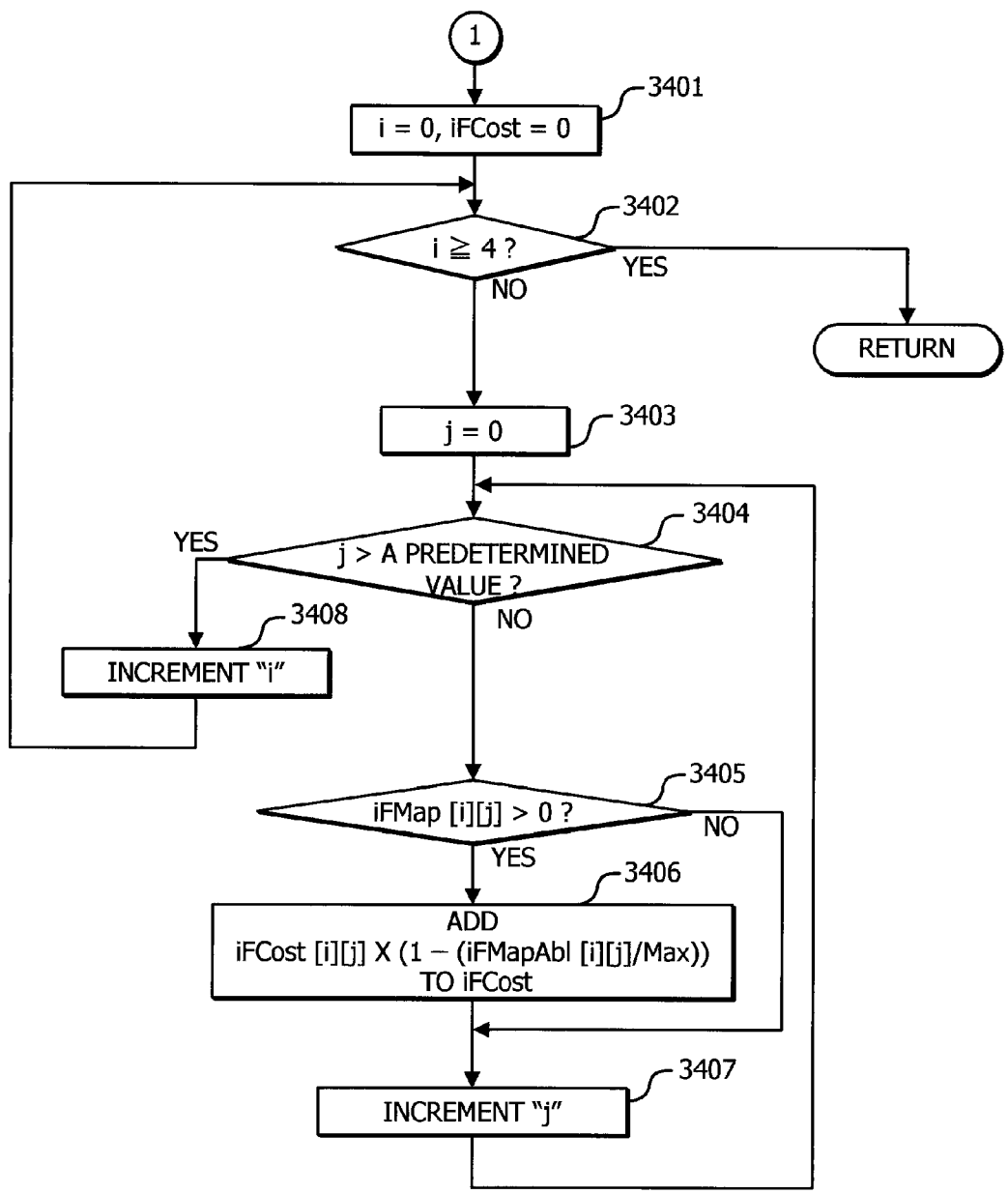
FIG. 34 is a flow chart of an example of the fingering difficulty level evaluating process in the sixth embodiment.

FIG. 34 is a flow chart of an example of the last half of the fingering difficulty level evaluating process in the sixth embodiment. Processes at steps 3401 to 3405 in FIG. 34 are substantially the same as those at steps 3201 to 3205 in FIG. 32, and processes at steps 3407 and 3408 in FIG. 34 are substantially the same as those at steps 3208 and 3209 in FIG. 32. In the sixth embodiment, when it is determined at step 3405 that iFMap [i] [j]>0 is true (YES at step 3405), CPU 11 multiplies the cost value iFCost [i] [j] corresponding to the fingering difficulty level evaluation map value iFMap [i] [j] by weight (1−(iFMapAbl [i] [j]/Max)), and adds weighted cost value to the fingering difficulty level value iFCost at step 3406.

Figure 35:
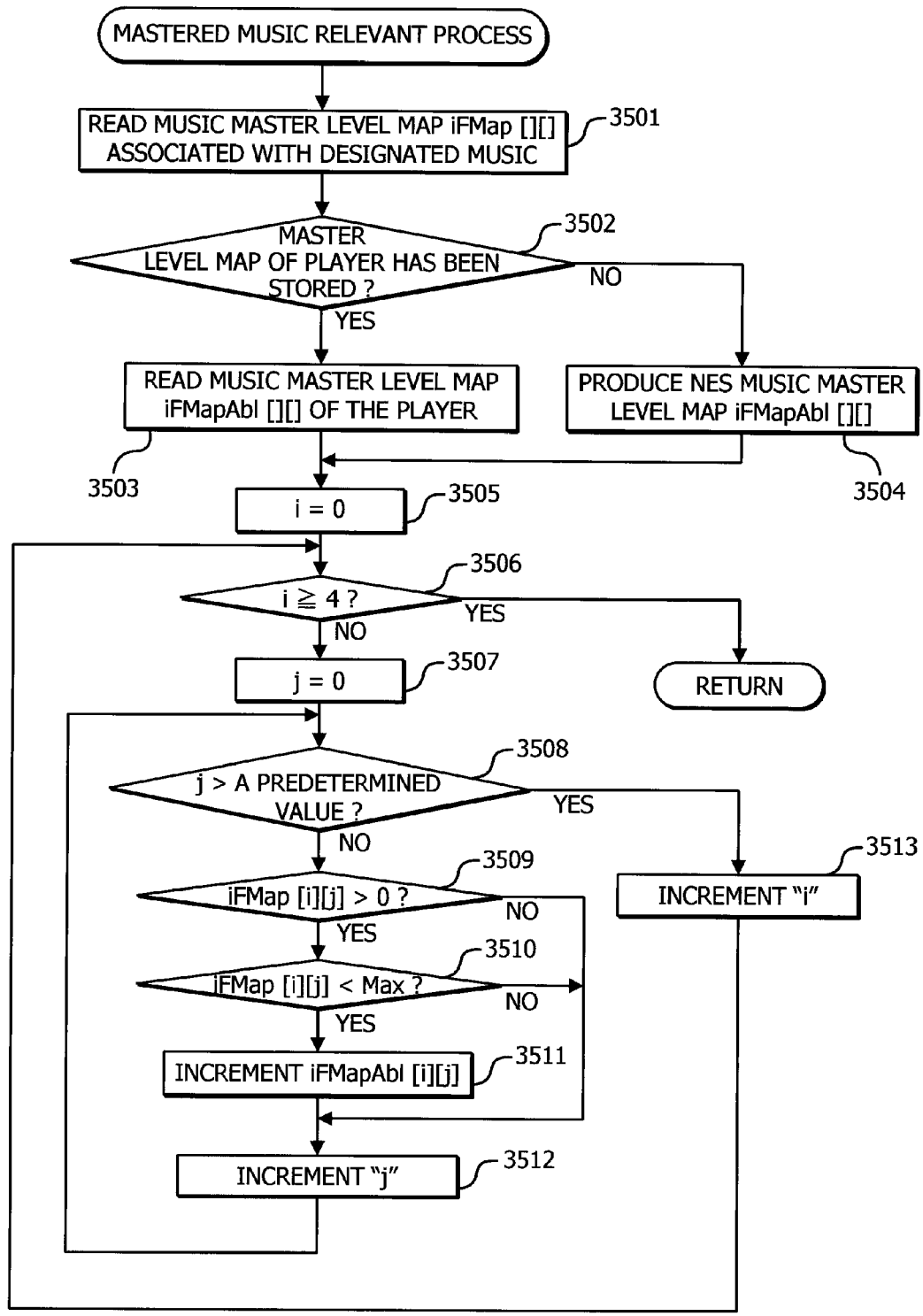
FIG. 35 is a flowchart of an example of a mastered music relevant process in the sixth embodiment.

The mastered music relevant process in the sixth embodiment will be described in detail. FIG. 35 is a flow chart of an example of the mastered music relevant process in the sixth embodiment. Processes at step 3501 to step 3509 in FIG. 35 are substantially the same as those at step 3301 to step 3309 in FIG. 33, and processes at steps 3512 and 3513 in FIG. 35 are substantially the same as those at steps 3311 and 3312 in FIG. 33. In the sixth embodiment, the map value iFMapAbl [i] [j] of music master level map iFMapAbl [ ] [ ] can take either one of values from 0 to Max.

When it is determined at step 3509 that iFMapAbl [i] [j]>0 is true (YES at step 3509), CPU 11 judges at step 3510 whether or not the map value iFMapAbl [i] [j] is less than "Max". When it is determined YES at step 3510, CPU 11 increments the map value iFMapAbl [i] [j] at step 3511. When it is determined NO at step 3509 or at step 3510, or when the process has finished at step 3511, CPU increments the parameter "j" at step 3512, and returns to step 3508. Note that "Max" can be the total number of music data stored in the large-scale storing device 14. When the player has mastered the total number of music, iFMapAbl [i] [j]/Max can be "1". Therefore, the value iFCost [i] [j]×(1−(iFMapAbl [i] [j]/Max)) to be added to iFCost can be "0".

In the sixth embodiment, when producing the music master level map, CPU 11 refers to the difficulty level evaluation map of every piece of music, and accumulates the map values with respect to the specific state of the classification item in the music master level map, if the specific state of the classification item is found. Further, when accumulating the cost values, CPU 11 refers to the music master level map, and gives the cost value corresponding to the specific state of the classification item weight based on the accumulated cost values, if the accumulated values in the specific state of the classification item are stored. Therefore, in the sixth embodiment, the master level in the specific state of the classification item can be confirmed as the accumulated value, and the difficulty level can be calculated taking into consideration of the master level.

In the sixth embodiment, the weight corresponds to a ratio of the accumulated cost value to a predetermined number. When the player has mastered the specific states of the classification items concerning the predetermined number of music, it can be determined that all the specific states of classification items have been mastered by the player.

For example, in the fifth and sixth embodiment, the music master level map concerning the fingering difficulty level is produced. When the cost iFCost concerning the fingering difficulty level is calculated, CPU 11 refers to the music master level map, and the cost value iFCost [i] [j] concerning the specific state of the classification item of the fingering that the player has mastered is not added to the cost iFCost, or a weighted iFCost [i] [j] to some extent is added to the cost iFCost.

However, the above cost value calculation method is not limited to the fingering difficulty level, the cost value calculation may be made with respect to the rhythm difficulty level in a similar manner. The music master level map is produced, and the music master level map is referred to, whereby the cost value calculation is determined.

Figure 36:
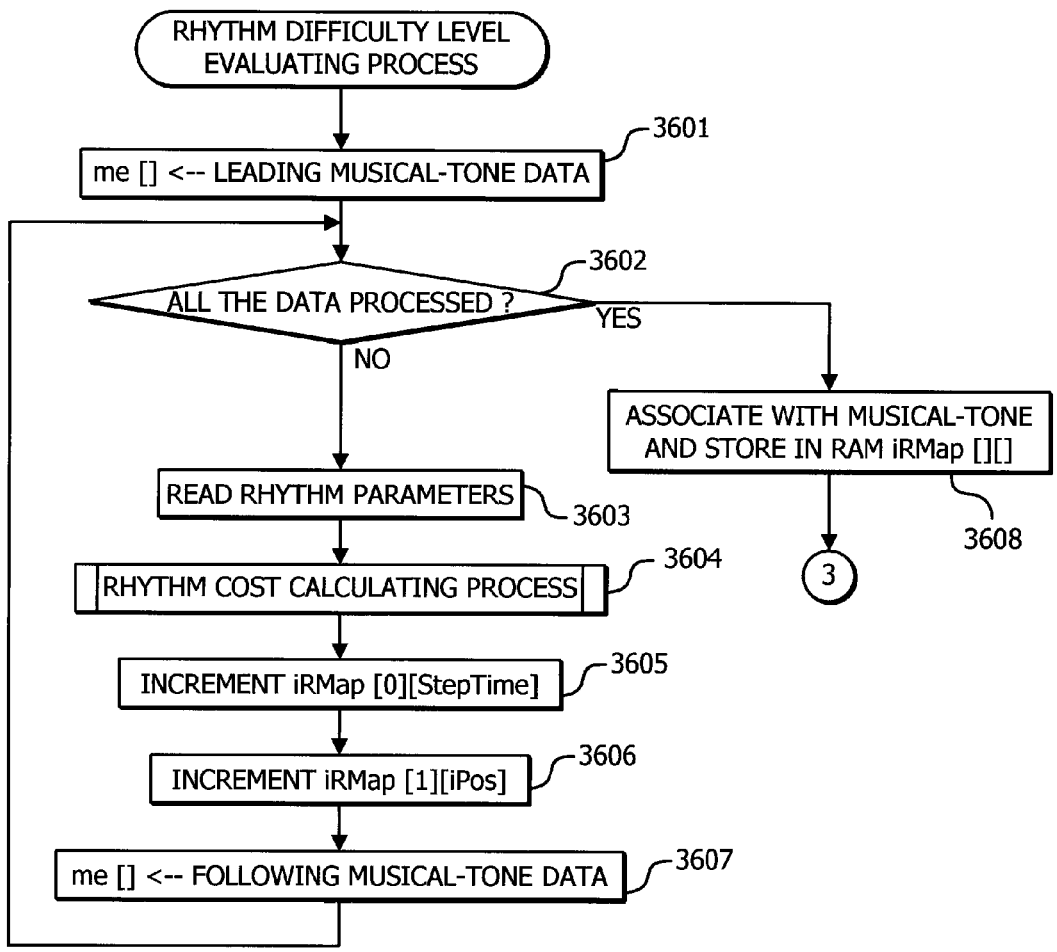
FIGS. 36 and 37 are flow charts of an example of the rhythm difficulty level evaluating process performed in the seventh embodiment.
Figure 37:
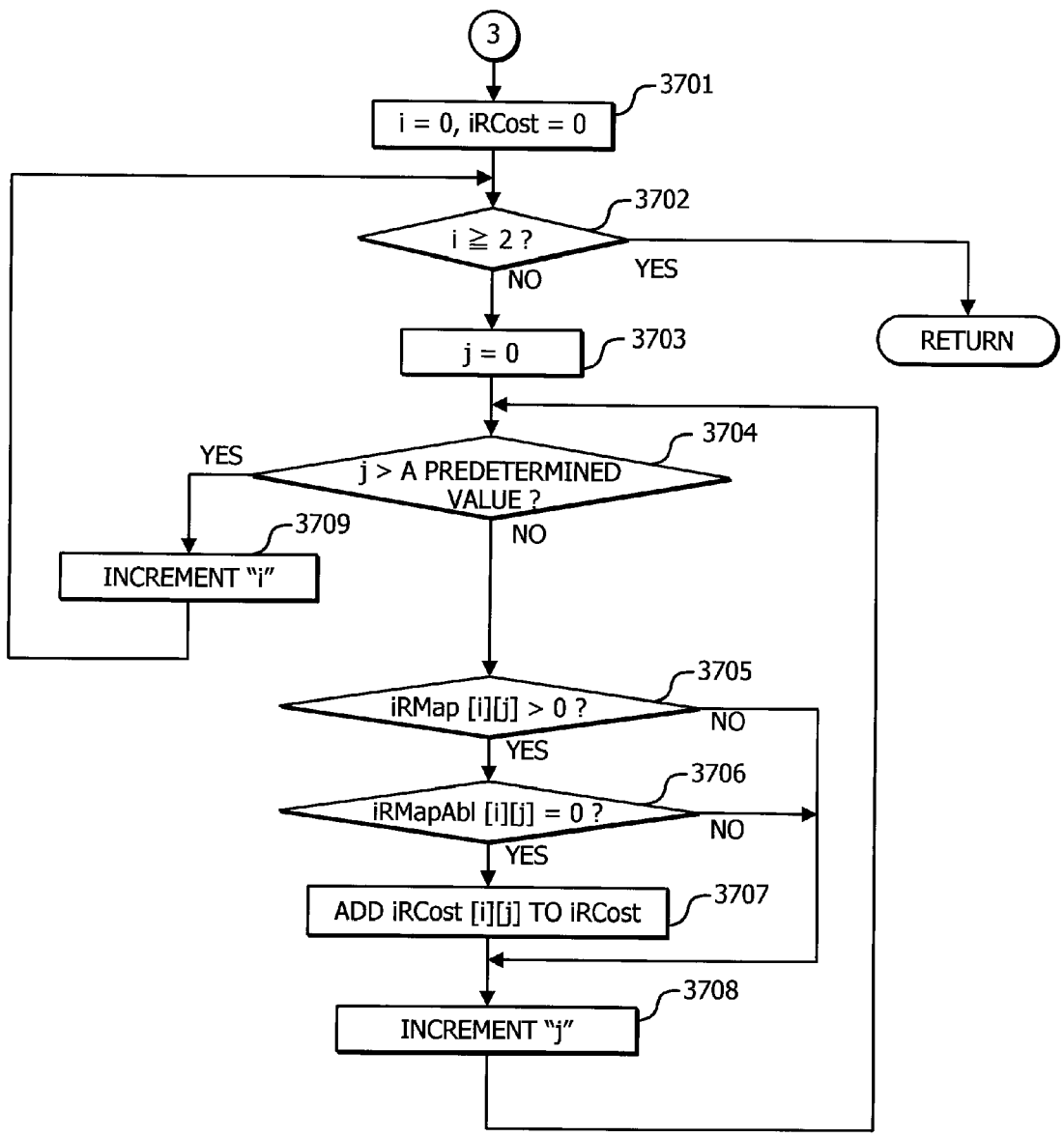

FIGS. 36 and 37 are flow charts of an example of the rhythm difficulty level evaluating process to be performed in the seventh embodiment. Processes at steps 3601 to 3607 in FIG. 36 are substantially the same as those at steps 1001 to 1007 in FIG. 10, and processes at steps 3701 to 3705, and steps 3707 to 3709 in FIG. 37 are substantially the same as those at steps 1101 to 1105 and 1106 to 1108 in FIG. 11.

When it is determined YES at step 3602 in FIG. 36, CPU 11 stores in RAM 13 the rhythm difficulty level evaluation map iRMap [ ] [ ] associated with information for specifying music at step 3603, wherein the map value of iRMap [ ] [ ] has been incremented at steps 3606 and 3607. The rhythm difficulty level evaluation map iRMap [ ] [ ] associated with information is referred to in the mastered music relevant process in the seventh embodiment.

When it is determined YES at step 3705 in FIG. 37, CPU 11 judges at step 3706 whether or not the map value iRMapAbl [i] [j] of the music master level map of the player is "0". When it is determined YES at step 3706, CPU 11 adds the cost value iRCost [i] [j] corresponding to the rhythm difficulty level evaluation map value iRMap [i] [j] to the fingering difficulty level value iRCost at step 3706.

Figure 38:
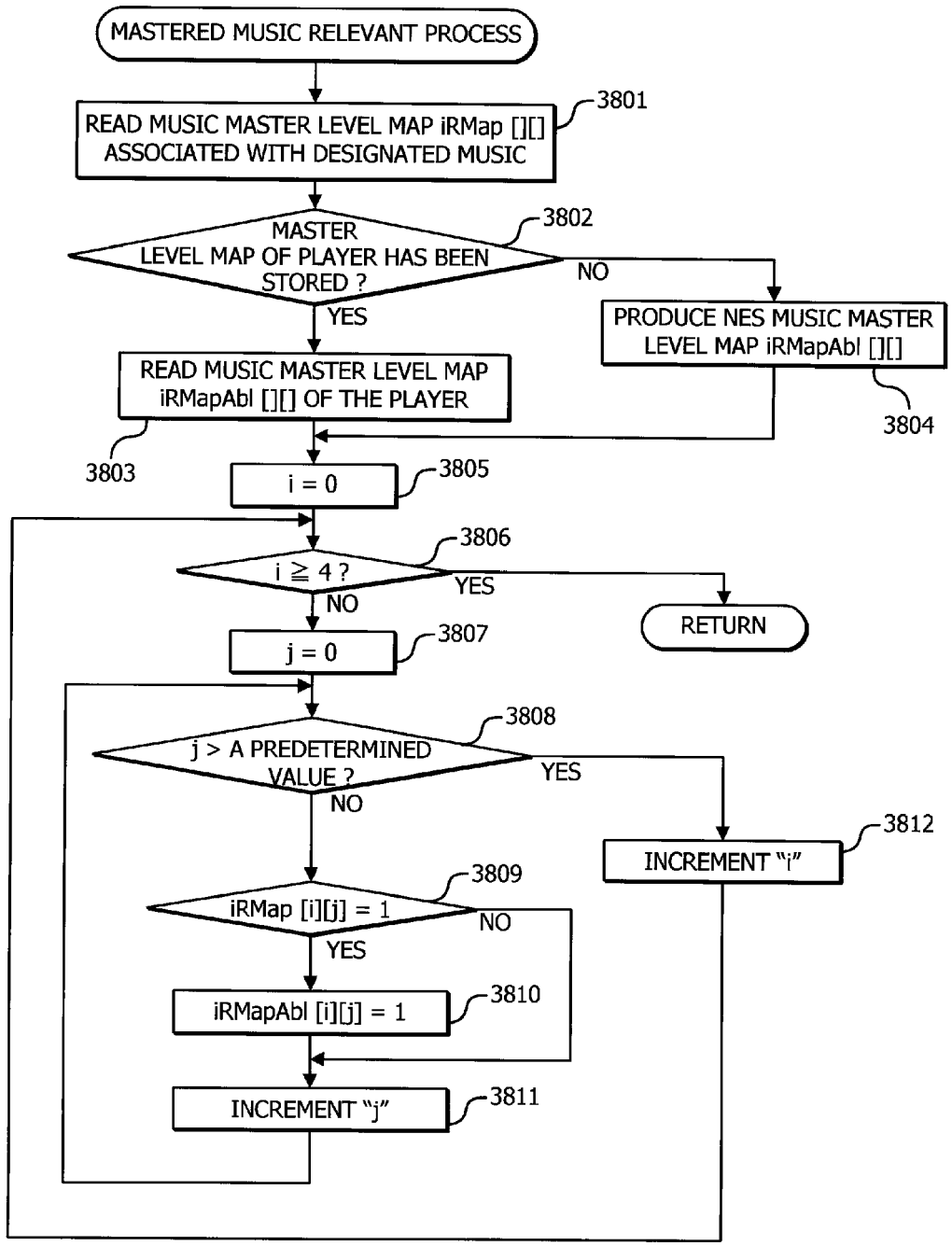
FIG. 38 is a flow chart of an example of the mastered music relevant process performed in the seventh embodiment.

FIG. 38 is a flow chart of an example of the mastered music relevant process to be performed in the seventh embodiment. CPU 11 reads from RAM 13 the rhythm difficulty level evaluation map iRMap [ ] [ ] associated with music at step 3801. CPU 11 judges at step 3802 whether or not the music master level map of the player has been stored in RAM 13.

When it is determined YES at step 3802, CPU 11 reads from RAM 13 the music master level map iRMapAbl [ ] [ ] of the player at step 3803. When it is determined NO at step 3802, CPU 11 produces in RAM 13 a new music master level map iRMapAbl [ ] [ ] at step 3804. All the map value iRMapAbl [i] [j] of the new music master level map are "0".

CPU 11 initializes the parameter "i" to "0" at step 3805. CPU 11 judges at step 3806 whether or not the parameter "i" is not less than 2. When it is determined YES at step 3806, CPU 11 terminates the process. When it is determined NO at step 3806, CPU 11 initializes the parameter "j" to "0" at step 3807. CPU 11 repeatedly performs processes at step 3809 to step 3811 until the parameter "j" reaches a predetermined value (step 3808). When the parameter "j" has reached the predetermined value (YES at step 3808), CPU 11 increments the parameter "i" at step 3812, and returns to step 3808.

CPU 11 judges at step 3809 whether or not the map value iRMap [i] [j] of the rhythm difficulty level evaluation map iRMap [ ] [ ] associated with music is larger than "0". When it is determined YES at step 3809, CPU 11 sets the map value iRMapAbl [i] [j] of the music master level map iRMapAbl [ ] [ ] to "1" at step 3810. When it is determined NO at step 3809, or after the process of step 3810, CPU 11 increments the parameter "j", and returns to step 3808.

As described above, in the seventh embodiment, when music, which the player has mastered, is designated, the map value iRMapAbl [i] [j] of the music master level map iRMapAbl [ ] [ ] will be "1" with respect to the specific states of the classification items concerning the music, whose the map value iRMapAbl [i] [j] of the music master level map iRMapAbl [ ] [ ] is not less than "1". Therefore, CPU 11 judges at step 3706 in FIG. 37 whether or not the map value iRMapAbl [i] [j] is "0". When it is determined that the map value iRMapAbl [i] [j] is not "0", the cost value iRCost [i] [j] is not added to iRCost, whereby the difficulty level of music can be calculated excluding the items (states of classification items) that the player has mastered. In other words, the difficulty level of music can be calculated taking into consideration of the player's technique concerning the rhythm.

Similarly to the sixth embodiment, in calculating the rhythm cost iRCost, the cost value iRCost [i] [j] is weighted based on the iRMapAbl [i] [j], and the weighted cost value can be added to iRCost. In this case, CPU 11 performs processes of steps 3510 and 3511 in FIG. 35 in place of the process of 3810 in FIG. 38. In other words, CPU 11 increments the rhythm difficulty level evaluation map value iRMap [i] [j] as far as the rhythm difficulty level evaluation map value iRMap [i] [j] remains less than "Max".

Further, without judging at step 3706 in FIG. 37 whether or not the music master level map iRMapAbl [i] [1] is "0", CPU 11 multiplies the cost value RCost [i] [j] corresponding to the rhythm difficulty level evaluation map value iRMap [i] [j] by weight (1−(iRMapAbl [i] [j]/Max)), and adds the weighted cost value to the fingering difficulty level value iRCost.

What is claimed is:

1. A music difficulty level calculating apparatus comprising:
   a storing unit which stores musical-tone data, wherein the musical-tone data includes pitch information of each of musical notes composing music, fingering information for playing the musical notes, and time information of each of the musical notes;
   a separate difficulty level calculating unit which calculates separate difficulty levels on plural elements required for playing the music respectively, based on one of the pitch information, the fingering information, and the time information stored in the storing unit; and
   a whole difficulty level calculating unit which calculates a whole difficulty level of the music based on the separate difficulty levels calculated by the separate difficulty level calculating unit;
   wherein the separate difficulty level calculating unit comprises:
      a fingering difficulty level calculating unit which calculates a fingering difficulty level concerning a fingering for playing adjacent musical notes, based on the pitch information and the fingering information stored in the storing unit;
      a rhythm difficulty level calculating unit which calculates a rhythm difficulty level concerning a musical-tone duration and a timing of musical notes, based on the time information stored in the storing unit; and
      a key difficulty level calculating unit which calculates a key difficulty level concerning a key of the music based on the pitch information stored in the storing unit;
   wherein the fingering difficulty level calculating unit comprises:
      a first classification item value obtaining unit which obtains a classification value of at least one of classification items concerning fingering, wherein the classification value is a value selected from among (i) a first classification value indicating a specific state in a first classification item concerning positions of fingers for playing adjacent musical notes, (ii) a second classification value indicating a specific state in a second classification item concerning finger spreading for playing adjacent musical notes, (iii) a third classification item indicating a specific state in a third classification item concerning finger crossing over or under another to play musical notes, and (iv) a fourth classification item indicating a specific state in a fourth classification item concerning finger changing to play adjacent musical notes; and
      a first cost accumulating unit which (i) reads, from a cost table stored in the storing unit, cost values corresponding respectively to the specific states in the respective classification items based on the classification values of the respective classification items, wherein the cost table stores the cost values corresponding to the specific states in the classification items, and (ii) accumulates the read cost values to obtain an accumulated cost value as the fingering difficulty level.

2. The music difficulty level calculating apparatus according to claim 1, wherein when the classification value in the classification item of each musical note is a predetermined value, the first classification item value obtaining unit increases a corresponding count value in a count map stored in the storing unit, wherein the count map stores the count value of the classification value in the classification item; and
   wherein the first cost accumulating unit refers to the count value in the count map and accumulates corresponding cost values stored in the cost table stored in the storing unit, when the count value is not less than 1.

3. The music difficulty level calculating apparatus according to claim 1, wherein the rhythm difficulty level calculating unit comprises:
   a second classification item value obtaining unit which obtains a classification value of at least one of classification items concerning rhythm, wherein the classification value is selected from among (v) a fifth classification value indicating a specific state in a fifth classification item concerning musical-tone durations, and (vi) a sixth classification value indicating a specific state in a sixth classification item concerning positions of musical notes in a measure; and
   a second cost accumulating unit which (i) reads, from the cost table stored in the storing unit, cost values corresponding respectively to the specific states in the respective classification items based on the classification values of the respective classification items concerning rhythm, wherein the cost table stores the cost values corresponding to the specific states of the classification items, and (ii) accumulates the read cost values to obtain an accumulated cost value as the rhythm difficulty level.

4. The music difficulty level calculating apparatus according to claim 1, wherein the key difficulty level calculating unit (i) specifies a key of the music depending on the pitch information of the musical notes included in the music, (ii) finds a degree of coincidence between a musical scale of the specified key and the pitch of the musical note in the music and a degree of inconsistency between the musical scale of the specified key and the pitch of the musical note in the music, and (iii) calculates the key difficulty level based on the degree of coincidence and the degree of inconsistency.

5. The music difficulty level calculating apparatus according to claim 4, wherein the key difficulty level calculating unit calculates the key difficulty level based on a ratio of the degree of inconsistency to a difference between the degree of coincidence and the degree of inconsistency.

6. The music difficulty level calculating apparatus according to claim 1, wherein the musical-tone data includes data indicating a tempo of the music, and
wherein the whole difficulty level calculating unit applies the fingering difficulty level and the rhythm difficulty level with a weight corresponding to the tempo of the music, and calculates the whole difficulty level from the weighted fingering difficulty level and rhythm difficulty level.

7. The music difficulty level calculating apparatus according to claim 1, wherein the first classification item value obtaining unit associates classification values of the respective classification items concerning fingering with respect to each musical note with each musical note and stores the classification values in the storing unit, and
wherein the music difficulty level calculating apparatus further comprises:
a displaying unit having a screen for displaying data on the screen; and
an image producing unit which produces image data that contains a musical score with the musical notes composing the music disposed thereon, and which displays the image data on the screen of the displaying unit, wherein when the classification value of the classification item concerning fingering, associated with each of the musical notes and stored in the storing unit, is equivalent to a predetermined value, the image producing unit produces image data that contains the musical score including symbols indicating that the musical notes correspond to the classification items.

8. The music difficulty level calculating apparatus according to claim 3, wherein the second classification item value obtaining unit associates classification values of the respective classification items concerning rhythm with respect to each musical note with each musical note, and stores the classification values in the storing unit, and
wherein the music difficulty level calculating apparatus further comprises:
a displaying unit having a screen which displays data on the screen; and
an image producing unit which produces image data that contains a musical score with the musical notes composing the music disposed thereon, and which displays the image data on the screen of the displaying unit, wherein when the classification value of the classification item concerning rhythm, associated with each musical note and stored in the storing unit, is equivalent to a predetermined value, the image producing unit produces image data that contains the musical score including symbols indicating that the musical notes correspond to the classification values.

9. The music difficulty level calculating apparatus according to claim 1, wherein the whole difficulty level calculating unit multiplies plural separate difficulty levels calculated by the separate difficulty level calculating unit by weighting coefficients, respectively, and accumulates the weighted difficulty levels, thereby calculating the whole difficulty level of the music.

10. The music difficulty level calculating apparatus according to claim 9, further comprising:
a weighting coefficient optimizing unit which optimizes the weighting coefficients, by which the plural separate difficulty levels are to be multiplied, wherein the weighting coefficient optimizing unit calculates the weighting coefficients such that a correlation will become maximum between the difficulty level of music calculated based on the separate difficulty levels previously calculated and stored in the storing unit and a difficulty level evaluation value of the same music given by a professional and stored in the storing unit.

11. The music difficulty level calculating apparatus according to claim 10, wherein the weighting coefficient optimizing unit obtains a weighting coefficient candidate value in a vicinity of a basic value of the weighting coefficient of each element, and calculates the difficulty level from a combination of weighting coefficient candidate values of all the elements.

12. The music difficulty level calculating apparatus according to claim 11, wherein the weighting coefficient optimizing unit calculates the weighting coefficient candidate value by multiplying the basic value by a coefficient varying within a predetermined range.

13. A music difficulty level calculating apparatus comprising:
a storing unit which stores musical-tone data, wherein the musical-tone data includes pitch information of each of musical notes composing music, fingering information for playing the musical notes, and time information of each of the musical notes;
a separate difficulty level calculating unit which calculates separate difficulty levels on plural elements required for playing the music respectively, based on one of the pitch information, the fingering information, and the time information stored in the storing unit; and
a whole difficulty level calculating unit which calculates a whole difficulty level of the music based on the separate difficulty levels calculated by the separate difficulty level calculating unit;
wherein the separate difficulty level calculating unit comprises a second difficulty level calculating unit and a master level map producing unit; and
wherein the second difficulty level calculating unit comprises a difficulty level evaluation map producing unit and a cost accumulating unit,
wherein the difficulty level evaluation map producing unit produces a difficulty level evaluation map which indicates an existence of a specific state in each of classification items concerning elements composing each piece of music, and the cost accumulating unit refers to the difficulty level evaluation map to read from the cost table stored in the storing unit cost values corresponding to the specific states in the classification items, and accumulates the cost values, thereby obtaining an accumulated cost value as a difficulty level of the music,
wherein the master level map producing unit produces a master level map indicating whether or not a player has mastered a specific state in each of the classification items, and stores the master level map in the storing unit, and wherein the cost accumulating unit refers to the master level map produced by the master level map producing unit to obtain the cost value taking into consideration the player's master level in the specific states in the classification items.

14. The music difficulty level calculating apparatus according to claim 13, wherein the cost accumulating unit refers to the master level map produced by the master level map producing unit, and excludes the cost value corresponding to the specific state in the classification item from the cost values to be accumulated, when the player has mastered the specific state in the classification item.

15. The music difficulty level calculating apparatus according to claim 13, wherein the master level map producing unit refers to the difficulty level evaluation map produced by the difficulty level evaluation map producing unit, and sets a predetermined value to the specific state in the classification item in the master level evaluation map produced by the master level map producing unit, when the existence of a specific state in the classification item is indicated in the difficulty level evaluation map.

16. The music difficulty level calculating apparatus according to claim 14, wherein the master level map producing unit refers to the difficulty level evaluation map produced by the difficulty level evaluation map producing unit with respect to each piece of music, and accumulates values with respect to the specific state in the classification item, when the existence of a specific state in the classification item is indicated in the difficulty level evaluation map, and wherein the cost accumulating unit refers to the master level map produced by the master level map producing unit, and weights the cost value corresponding to the specific state of the classification item based on the accumulated value, when the accumulated value is stored in the specific state of the classification item.

17. The music difficulty level calculating apparatus according to claim 16, wherein the weight corresponds to a ratio of the accumulated value to a predetermined value.

* * * * *